US008789393B2

United States Patent
Orita et al.

(10) Patent No.: US 8,789,393 B2
(45) Date of Patent: Jul. 29, 2014

(54) OPTICAL FIBER PREFORM, METHOD OF MANUFACTURING OPTICAL FIBER PREFORM, AND METHOD OF MANUFACTURING OPTICAL FIBER

(75) Inventors: Nobuaki Orita, Tokyo (JP); Akihiro Kanao, Tokyo (JP); Hideya Moridaira, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 1002 days.

(21) Appl. No.: 11/288,311

(22) Filed: Nov. 29, 2005

(65) Prior Publication Data

US 2006/0115913 A1    Jun. 1, 2006

(30) Foreign Application Priority Data

| Nov. 29, 2004 | (JP) | 2004-344588 |
| Dec. 16, 2004 | (JP) | 2004-364929 |
| Dec. 16, 2004 | (JP) | 2004-364930 |
| Apr. 14, 2005 | (JP) | 2005-117310 |
| Aug. 23, 2005 | (JP) | 2005-241301 |
| Aug. 23, 2005 | (JP) | 2005-241302 |

(51) Int. Cl.
    *C03B 37/018* (2006.01)
(52) U.S. Cl.
    USPC ............ 65/379; 65/416; 65/426; 65/427
(58) Field of Classification Search
    USPC ................. 65/379, 427, 426, 416
    See application file for complete search history.

(56) References Cited

U.S. PATENT DOCUMENTS

| 3,865,564 A | * | 2/1975 | Jaeger et al. ............. 65/392 |
| 4,032,315 A | * | 6/1977 | van der Steen ............. 65/32.5 |
| 4,072,480 A | * | 2/1978 | Wagner .................... 95/136 |
| 4,286,978 A | * | 9/1981 | Bailey et al. ............. 65/426 |
| 4,338,111 A | * | 7/1982 | Edahiro et al. ............ 65/426 |
| 4,552,576 A | * | 11/1985 | Hara et al. ............. 65/378 |
| 4,620,861 A | * | 11/1986 | Berkey ................... 65/399 |
| 4,747,861 A | * | 5/1988 | Schneider ............... 65/419 |
| 4,822,136 A |   | 4/1989 | Hicks, Jr. |
| 4,978,378 A | * | 12/1990 | Ito et al. ................ 65/424 |
| 5,123,940 A |   | 6/1992 | DiGiovanni et al. |
| 5,221,309 A |   | 6/1993 | Kyoto et al. |
| 5,356,449 A |   | 10/1994 | Kuwahara et al. |

(Continued)

FOREIGN PATENT DOCUMENTS

| EP | 0 170 249 | 2/1986 |
| JP | 60-145927 | 8/1985 |

(Continued)

OTHER PUBLICATIONS

U.S. Appl. No. 13/293,605, filed Nov. 10, 2011, Takahashi, et al.

(Continued)

*Primary Examiner* — John Hoffmann
(74) *Attorney, Agent, or Firm* — Oblon, Spivak, McClelland, Maier & Neustadt, L.L.P.

(57) ABSTRACT

A porous layer is formed by depositing a silica glass particle around a core rod. The porous layer is dehydrated. The dehydrated porous layer is sintered under a decreased pressure until the dehydrated porous layer becomes a translucent glass layer containing a closed pore. The translucent glass layer is vitrified under an ambient atmosphere including an inert gas other than a helium gas.

5 Claims, 31 Drawing Sheets

(56) References Cited

U.S. PATENT DOCUMENTS

| | | | |
|---|---|---|---|
| 5,470,369 A * | 11/1995 | Tsuchiya et al. | 65/379 |
| 5,713,979 A * | 2/1998 | Nicholson et al. | 65/424 |
| 5,785,729 A | 7/1998 | Yokokawa et al. | |
| 5,837,334 A | 11/1998 | Yokokawa et al. | |
| 6,131,415 A | 10/2000 | Chang et al. | |
| 6,381,986 B1 * | 5/2002 | Loxley et al. | 65/17.5 |
| 6,460,378 B1 | 10/2002 | Dong et al. | |
| 6,717,659 B2 | 4/2004 | Hong et al. | |
| 6,779,363 B1 * | 8/2004 | Craft et al. | 65/384 |
| 2002/0073741 A1 * | 6/2002 | Ishida | 65/415 |
| 2003/0059179 A1 * | 3/2003 | Jiang et al. | 385/96 |
| 2005/0204780 A1 | 9/2005 | Moridaira et al. | |

FOREIGN PATENT DOCUMENTS

| | | |
|---|---|---|
| JP | 60-155542 | 8/1985 |
| JP | 61-291432 | 12/1986 |
| JP | 62-3032 | 1/1987 |
| JP | 63-151639 | 6/1988 |
| JP | 63-201025 | 8/1988 |
| JP | 64-24039 | 1/1989 |
| JP | 64-37429 | 2/1989 |
| JP | 1-145344 | 6/1989 |
| JP | 04-026523 | 1/1992 |
| JP | 7-109135 | 4/1995 |
| JP | 7-109141 | 4/1995 |
| JP | 7-149534 | 6/1995 |
| JP | 2559395 | 9/1996 |
| JP | 2565712 | 10/1996 |
| JP | 9-110456 | 4/1997 |
| JP | 9-309735 | 12/1997 |
| JP | 3027509 | 1/2000 |
| JP | 2000-281379 | 10/2000 |
| JP | 2001-287920 | 10/2001 |
| JP | 2003-327440 | 11/2003 |
| JP | 2004-43200 | 2/2004 |
| JP | 2006-193408 | 7/2006 |
| JP | 2006-193409 | 7/2006 |
| JP | 2006-290708 | 10/2006 |

OTHER PUBLICATIONS

Office Action issued May 31, 2011 in Japan Application No. 2005-241302 (With English Translation).

U.S. Office Action mailed Jun. 11, 2012 in co-pending U.S. Appl. No. 13/359,258.

Japanese Office Action (2004-344588) dated Dec. 21, 2010, w/English Translation.

Japanese Office Action (2005-241302) dated May 8, 2012, w/English Translation.

Japanese Office Action (2005-241301) dated May 8, 2012, w/English Translation.

* cited by examiner

OPTICAL FIBER PREFORM, METHOD OF MANUFACTURING OPTICAL FIBER PREFORM, AND METHOD OF MANUFACTURING OPTICAL FIBER

BACKGROUND OF THE INVENTION

1. Field of the Invention

The present invention relates to a technology for manufacturing an optical fiber preform and an optical fiber for optical communication.

2. Description of the Related Art

Currently, a demand for reducing a manufacturing cost of an optical fiber is ever increasing, in addition to an improvement of optical transmission characteristics of the optical fiber.

A method of manufacturing the optical fiber includes a vapor-phase axial deposition (VAD) method, a modified chemical vapor deposition (MCVD) method, an outside vapor deposition (OVD) method, a plasma chemical vapor deposition (PCVD) method, a sol-gel method, a rod-in-tube (RIT) method, and a combination of these methods.

The above manufacturing methods are already developed into a mature technology, and there is little room for an improvement. For this reason, it is not easy to realize more cost reduction for manufacturing the optical fiber. Furthermore, because a manufacturing capability of a majority of optical fiber manufacturing equipments, which are installed by an investment in plant and equipment actively performed around the year 2000, is in surplus, it is extremely difficult to make an additional investment or development. As a result, these old manufacturing facilities are now one of the major impediments against a reduction of the manufacturing cost.

Because the current environment for manufacturing the optical fiber is in the above situation, it is desired to work out a method of manufacturing the optical fiber, which can reduce the manufacturing cost by proficiently combining the conventional technologies, while utilizing the existing manufacturing facilities as much as possible.

For example, when forming a cladding layer that makes up a major portion of the optical fiber, a method of forming a porous layer by depositing particles of a silica glass that is created by a vapor phase synthesis, such as the OVD method, around a core rod, and manufacturing a transparent glass layer via a thermal treatment of the porous layer is an excellent method of manufacturing a large-size optical fiber preform with a low cost and a high quality.

In general, a vitrification equipment, which makes the porous layer formed by the vapor phase synthesis, such as the OVD method, the transparent glass layer via the thermal treatment, employs a heating furnace having a muffle tube made of the silica glass. However, the muffle tube is softened at a temperature close to 1,600° C., which is necessary for making the porous layer into the transparent glass, and is apt to be deformed. In particular, a large-diameter muffle tube is required for making a large-size optical fiber preform, and such a large-diameter muffle tube has a problem of durability. To cope with this problem, a method of manufacturing a translucent glass preform and drawing the optical fiber is disclosed in Japanese Patent No. 2565712.

SUMMARY OF THE INVENTION

It is an object of the present invention to at least solve the problems in the conventional technology.

A method according to one aspect of the present invention, which is for manufacturing an optical fiber preform that includes a core layer and a cladding layer surrounding the core layer, includes forming a porous layer by depositing a particle of a silica-based glass around a core rod made of a silica-based glass having the core layer in a shape of a rod; dehydrating the porous layer under at least one condition of a decreased pressure, an ambient atmosphere with an inert gas and a halogen gas, and an ambient atmosphere with an inert gas and a halogen-based compound gas; sintering the dehydrated porous layer under a decreased pressure until the dehydrated porous layer becomes a translucent glass layer containing a closed pore; and vitrifying the translucent glass layer under an ambient atmosphere including an inert gas other than a helium gas, to make the translucent glass layer into the cladding layer.

A method according to another aspect of the present invention, which is for manufacturing an optical fiber that includes a core layer and a cladding layer surrounding the core layer, includes forming a porous layer by depositing a particle of a silica-based glass around a core rod made of a silica-based glass having the core layer in a shape of a rod; dehydrating the porous layer under at least one condition of a decreased pressure, an ambient atmosphere including an inert gas and a halogen gas, and an ambient atmosphere with an inert gas and a halogen-based compound gas; sintering the dehydrated porous layer under a decreased pressure until the dehydrated porous layer becomes a translucent glass layer containing a closed pore that is substantially a vacuum; and drawing a translucent glass preform formed with the core rod and the translucent glass layer in such a manner that the translucent glass layer becomes a transparent glass layer.

A method according to still another aspect of the present invention, which is for manufacturing an optical fiber that includes a core layer and a cladding layer surrounding the core layer, includes fabricating a porous tube by forming a porous layer by depositing a particle of a silica-based glass around a mandrel, and pulling the mandrel out of the formed porous layer; dehydrating the porous tube under at least one condition of a decreased pressure, an ambient atmosphere with an inert gas and a halogen gas, and an ambient atmosphere with an inert gas and a halogen-based compound gas; sintering the dehydrated porous tube under a decreased pressure until the dehydrated porous tube becomes a translucent glass cylinder containing a closed pore; inserting a core rod made of a silica-based glass having the core layer in a shape of a rod into the translucent glass cylinder; and drawing the translucent glass cylinder in which the core rod is inserted, while heating the translucent glass cylinder, in such a manner that the core rod and the translucent glass cylinder are melted and integrated, and that the translucent glass cylinder becomes the cladding layer of a transparent glass.

A method according to still another aspect of the present invention, which is for manufacturing an optical fiber that includes at least one core layer and at least one cladding layer surrounding the core layer, includes fabricating a first preform by forming a porous layer by depositing a particle of a silica-based glass around a core rod made of a silica-based glass having the core layer in a shape of a rod; dehydrating and a sintering the first preform until the porous layer becomes a translucent glass layer containing a closed pore; fabricating a second preform by inserting the dehydrated and sintered first preform into a glass tube; and drawing the second preform, while heating the second preform, in such a manner that the translucent glass layer and the glass tube are melted and integrated, and that the translucent glass layer becomes the cladding layer of a transparent glass.

An optical fiber preform according to still another aspect of the present invention includes a core layer and a cladding layer surrounding the core layer. The cladding layer is in a state of a translucent glass containing a closed pore inside. A leading edge of the cladding layer on a side of starting a drawing is in a state of a transparent glass free of the closed pore.

A method according to still another aspect of the present invention, which is for manufacturing an optical fiber preform, includes forming a porous layer by depositing a particle of a silica-based glass around a core rod; dehydrating and sintering the porous layer until the porous layer becomes a translucent glass layer containing a closed pore; and vitrifying a leading edge of the translucent glass layer on a side of starting a drawing, by heating the leading edge.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings. It should be noted that the present invention is not limited by the exemplary embodiments. In the following explanation, an outline of characteristics on a configuration of the present invention will be covered as an embodiment, and the one actually implemented following the embodiment will be explained in detail as an embodiment example.

The method of manufacturing the optical fiber according to the present invention has a big advantage in application to manufacturing an optical fiber including a core layer and a cladding layer with a variety of refractive-index purofiles and characteristics, and is particularly suitable for manufacturing an optical fiber, such as an SMF. In addition, the method of manufacturing the optical fiber according to the present invention is also applicable to manufacturing an optical fiber suitable for a broadband wavelength division multiplexing (WDM) transmission with a low transmission loss.

Figure 1:
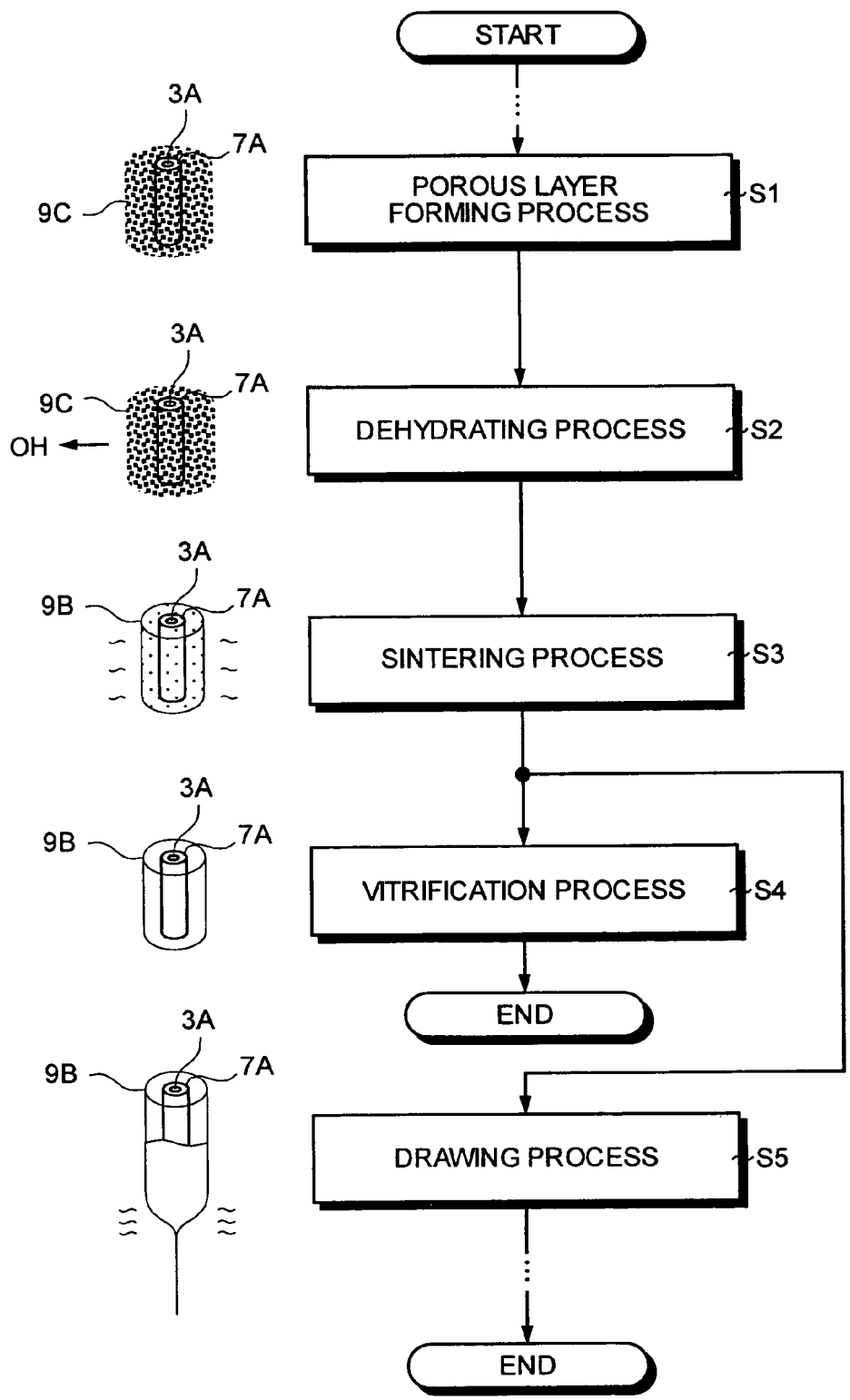
FIG. 1 is a flowchart of a processing procedure for a method of manufacturing an optical fiber preform and a method of manufacturing an optical fiber, according to a first embodiment of the present invention.

FIG. 1 is a flowchart of a processing procedure for a method of manufacturing an optical fiber preform and a method of manufacturing an optical fiber, according to a first embodiment of the present invention. The method of manufacturing an optical fiber preform according to the present embodiment includes a porous layer forming process, a dehydrating process, a sintering process, and a vitrification process. The method of manufacturing an optical fiber according to the present embodiment includes a drawing process instead of the vitrification process of the method of manufacturing an optical fiber preform.

In the porous layer forming process of Step S1, a porous layer 9C is formed by depositing a particle of a silica-based glass on an outer circumference of a core rod 7A made of a silica-based glass having a core layer 3A in a shape of a rod on a center axis.

In the dehydrating process of Step S2, the porous preform layer 9C is dehydrated under at least one of three conditions of a decreased pressure, an ambient atmosphere with an inert gas and a halogen gas, and an ambient atmosphere with an inert gas and a halogen-based compound gas.

In the sintering process of Step S3, the porous layer 9C dehydrated at the dehydrating process is sintered under a decreased pressure to make the dehydrated porous layer 9C into a translucent glass layer 9B in a state of a translucent glass containing a closed pore that is substantially a vacuum. The "state of a translucent glass" means a state of having a virtually even distribution of the closed pore as a whole, so that it looks opaque whitish. On the other hand, a "state of a transparent glass" means a state virtually free from the closed pore except for some fine closed pores remained at some bad portions, so that it looks transparent. The "closed pore" indicates an air bubble or a space formed inside the translucent glass layer 9B, which is physically isolated from a circumferential atmosphere. The "vacuum" means "a state of a specific space filled with a gaseous matter having a pressure lower than the atmospheric pressure" defined by JIS Z 8126.

Figure 2:
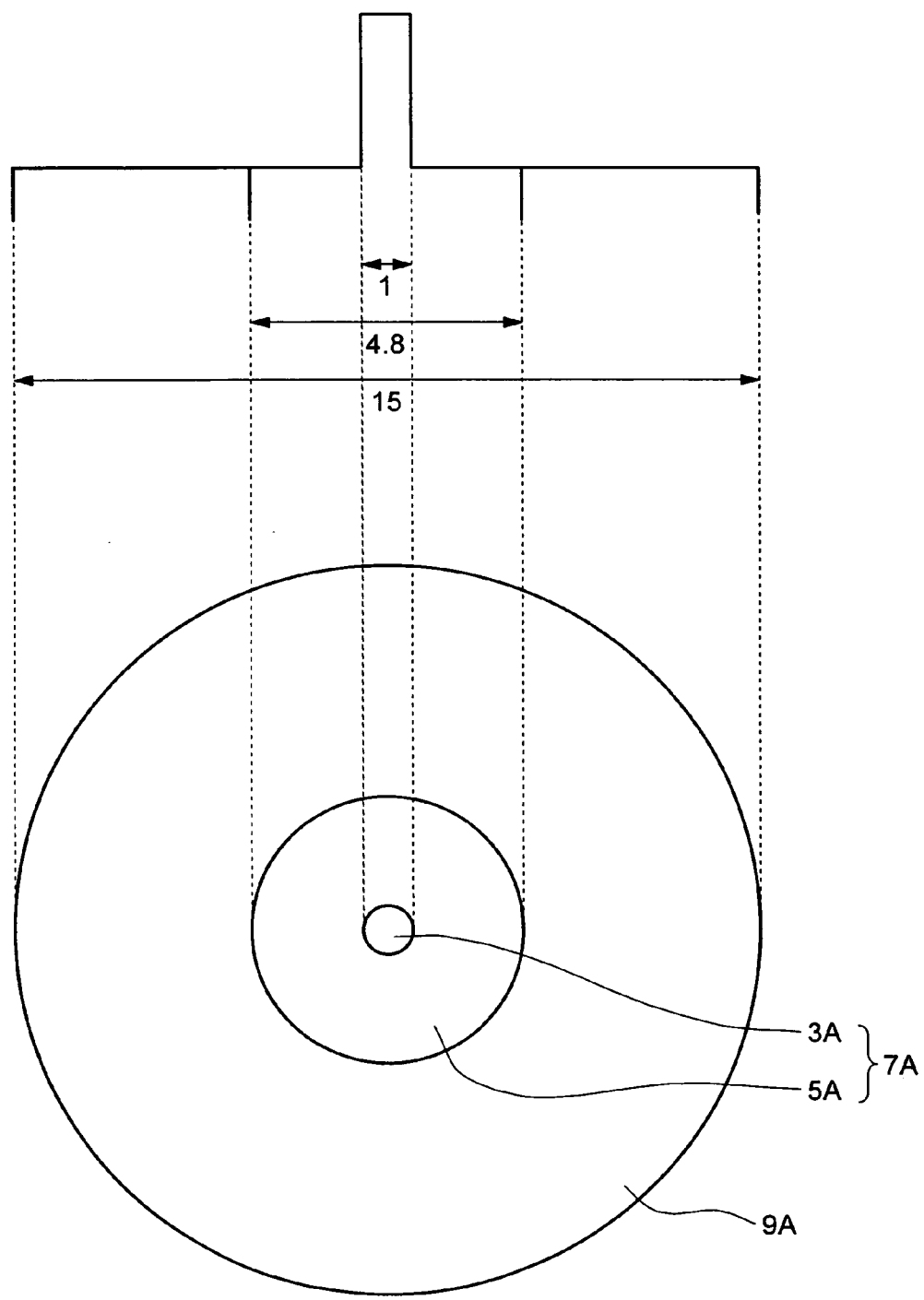
FIG. 2 is a schematic for illustrating a refractive-index profile of an optical fiber manufactured according to a first embodiment example of the present invention.

Finally, in the vitrification process of Step S4, the translucent glass layer 9B containing the closed pore is vitrified under an ambient atmosphere including an inert gas (except for a helium gas), to make the translucent glass layer 9B into a cladding layer (9A in FIG. 2). With this process, the optical fiber is manufactured.

In the method of manufacturing an optical fiber according to the present embodiment, the process is advanced to the drawing process of Step S5, instead of Step S4. In the drawing process, the translucent glass layer 9B is made into a transparent glass layer.

According to the method of manufacturing an optical fiber preform and the method of manufacturing an optical fiber following the above procedures, a manufacturing of large-size optical fiber preform is possible in a short time, without using an expensive helium gas. Furthermore, it is possible to extend the life of manufacturing facilities with reduced manufacturing processes, resulting in a reduction of a manufacturing cost for the optical fiber.

Following is a detailed explanation of the present embodiment using embodiment examples. Although figures are presented to eliminate a problem of understanding the contents, the shapes shown in the figures do not necessarily tell the actual scale size. The characteristics of the optical fiber in the embodiment examples conform to a definition stipulated in ITU-T G.650 unless otherwise noted.

FIG. 2 is a schematic for illustrating a refractive-index profile of an optical fiber manufactured from an optical fiber preform manufactured according to a first embodiment example of the present invention. The optical fiber shown in FIG. 2 is an SMF with a step-index-type refractive-index profile, having a zero-dispersion wavelength in a wavelength band of 1.3 μm. The optical fiber has a stack structure formed in a concentric manner in which the core layer 3A is formed along the center axis, and a first cladding layer 5A and a second cladding layer 9A are sequentially formed around the core layer 3A.

A portion including the core layer 3A and the first cladding layer 5A is corresponding to the core rod 7A. A diameter ratio between the core layer 3A and the first cladding layer 5A (hereinafter, "cladding/core ratio") is 4.8/1. A diameter of the core layer 3A in the present embodiment example is a diameter of a portion in which a refractive index difference of the core layer 3A to the first cladding layer 5A is a half of the maximum refractive index difference.

Figure 3:
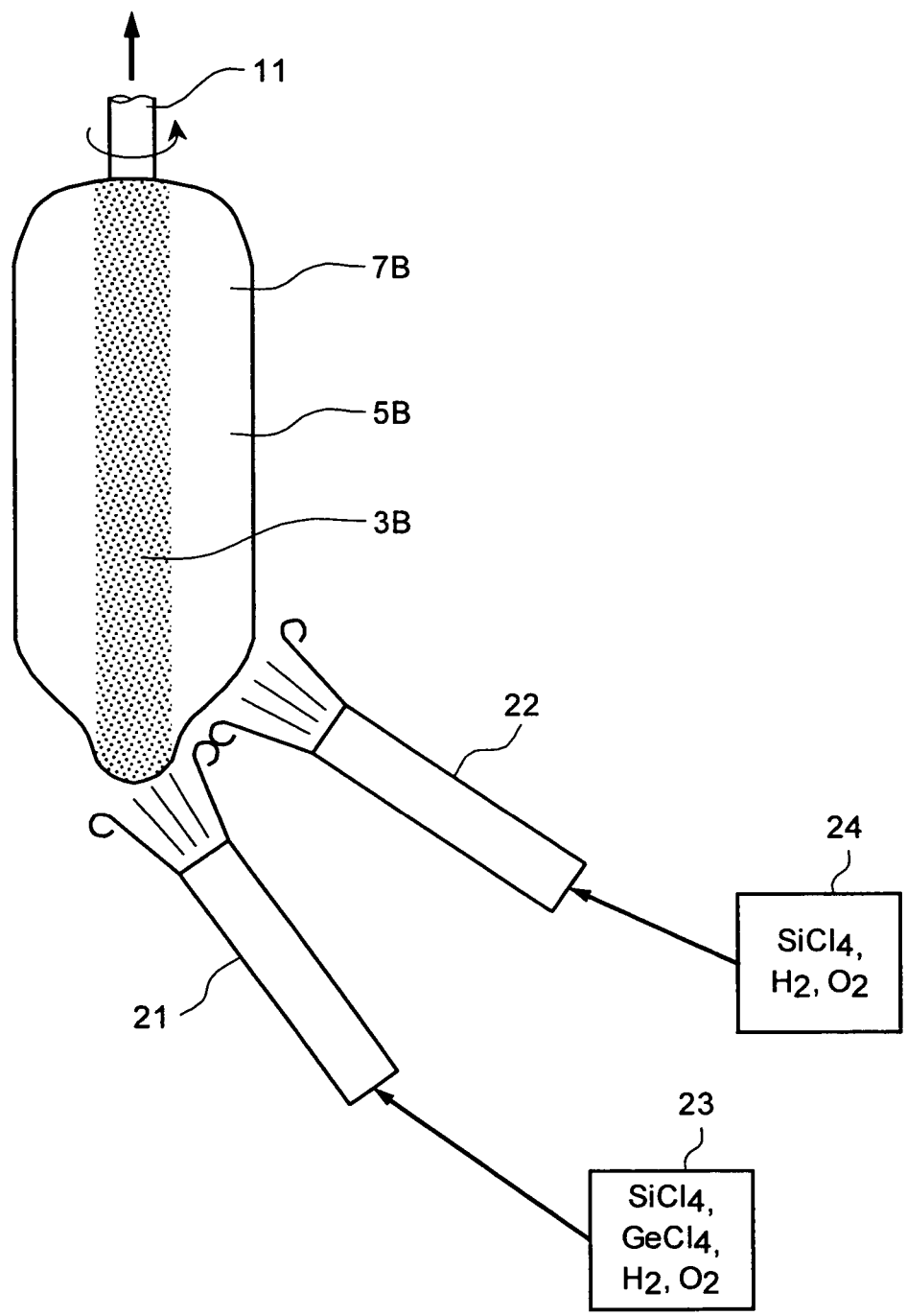
FIG. 3 is a longitudinal cross-section of a core soot for explaining a process of manufacturing the core soot by the VAD method.

A core soot 7B that becomes the core rod 7A is fabricated by using the VAD method. FIG. 3 is a longitudinal cross-section of the core soot 7B for explaining a process of fabricating the core soot 7B by the VAD method. In the VAD method, a gas 23 consisting of vaporized silicon tetrachloride ($SiCl_4$), germanium tetrachloride ($GeCl_4$), oxygen ($O_2$), and hydrogen ($H_2$) is provided and burned through a core burner 21. The gas 23 is hydrolyzed in a flame to obtain a particle of a synthesized glass. The particle of the synthesized glass is blown and deposited on a target rod 11.

The particle of the synthesized glass forms a core layer soot 3B. The core layer soot 3B becomes the core layer 3A at a subsequent process. The target rod 11 is rotated and gently pulled up in an upper direction.

A cladding burner 22 is disposed above the core burner 21, which is similar to the core burner 21. A gas 24 consisting of silicon tetrachloride ($SiCl_4$), oxygen (O2) and hydrogen ($H_2$) is provided and burned through the cladding burner 22. The gas 24 is hydrolyzed in a flame to form a cladding layer soot 5B that becomes the first cladding layer 5A at a subsequent process on an outer circumference of the core layer soot 3B. In this manner, the core soot 7B is fabricated in a shape of a rod having a predetermined width, which includes the core layer soot 3B and the cladding layer soot 5B.

Subsequently, a dehydrating process and a sintering process are performed on the core soot 7B. These processes are the same as the conventional processes without having a special feature. With the dehydrating process and the sintering process, the core soot 7B is made into a transparent glass, and becomes the core rod 7A including the core layer 3A and the first cladding layer 5A.

Figure 4:
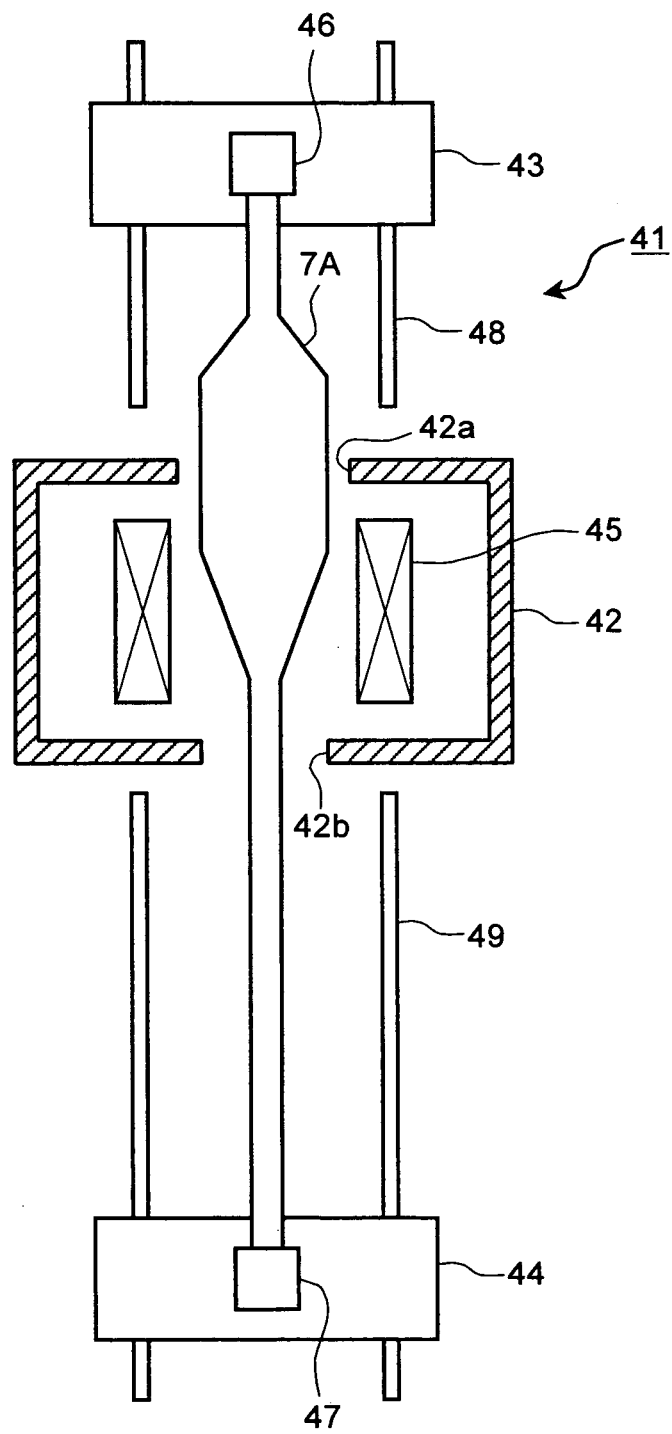
FIG. 4 is a longitudinal cross-section of an electric-furnace elongating equipment for explaining heating and elongating of a core rod.

The core rod 7A including the core layer 3A and the first cladding layer 5A made into the transparent glass is heated and drawn in a vertical-type electric-furnace elongating equipment 41 shown in FIG. 4 to make a rod of 51 millimeters diameter. FIG. 4 is a longitudinal cross-section of the electric-furnace elongating equipment 41 for explaining heating and elongating of the core rod 7A. The electric-furnace elongating equipment 41 includes a heating furnace 42 including two openings 42a and 42b passing through in a vertical direction, an upper holding unit 43 disposed above the heating furnace 42, and a lower holding unit 44 disposed below the heating furnace 42.

The heating furnace 42 includes a heater 45 as a heat generating element inside. The core rod 7A is set in such a manner that it is extended along a center axis of the heater 45 in the vertical direction, and upper and lower edges of the core rod 7A are passing through the openings 42a and 42b to stick out of the heating furnace 42. The upper edge of the core rod 7A is held by an upper chuck 46 disposed at the upper holding unit 43, and the lower edge of the core rod 7A is held by a lower chuck 47 disposed at the lower holding unit 44. The upper holding unit 43 and the lower holding unit 4 are guided by a guide rail 48 and a guide rail 49, respectively, so that they are supported in a movable manner in a longitudinal direction of the core rod 7A.

The electric-furnace elongating equipment 41 extends the core rod 7A so that the width of the core rod 7A becomes a predetermined size by heating a thick-diameter portion of the core rod 7A, and at the same time, moving the upper chuck 46 in a direction coming close to the heating furnace 42 and moving the lower chuck 47 in a direction getting away from the heating furnace 42.

A heating source used at the heating and elongating process is not limited to the heating furnace 42. An oxyhydrogen flame or a plasma flame can also be used for the heating source.

Subsequently, the porous layer 9C of 300 millimeters diameter is fabricated by depositing a particle of a silica-based glass on an outer circumference of the drawn core rod 7A by using the OVD method. The porous layer 9C is a portion that is made into the translucent glass layer 9B at a subsequent process, and finally becomes the second cladding layer 9A that is made into a transparent glass.

Figure 5:
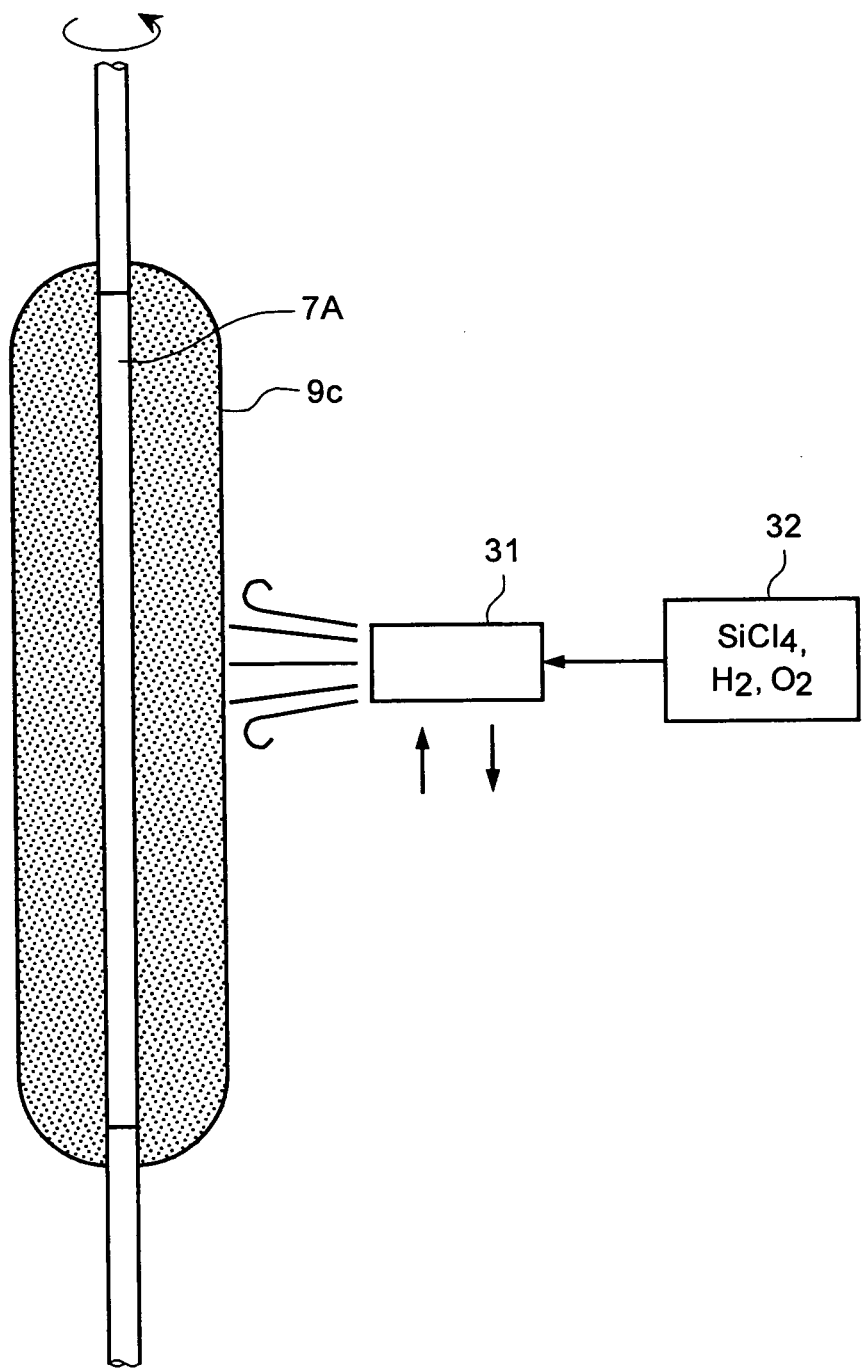
FIG. 5 is a longitudinal cross-section of a porous layer for explaining a formation of the porous layer by the OVD method.

FIG. 5 is a longitudinal cross-section of the porous layer 9C for explaining a formation of the porous layer 9C by the OVD method. In the OVD method, a gas 32 consisting of vaporized silicon tetrachloride ($SiCl_4$), oxygen ($O_2$), and hydrogen ($H_2$) is provided and burned through a burner 31. The gas 32 is hydrolyzed in a flame to obtain a particle of a synthesized glass. The particle of the synthesized glass is blown to the core rod 7A that is rotating so that the particle is deposited around the core rod 7A. Because a thickness of a particle layer that is deposited at one time is not thick enough, the process is repeated by moving the burner 31 back and forth until the porous layer 9C of an enough width is obtained.

At this moment, an average density of the porous layer 9C (i.e., a value obtained by dividing a weight of the porous layer 9C that is a result of subtracting a weight of the core rod 7A from a total weight by a volume of the porous layer 9C that is a result of subtracting a volume of the core rod 7A from a total volume) is approximately 0.7 g/cm$^3$.

Figure 6:
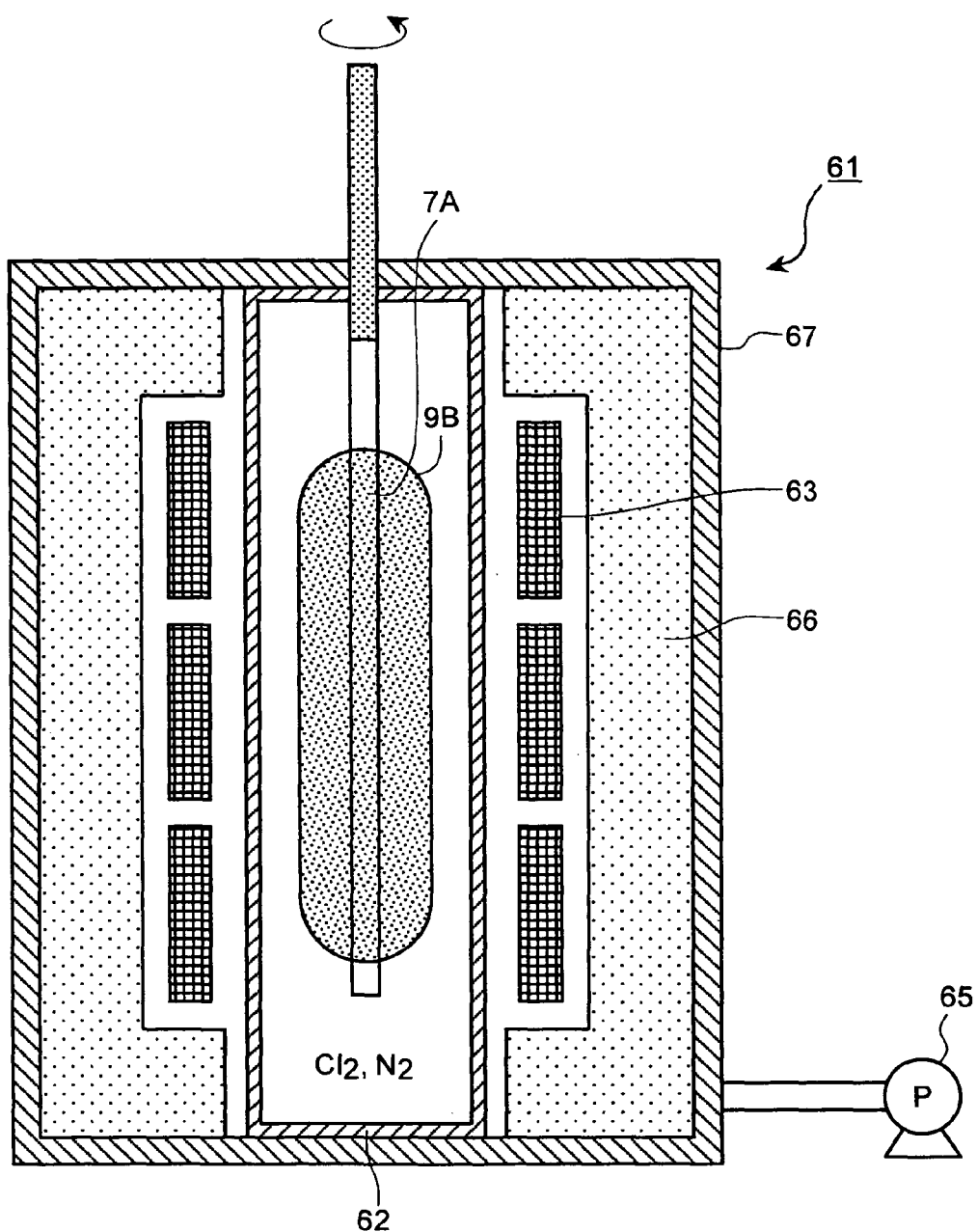
FIG. 6 is a longitudinal cross-section of a dehydrating/sintering furnace used for making the porous layer into a translucent glass layer in a dehydrating process and a sintering process.

The porous layer 9C is then dehydrated and sintered in a dehydrating/sintering furnace 61 shown in FIG. 6 under a condition shown in Table 1, to make the porous layer 9C into the translucent glass layer 9B of which the inside includes a closed pore that is substantially a vacuum.

TABLE 1

| Item | | Condition |
|---|---|---|
| Dehydrating condition | | |
| Dehydrating temperature | | 1100° C. |
| Dehydrating time | | 3 hours |
| Number of rotations of preform | | 10 rotations/min |
| Type of gas and flowing amount | Nitrogen | 10 liters/min |
| | Chlorine | 0.5 liter/min |
| Sintering condition | | |
| Sintering temperature | | 1400° C. |
| Temperature raising speed | | 2° C./min |
| Sintering temperature holding time | | 3 hours |
| Furnace pressure | | 100 Pa |
| Number of rotations of preform | | 10 rotations/min |

FIG. 6 is a longitudinal cross-section of the dehydrating/sintering furnace 61 used for making the porous layer 9C into the translucent glass layer 9B in the dehydrating process and the sintering process. The dehydrating/sintering furnace 61 includes a silica muffle tube 62 that is a container with a sealing function made of a silica glass, a ring-shaped multi-heater 63 formed with a plurality of heat generating elements disposed around the silica muffle tube 62, a furnace unit 67 that forms an exterior of the dehydrating/sintering furnace 61, surrounding whole of the silica muffle tube 62 and the multi-heater 63, and a heat-insulating member 66 that is filled in a space between the silica muffle tube 62, the multi-heater 63, and the furnace unit 67.

The core rod 7A including the porous layer 9C on an outer circumference is set in the silica muffle tube 62. In the dehydrating process, predetermined amounts of a chlorine gas (Cl2) and a nitrogen gas (N2) are introduced into the silica muffle tube 62 from a gas inlet (not shown), and an appropriate amount of gas is drained from a gas outlet (not shown), so that a pressure inside the silica muffle tube 62 is maintained constant. A vacuum pump 65 is connected to the silica muffle tube 62, and in the sintering process, the inside pressure of the silica muffle tube 62 is decreased by using the vacuum pump 65. The porous layer 9C is subjected to the dehydrating process and the sintering process in the silica muffle tube 62, and made into the translucent glass layer 9B including a closed pore that is substantially a vacuum.

At the stage in which the dehydrating process and the sintering process are completed, the translucent glass layer 9B includes a closed pore that is physically isolated from a circumferential atmosphere. In the present embodiment example, this state is referred to as a "state of a translucent glass". In the state of a translucent glass, the closed pore that is an air bubble physically isolated from the circumferential atmosphere is included with a virtually even distribution as a whole, so that it looks opaque whitish. However, a surface of the translucent glass layer 9B is smooth and glossy. At this stage, a density of the translucent glass layer 9B is 95% of a density (2.2 g/cm$^3$) of the second cladding layer 9A that is finally made into a transparent glass, i.e., 2.09 g/cm$^3$.

In a conventional method of making a porous layer into a totally transparent glass, the porous layer is dehydrated enough by heating it with a temperature equal to or lower than 1200° C. with which the sintering is not progressed, and then a vitrification of the porous layer is performed under a condition of a high temperature. In other words, two stages of processes are required for the vitrification of the porous layer. In addition, an expensive helium gas is required for the conventional method, and a heating energy cost and a facility maintaining cost become high.

For this reason, a method of performing the sintering process in a temperature range with which an incomplete sintering state is realized in a decreased pressure after the dehydrating process is introduced in the present embodiment example. In the sintering process for a porous layer, a coupling between the particles is increased by heating, and opened pores are decreased so that the density becomes high. Finally the porous layer is made into a transparent glass free of the air bubble.

Although a progressing speed of the sintering is changed depending on the conditions, such as temperature and time, and particle diameter and composition of the glass particles, the sintering is easily progressed on a surface of the porous layer. As a result of sintering the porous layer 9C by changing the temperature and the heating time, to make the porous layer 9C into the state having the closed pore substantially isolated from the circumferential atmosphere, it is found that an average density should be equal to or more than 1.8 g/cm³, or preferably, equal to or more than 2.0 g/cm³.

From a point of view concerning a prevention of residual air bubbles at subsequent vitrification process and drawing process, there is an upper limit in a pressure for the sintering process performed in a decreased pressure. For a residual gas in the closed pore to be permeated into the silica glass at the vitrification process or the drawing process, so that the residual gas is not remained as an air bubble, a total amount of the residual gas in the closed pore is required to be equal to or less than a saturated solubility of the residual gas in the silica glass at a vitrification temperature. For instance, when the residual gas is $N_2$, the solubility S of $N_2$ in the silica glass at the atmosphere temperature T is expressed as Equation (1) according to "G. C. Beerkens, Advances in the fusion and processing of glass 2nd, 1990 Vol. 63K, pp. 222-242".

$$S[cc(STP)/cm^3 * atm] = 0.0252 EXP(-6665/T) \quad (1)$$

In Equation (1) STP means standard temperature and pressure.

Figure 10:
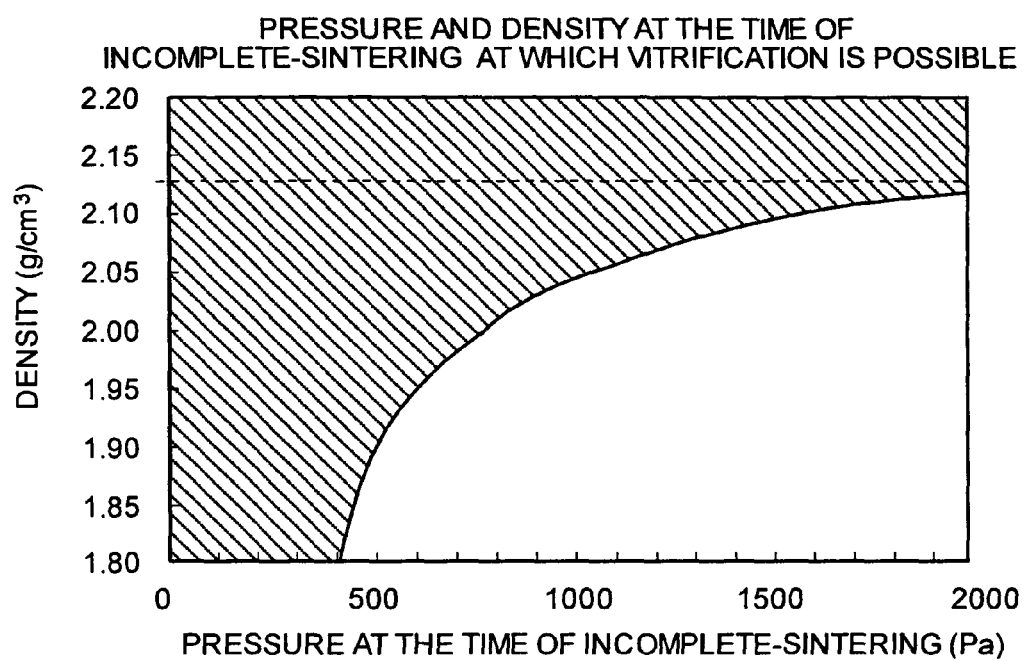
FIG. 10 is a graph of a calculated relation between a pressure for the sintering process and a density of a translucent glass layer, for preventing residual air bubbles in the vitrification process.

FIG. 10 is a graph of a relation between a pressure for the sintering process and a density of a translucent glass layer, for preventing residual air bubbles in the vitrification process, calculated when N2 with a decreased pressure is remained in the closed pore, and the saturated solubility of N2 in the silica glass at the atmosphere temperature T=1600° C. is 7.18× 10-4 [cc(STP)/cm³*atm].

When a density of a translucent glass layer is ρ1 [g/cm³], a volume of a closed pore included in the translucent glass layer is expressed as $(1-\rho1/2.2)$ [cc/cm³]. Because a sintering atmosphere gas with a decreased pressure is remained in the closed pore, when a sintering pressure is P [Pa], a volume of the gas in the closed pore becomes $$(1-\rho1/2.2)P/(1.013\times10^5)[cc/cm^3] (1.013\times10^5 \text{ is the atmospheric pressure})$$

Since the vitrification is possible if the volume of the gas in the closed pore is equal to or less than the saturated solubility of the gas in the silica glass at the vitrification temperature, the sintering is required to be progressed until Inequality (2) is satisfied.

$$(\text{Saturated solubility}) > (1-\rho1/2.2)P/(1.013\times10^5) > 0 \quad (2)$$

Since the curve shown in FIG. 10 indicates a relation between the density of the translucent glass layer and the pressure for the sintering process that becomes $7.18\times10^{-4}=(1-\rho1/2.2)P/(1.013\times10^5)$, Inequality (2) indicates a hatched area shown in FIG. 1 above the curve.

Furthermore, as a result of an experiment under various conditions, it is found that all of the air bubbles become the closed pores when the density of the translucent glass layer is equal to or more than 2.13 g/cm³. Therefore, in a range of pressure higher than 2000 Pa from FIG. 10, it is extremely difficult to form a translucent glass layer satisfying Inequality (2), and as a result, it is difficult to perform a vitrification process without the residual air bubbles.

To reduce the residual air bubbles at the vitrification process or the drawing process as much as possible, it is particularly desirable to keep the pressure for the sintering process equal to or lower than 1000 Pa.

Figure 7:
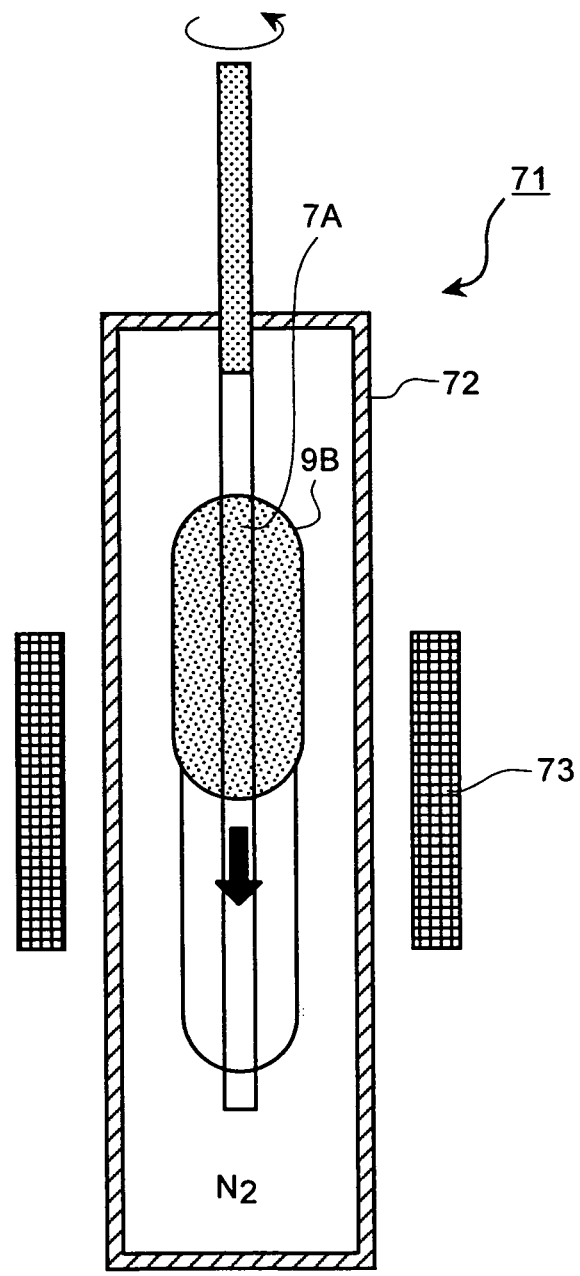
FIG. 7 is a longitudinal cross-section of a zone heating furnace used for making the translucent glass layer into a second cladding layer in a vitrification process.

The core rod 7A and the translucent glass layer 9B are subjected to a thermal treatment in a nitrogen atmosphere by using a zone heating furnace 71 shown in FIG. 7, and made into the second cladding layer 9A of 170 millimeters diameter. A condition for the thermal treatment at this time is shown in Table 2.

TABLE 2

| Item | Condition |
|---|---|
| Heater temperature | 1600° C. |
| Preform pulling-down speed | 100 mm/hour |
| Number of rotations of preform | 10 rotations/min |
| Type of gas and flowing amount | Nitrogen 10 liters/min |

FIG. 7 is a longitudinal cross-section of the zone heating furnace 71 used for making the translucent glass layer 9B into the second cladding layer 9A in the vitrification process. The zone heating furnace 71 includes a silica muffle tube 72, and a heater 73 formed with a heat generating element disposed around the silica muffle tube 72. The core rod 7A and the translucent glass layer 9B are held in a movable manner in the silica muffle tube 72 in a longitudinal direction. A nitrogen gas (N2) is introduced into the silica muffle tube 72 from a gas inlet. (not shown) by a predetermined amount shown in Table 2, and an appropriate amount of gas is drained from a gas outlet (not shown), so that a pressure inside the silica muffle tube 72 is maintained constant.

The core rod 7A and the translucent glass layer 9B are moved in the longitudinal direction to change a relative position to the heater 73. Portions of the core rod 7A and the translucent glass layer 9B heated by the heater 73 are made into a transparent glass. According to the present embodiment example, a lower edge of the translucent glass layer 9B is made into the transparent glass, and with a movement of the translucent glass layer 9B in a direction indicated by the arrow, an upper portion of the translucent glass layer 9B is sequentially made into the transparent glass. In this manner, the optical fiber preform is manufactured.

The core rod 7A and the porous layer 9C fabricated by the same method used in the first embodiment example are dehydrated and sintered at the dehydrating/sintering furnace 61 shown in FIG. 6 under a condition shown in Table 3, to fabricate the translucent glass layer 9B.

According to a second embodiment example of the present invention, the inside of the silica muffle tube 72 is maintained in a state of a decreased pressure during the dehydrating process, too.

TABLE 3

| Item | Condition |
|---|---|
| Dehydrating condition | |
| Dehydrating temperature | 1100° C. |
| Dehydrating time | 3 hours |
| Furnace pressure | 100 Pa |
| Number of rotations of preform | 10 rotations/min |
| Sintering condition | |
| Sintering temperature | 1400° C. |
| Temperature raising speed | 2° C./min |
| Sintering temperature holding time | 3 hours |
| Furnace pressure | 100 Pa |
| Number of rotations of preform | 10 rotations/min |

At this stage, an average density of the porous layer 9C is 95% of a density (2.2 g/cm³) of the glass layer that is totally vitrified, i.e., 2.1 g/cm³.

The core rod 7A and the translucent glass layer 9B are subjected to a thermal treatment in a nitrogen atmosphere by using the zone heating furnace 71 shown in FIG. 7, as in the first embodiment example, and made into the optical fiber preform of 170 millimeters diameter under the condition shown in Table 2.

The core rod 7A and the porous layer 9C fabricated by the same method used in the first embodiment example are dehydrated and sintered at the dehydrating/sintering furnace 61 shown in FIG. 6 under a condition shown in Table 4, to fabricate the translucent glass layer 9B.

According to a third embodiment example of the present invention, the inside of the silica muffle tube 72 is maintained in a state of a decreased pressure during the dehydrating process, too.

TABLE 4

| Item | Condition |
|---|---|
| Dehydrating condition | |
| Dehydrating temperature | 1100° C. |
| Dehydrating time | 3 hours |
| Furnace pressure | 100 Pa |
| Number of rotations of preform | 10 rotations/min |
| Sintering condition | |
| Sintering temperature | 1350° C. |
| Temperature raising speed | 2° C./min |
| Sintering temperature holding time | 4 hours |
| Furnace pressure | 100 Pa |
| Number of rotations of preform | 10 rotations/min |

At this stage, a density of the porous layer 9C is 91% of a density (2.2 g/cm³) of the glass layer that is totally vitrified, i.e., 2.0 g/cm³.

The core rod 7A and the translucent glass layer 9B are subjected to a thermal treatment in a nitrogen atmosphere by using the zone heating furnace 71 shown in FIG. 7, as in the first embodiment example, and made into the optical fiber preform of 170 millimeters diameter under the condition shown in Table 2.

The core rod 7A and the porous layer 9C fabricated by the same method used in the first embodiment example are dehydrated and sintered at the dehydrating/sintering furnace 61 shown in FIG. 6 under a condition shown in Table 5, to fabricate the translucent glass layer 9B.

According to a fourth embodiment example of the present invention, the inside of the silica muffle tube 72 is maintained in a state of a decreased pressure only during the dehydrating process.

TABLE 5

| Item | Condition | |
|---|---|---|
| Dehydrating condition | | |
| Dehydrating temperature | 1100° C. | |
| Dehydrating time | 3 hours | |
| Number of rotations of preform | 10 rotations/min | |
| Type of gas and flowing amount | Nitrogen | 10 liters/min |
| | Chlorine | 0.5 liter/min |
| Sintering condition | | |
| Sintering temperature | 1350° C. | |
| Temperature raising speed | 2° C./min | |
| Sintering temperature holding time | 3 hours | |
| Furnace pressure | 100 Pa | |
| Number of rotations of preform | 10 rotations/min | |

At this stage, a density of the porous layer 9C is 82% of a density (2.2 g/cm³) of the glass layer that is totally vitrified, i.e., 1.8 g/cm³.

The core rod 7A and the translucent glass layer 9B are subjected to a thermal treatment in a nitrogen atmosphere by using the zone heating furnace 71 shown in FIG. 7, as in the first embodiment example, and made into the optical fiber preform of 170 millimeters diameter under the condition shown in Table 2.

The core rod 7A and the porous layer 9C fabricated by the same method used in the first embodiment example are dehydrated and sintered at the dehydrating/sintering furnace 61 shown in FIG. 6 under a condition shown in Table 6, to fabricate the translucent glass layer 9B.

According to a fifth embodiment example of the present invention, the inside of the silica muffle tube 72 is maintained in a state of a decreased pressure only during the dehydrating process.

TABLE 6

| Item | Condition | |
|---|---|---|
| Dehydrating condition | | |
| Dehydrating temperature | 1100° C. | |
| Dehydrating time | 3 hours | |
| Number of rotations of preform | 10 rotations/min | |
| Type of gas and flowing amount | Nitrogen | 10 liters/min |
| | Chlorine | 0.5 liter/min |
| Sintering condition | | |
| Sintering temperature | 1400° C. | |
| Temperature raising speed | 2° C./min | |
| Sintering temperature holding time | 3 hours | |
| Furnace pressure | 100 Pa | |
| Number of rotations of preform | 10 rotations/min | |

At this stage, a density of the porous layer 9C is 95% of a density (2.2 g/cm³) of the glass layer that is totally vitrified, i.e., 2.1 g/cm³.

The translucent glass layer 9B (174 millimeters diameter) is not made into the transparent glass, and directly subjected to the drawing process.

The core rod 7A and the porous layer 9C fabricated by the same method used in the first embodiment example are dehydrated and sintered at the dehydrating/sintering furnace 61 shown in FIG. 6 under a condition shown in Table 7, to fabricate the translucent glass layer 9B. According to a first comparison example, the inside of the silica muffle tube 72 is maintained in a state of a decreased pressure neither during the dehydrating process nor during the sintering process. In the sintering process a helium gas is used as the inert gas.

TABLE 7

| Item | | Condition |
|---|---|---|
| Dehydrating condition | | |
| Dehydrating temperature | | 1100° C. |
| Dehydrating time | | 3 hours |
| Number of rotations of preform | | 10 rotations/min |
| Type of gas and flowing amount | Nitrogen | 10 liters/min |
| | Chlorine | 0.5 liter/min |
| Sintering condition | | |
| Sintering temperature | | 1400° C. |
| Temperature raising speed | | 2° C./min |
| Sintering temperature holding time | | 3 hours |
| Number of rotations of preform | | 10 rotations/min |
| Type of gas and flowing amount | Helium | 10 liters/min |
| | Chlorine | 0.5 liter/min |

At this stage, a density of the porous layer 9C is 95% of a density (2.2 g/cm³) of the glass layer that is totally vitrified, i.e., 2.1 g/cm³.

The translucent glass layer 9B (174 millimeters diameter) is not made into the transparent glass, and directly subjected to the drawing process.

The optical fiber preform manufactured in the first to the fourth embodiment examples and the first comparison example and the core rod 7A and the transparent glass layer 9B are subjected to the drawing process. When performing the drawing, two layers of ultra-violet (UV) cure resin coatings are conducted on an outer surface of the glass optical fiber. The optical fiber is wound around a reel via a winding capstan after curing the resin by irradiating ultra-violet light. The inner-side coating is referred to as a primary layer, and the outer-side coating is referred to as a secondary layer. A material for the coating is selected with criteria that the Young's modulus of the primary layer is small and the Young's modulus of the secondary layer is large. The drawing speed according to the present embodiment example is 2000 m/min.

An air-bubble defective fraction during the drawing and transmission characteristics of the optical fiber are measured for each of the SMFs manufactured according to the above embodiment examples. A result of the measurement is shown in Tables 8 and 9.

In addition, it is confirmed that the closed pore that existed in the translucent glass layer 9B is not remained in the glass optical fiber that is being drawn, by using an optical-fiber defect detecting equipment.

A laser beam is irradiated to the glass optical fiber that is being drawn from a side direction with respect to an axis of the optical fiber. A forward scattered-light from the glass optical fiber is detected by an image sensor, to detect a hollow defect, such as an air bubble, and to monitor the air bubble in the glass optical fiber.

Figure 8:
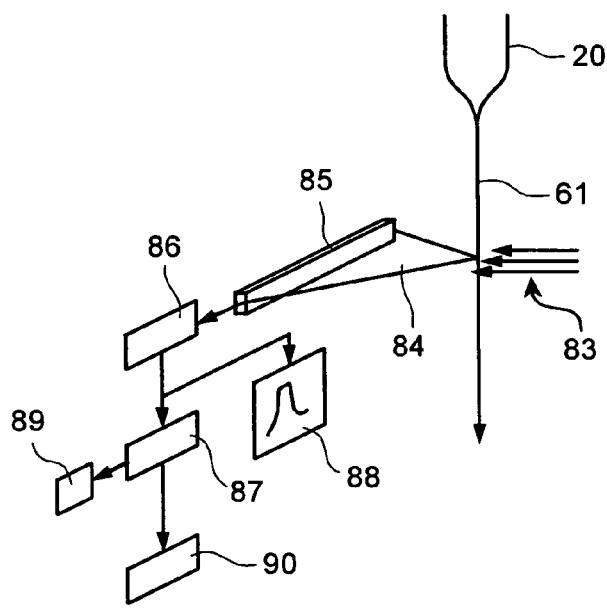
FIG. 8 is a schematic diagram of an optical-fiber defect detecting equipment.
Figure 9:
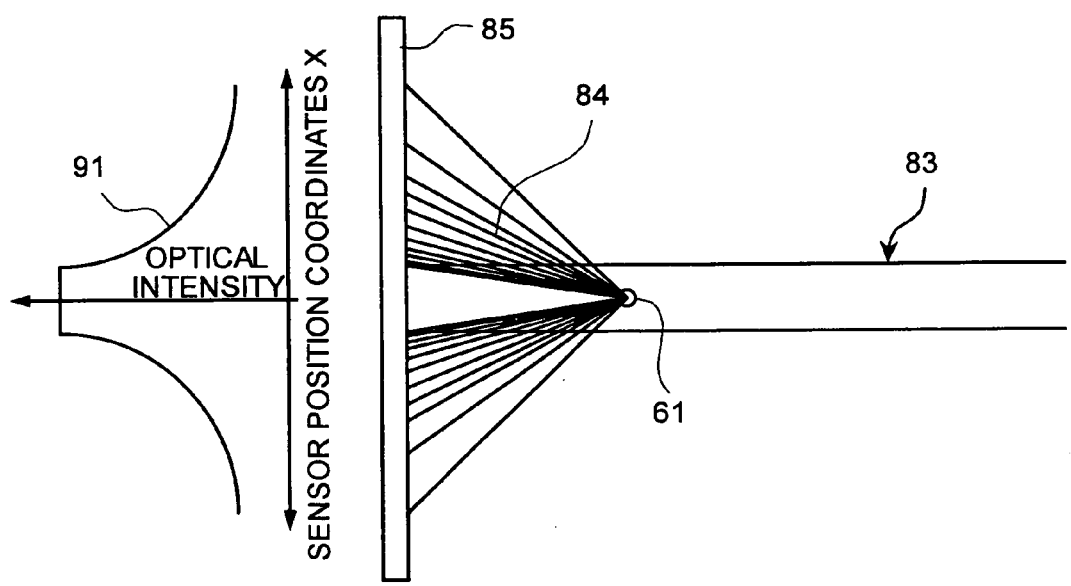
FIG. 9 is a schematic for illustrating a scattered light input to an image sensor of a transparent elongated-body defect detecting equipment and a scattered-light intensity distribution pattern obtained from the scattered light.

The air-bubble defective fraction during the drawing process is detected by using the optical-fiber defect detecting equipment shown in FIG. 8. FIG. 8 is a schematic diagram of the optical-fiber defect detecting equipment. FIG. 9 is a schematic for illustrating a scattered light input to the image sensor of a transparent elongated-body defect detecting equipment and a scattered-light intensity distribution pattern obtained from the scattered light. As shown in FIG. 8, the optical-fiber defect detecting equipment irradiates, in a row, a parallel light beam 83 on a glass optical fiber 51 that is running immediately after being drawn from the optical fiber preform, in a state of non-coating. A forward scattered-light 84 is detected by an image sensor 85, such as a charge-coupled-device (CCD) line sensor and a photo-diode array. Then, an output of the image sensor 85 is processed at a signal processing unit 86. The scattered-light intensity distribution pattern obtained from the signal processing unit 86 is determined by a determining unit 87, and a processing result of the signal processing unit 86 is displayed on a monitor unit 88. When the determining unit 87 determines that there is a defect, an alarm is issued from an alarming unit 89, and a result of determination by the determining unit 87 is recorded in a recording unit 90.

TABLE 8

| | Air-bubble defective fraction (1/km) |
|---|---|
| First embodiment example: SMF (1) | 0.001 |
| second embodiment example: SMF (2) | 0.001 |
| Third embodiment example: SMF (3) | 0.001 |
| Fourth embodiment example: SMF (4) | 0.002 |
| Fifth embodiment example: SMF (5) | 0.002 |
| First comparison example: SMF (6) | 0.01 |

TABLE 9

| | Zero-dispersion wavelength (nm) | Cut-off Wavelength (nm) | Transmission loss (dB/km) Measurement wavelength (nm) | | | MFD 1310/1550 nm (μm) | PMD 1310 nm (ps/km$^{1/2}$) |
|---|---|---|---|---|---|---|---|
| | | | 1310 | 1385 | 1550 | | |
| SMF (1) | 1312 | 1120 | 0.324 | 0.303 | 0.184 | 9.2/10.5 | 0.05 |
| SMF (2) | 1314 | 1145 | 0.325 | 0.368 | 0.185 | 9.1/10.4 | 0.03 |
| SMF (3) | 1318 | 1180 | 0.323 | 0.389 | 0.185 | 9.4/10.6 | 0.06 |
| SMF (4) | 1313 | 1157 | 0.324 | 0.294 | 0.183 | 9.0/10.3 | 0.04 |
| SMF (5) | 1311 | 1130 | 0.323 | 0.305 | 0.183 | 9.1/10.4 | 0.04 |
| SMF (6) | 1315 | 1172 | 0.323 | 0.310 | 0.184 | 9.3/10.5 | 0.03 |

As is clear from Tables 8 and 9, each of the optical fibers according to the first to the fifth embodiment examples has a cut-off wavelength $\lambda_{cc}$ equal to or less than 1310 nanometers, and a single mode operation is ensured in a wavelength range equal to or more than 1310 nanometers.

The cut-off wavelength mentioned here is a cable cut-off wavelength $\lambda_{cc}$ defined by ITU-T G.650 standard.

Furthermore, each of the optical fibers according to the first to the fifth embodiment examples has a transmission loss less than 0.40 dB/km at a wavelength of 1385 nanometers, which means that an absorption loss caused by a hydroxyl (OH) content is small enough.

In addition, a strength of each of the fibers is tested by winding the fibers around other reels while applying a tension equivalent to approximately 2% of extension with respect to a total length of the optical fiber immediately after the drawing. The result shows no breaking of the optical fibers without any problem.

As describe above, the optical fibers manufactured according to the present embodiment example do not show any problem related to a strength degradation due to a contamination from a heating furnace which is of particular concern when there is an opened air-hole or an irregularity on a surface of the translucent glass layer 9B. It is because the translucent glass layer 9B is well sintered until a level free from the opened air-hole that fetches in a contaminant on its surface, i.e., until the opened pore inside the translucent glass layer 9B becomes a closed pore.

On the other hand, in the first comparison example (SMF (6)) in which the helium gas is used in the sintering process without having an atmosphere of the dehydrating and sintering process of the porous layer 9C, although there is no problem in the transmission characteristics, the air-bubble defective fraction is relatively high. It is probably because that the atmospheric gas at the time of the dehydrating and sintering, the helium gas, is remained in the closed pores included in the translucent glass layer 9B. The helium gas passing through the glass at the time of the vitrification process continues to exist in the glass, and the residual gas pops to make a hollow in the optical fiber.

In each of the above embodiment examples, a fluorine can be doped in the cladding layer. According to a sixth embodiment example of the present invention, the translucent glass layer 9B is manufactured by performing a fluorine doping with a condition shown in Table 10 when dehydrating and sintering the core rod 7A and the porous layer 9C fabricated in the same manner as the first embodiment example.

TABLE 10

| Item | Condition | |
|---|---|---|
| Dehydrating condition | | |
| Dehydrating temperature | 1100° C. | |
| Dehydrating time | 3 hours | |
| Number of rotations of preform | 10 rotations/min | |
| Type of gas and flowing amount | Nitrogen | 10 liters/min |
|  | Chlorine | 0.5 liter/min |
| Fluorine doping condition | | |
| Fluorine doping temperature | 1250° C. | |
| Temperature raising speed | 2° C./min | |
| Fluorine doping temperature holding time | 1 hour | |
| Number of rotations of preform | 10 rotations/min | |
| Type of gas and flowing amount | Nitrogen | 10 liters/min |
|  | CF$_4$ | 0.5 liter/min |
| Sintering condition | | |
| Sintering temperature | 1350° C. | |
| Temperature raising speed | 2° C./min | |
| Sintering temperature holding time | 3 hours | |
| Furnace pressure | 100 Pa | |
| Number of rotations of preform | 10 rotations/min | |

At this stage, a density of the porous layer 9C is 95% of a density (2.2 g/cm$^3$) of the glass layer that is totally vitrified, i.e., 2.1 g/cm$^3$.

The core rod 7A surrounded with the translucent glass layer 9B in an incomplete sintering state is subjected to a thermal treatment with a condition shown in Table 2 in other zone-heating-type heating furnace, to make it into a transparent glass preform of 170 millimeters diameter. A refractive index of the fluorine-doped cladding layer is lower than a refractive index of a pure silica glass by 0.4%. Subsequent processes are performed in the same manner as other embodiment examples, a coating is conducted during the drawing process, and an optical fiber of 250 µm diameter is obtained, which has no residual air bubbles inside the optical fiber after drawing and no problem with the strength.

As the present embodiment example, it is possible to provide an area of a small refractive index in a part of the cladding layer.

According to the present invention, because a porous layer is formed by depositing a particle of a silica glass on an outer circumference of a core rod having a core layer in a rod shape, the porous layer is dehydrated under at least one condition of a decreased pressure, an ambient atmosphere with an inert gas and a halogen gas, and an ambient atmosphere with an inert gas and a halogen-based compound gas, the dehydrated porous layer is sintered under a decreased pressure until the dehydrated porous layer becomes a translucent glass layer containing a closed pore, and a vitrification process of vitrifying the translucent glass layer containing the closed pore is performed under an ambient atmosphere including an inert gas (except for a helium gas), to make the translucent glass layer into the cladding layer, a manufacturing of large-size optical fiber preform is possible in a short time, without using an expensive helium gas. Furthermore, it is possible to extend the life of manufacturing facilities with reduced manufacturing processes, resulting in a reduction of a manufacturing cost for the optical fiber.

Figure 11:
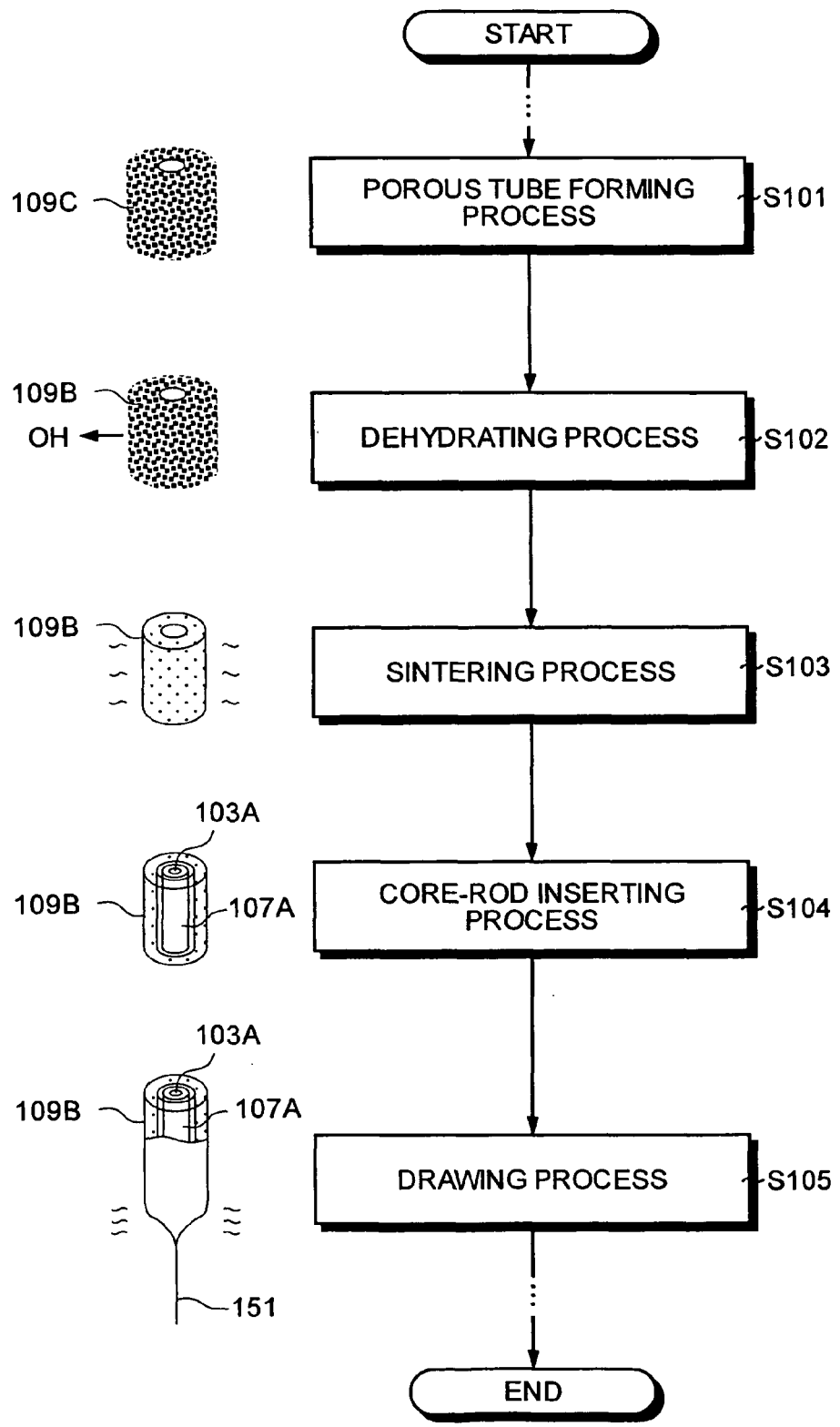
FIG. 11 is a flowchart of a processing procedure for a method of manufacturing an optical fiber, according to a second embodiment of the present invention.

FIG. 11 is a flowchart of a processing procedure for a method of manufacturing an optical fiber, according to a second embodiment of the present invention. The method of manufacturing an optical fiber preform according to the present embodiment includes a porous tube forming process (Step S101), a dehydrating process (Step S102), a sintering process (Step S103), a core-rod inserting process (Step S104), and a drawing process (Step S105).

In the porous tube forming process, a porous layer 109D (see FIG. 13) is formed by depositing a particle of a silica-based glass on an outer circumference of a mandrel 153 (see FIG. 13), and the mandrel 153 is pulled out of the porous layer 109D to make a porous tube 109C.

In the dehydrating process, the porous tube 109C is dehydrated under at least one condition of a decreased pressure, an ambient atmosphere with an inert gas and a halogen gas, and an ambient atmosphere with an inert gas and a halogen-based compound gas.

In the sintering process, the dehydrated porous tube 109C is sintered under a decreased pressure until the dehydrated porous tube 109C becomes a translucent glass cylinder 109B containing a closed pore that is substantially a vacuum.

In the core-rod inserting process, a core rod 107A made of a silica-based glass having a core layer 103A in a shape of a rod into the translucent glass cylinder 109B.

Finally, in the drawing process, a drawing is performed while heating the translucent glass cylinder 109B in which the core rod 107A is inserted, in such a manner that the core rod 107A and the translucent glass cylinder 109B are melted and integrated, and that the translucent glass cylinder 109B becomes a second cladding layer 109A of a transparent glass, to manufacture an optical fiber 151.

According to the method of manufacturing an optical fiber following the above procedures, a manufacturing of large-size optical fiber preform is possible in a short time, without using an expensive helium gas. Furthermore, it is possible to extend the life of manufacturing facilities with reduced manufacturing processes, resulting in a reduction of a manufacturing cost for the optical fiber.

Following is a detailed explanation of the present embodiment using embodiment examples. Although figures are presented to eliminate a problem of understanding the contents, the shapes shown in the figures do not necessarily tell the actual scale size. The characteristics of the optical fiber in the embodiment examples conform to a definition stipulated in ITU-T G.650 unless otherwise noted.

Figure 12:
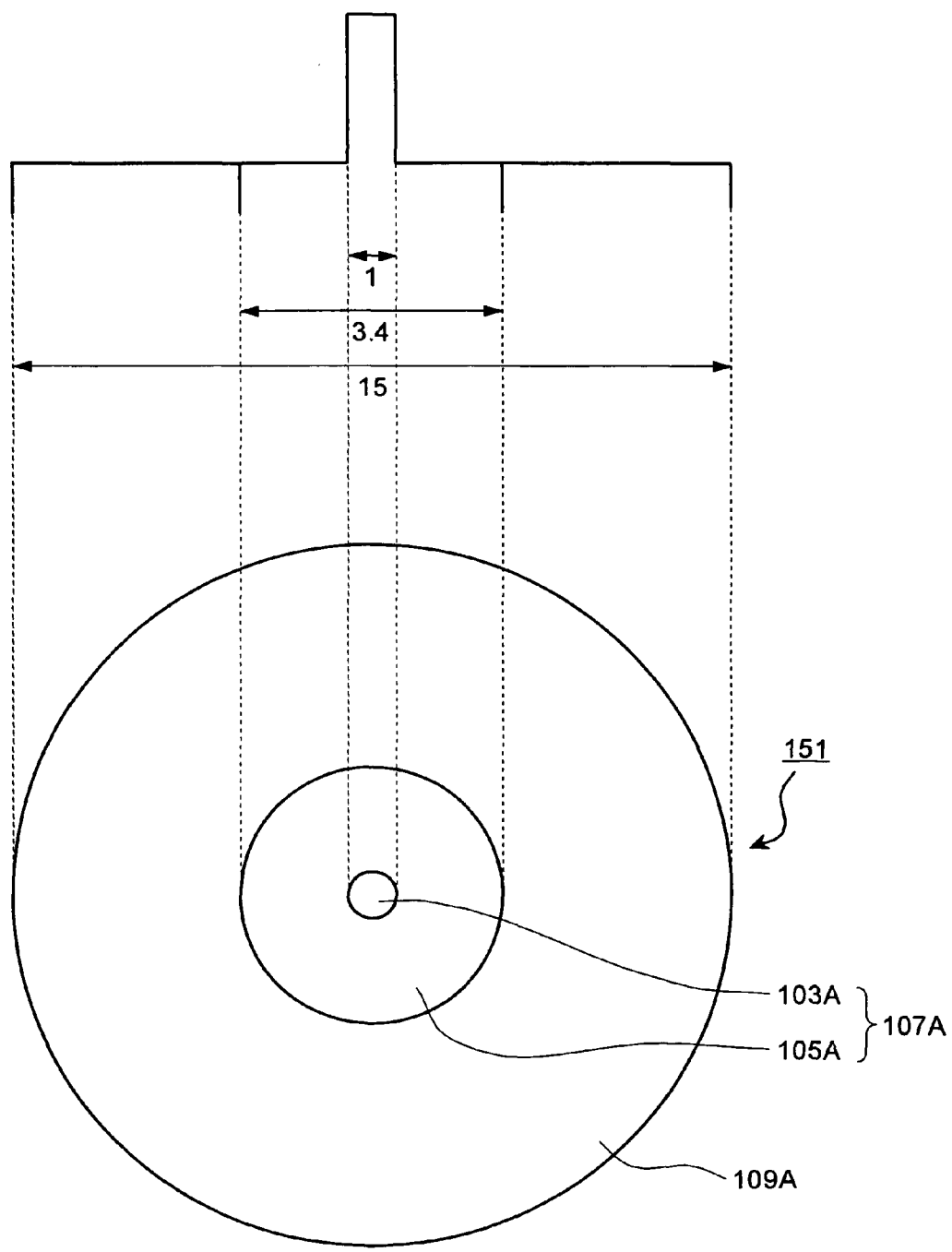
FIG. 12 is a schematic for illustrating a refractive-index profile of the optical fiber manufactured according to a seventh embodiment example of the present invention.

FIG. 12 is a schematic for illustrating a refractive-index profile of the optical fiber 151 manufactured according to a seventh embodiment example of the present invention. The optical fiber 151 shown in FIG. 12 is an SMF with a step-index-type refractive-index profile, having a zero-dispersion wavelength in a wavelength band of 1.3 µm. The optical fiber has a stack structure formed in a concentric manner in which the core layer 103A is formed along the center axis, and a first cladding layer 105A and the second cladding layer 109A are sequentially formed around the core layer 103A. A coating layer surrounding the second cladding layer 109A is omitted.

A portion including the core layer 103A and the first cladding layer 105A is corresponding to the core rod 107A. A diameter ratio between the core layer 103A and the first cladding layer 105A (hereinafter, "cladding/core ratio") is 3.4/1. A diameter of the core layer 103A in the present embodiment example is a diameter of a portion in which a refractive index difference of the core layer 103A to the first cladding layer 105A is a half of the maximum refractive index difference.

According to the present embodiment example, a core soot 107B that becomes the core rod 107A is fabricated by using the VAD method shown in FIG. 3, in the same manner as the first embodiment example.

Subsequently, a dehydrating process and a sintering process are performed on the core soot 107B. These processes are the same as the conventional processes without having a special feature. With the dehydrating process and the sintering process, the core soot 107B is made into a transparent glass, and becomes the core rod 107A including the core layer 103A and the first cladding layer 105A.

The core rod 107A including the core layer 103A and the first cladding layer 105A made into the transparent glass is heated and elongated in the vertical-type electric-furnace elongating equipment 41 shown in FIG. 4 to make a rod of 35 millimeters diameter.

A heating source used at the heating and elongating process is not limited to the heating furnace 42. An oxyhydrogen flame or a plasma flame can also be used for the heating source. When a contamination of the hydroxyl (OH) is a problem, the oxyhydrogen flame is not desirable in general, and it is preferable to use an electric furnace or the plasma flame. However, if the cladding/core ratio is about four times, the oxyhydrogen flame does not cause a serious problem.

Figure 13:
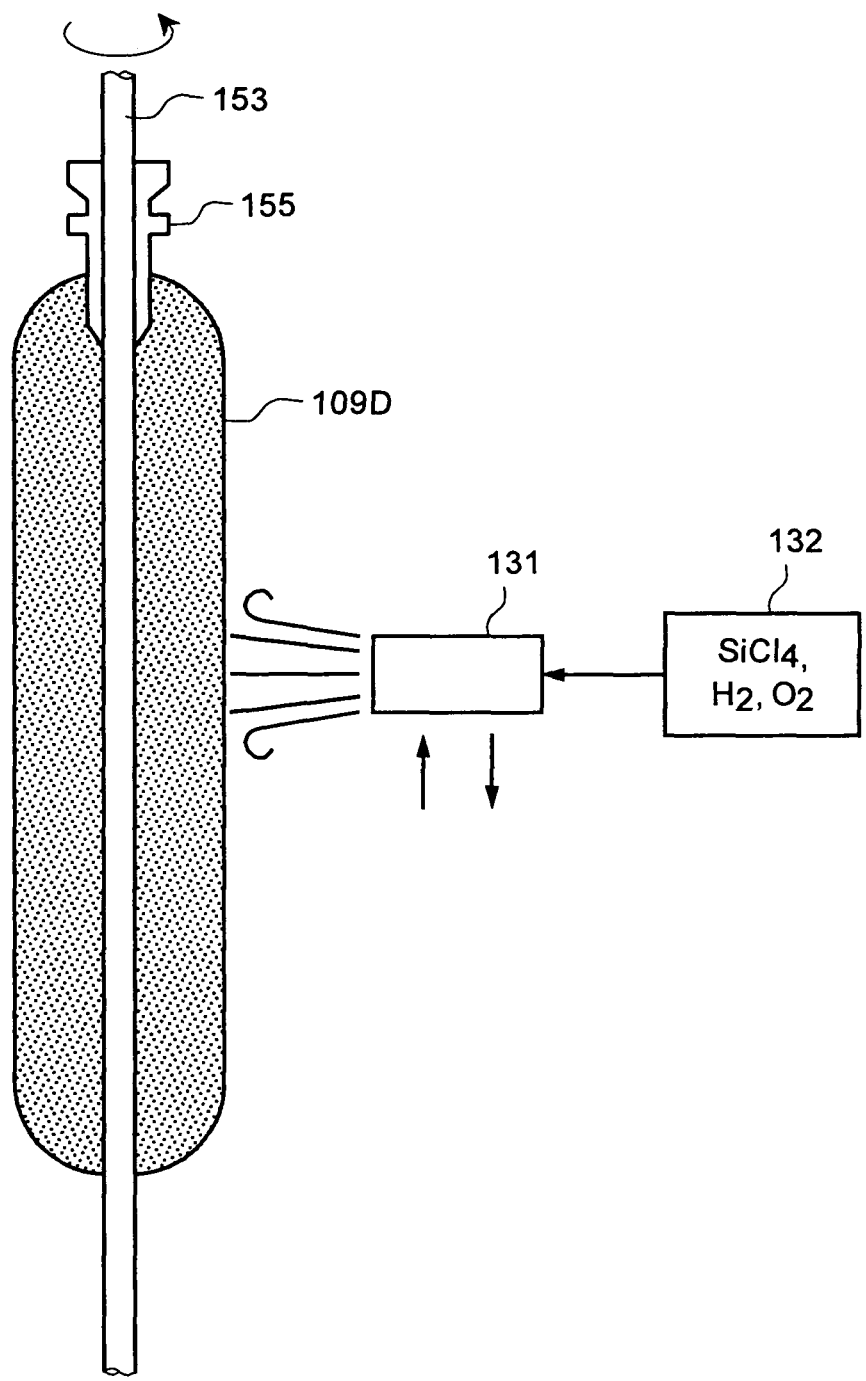
FIG. 13 is a longitudinal cross-section of a portion of the porous layer for explaining a formation of the porous layer by the OVD method.

The porous tube 109C of 300 millimeters diameter is fabricated by inserting the mandrel 153 of 36 millimeters diameter made of a highly-pure aluminum or a highly-pure carbon into a tubular handle 155 made of a silica glass, and depositing a particle of a silica-based glass on an outer circumference of the mandrel 153 by using the OVD method shown in FIG. 13. The porous tube 109C is a portion that is made into the translucent glass cylinder 109B at a subsequent process, and finally becomes the second cladding layer 109A that is made into a transparent glass.

FIG. 13 is a longitudinal cross-section of a portion of the porous tube 109D for explaining a formation of the porous layer 109D by the OVD method. In the OVD method, a gas 132 consisting of vaporized silicon tetrachloride ($SiCl_4$), oxygen ($O_2$), and hydrogen ($H_2$) is provided and burned through a burner 131. The gas 132 is hydrolyzed in a flame to obtain a particle of a synthesized glass. The particle of the synthesized glass is blown to the mandrel 153 that is rotating so that the particle is deposited around the mandrel 153. Because a thickness of a particle layer that is deposited at one time is not thick enough, the process is repeated by moving the burner 131 back and forth until the porous layer 109D of an enough width is obtained.

At this moment, an average density of the porous layer 109D (i.e., a value obtained by dividing a weight of the porous layer 109D that is a result of subtracting a weight of the mandrel 153 from a total weight by a volume of the porous layer 109D that is a result of subtracting a volume of the mandrel 153 from a total volume) is approximately 0.7 g/cm³. The mandrel 153 is pulled out of the porous layer 109D formed with a predetermined width, and the porous tube 109C is fabricated, in which a through-hole is formed on a center axis.

Figure 14:
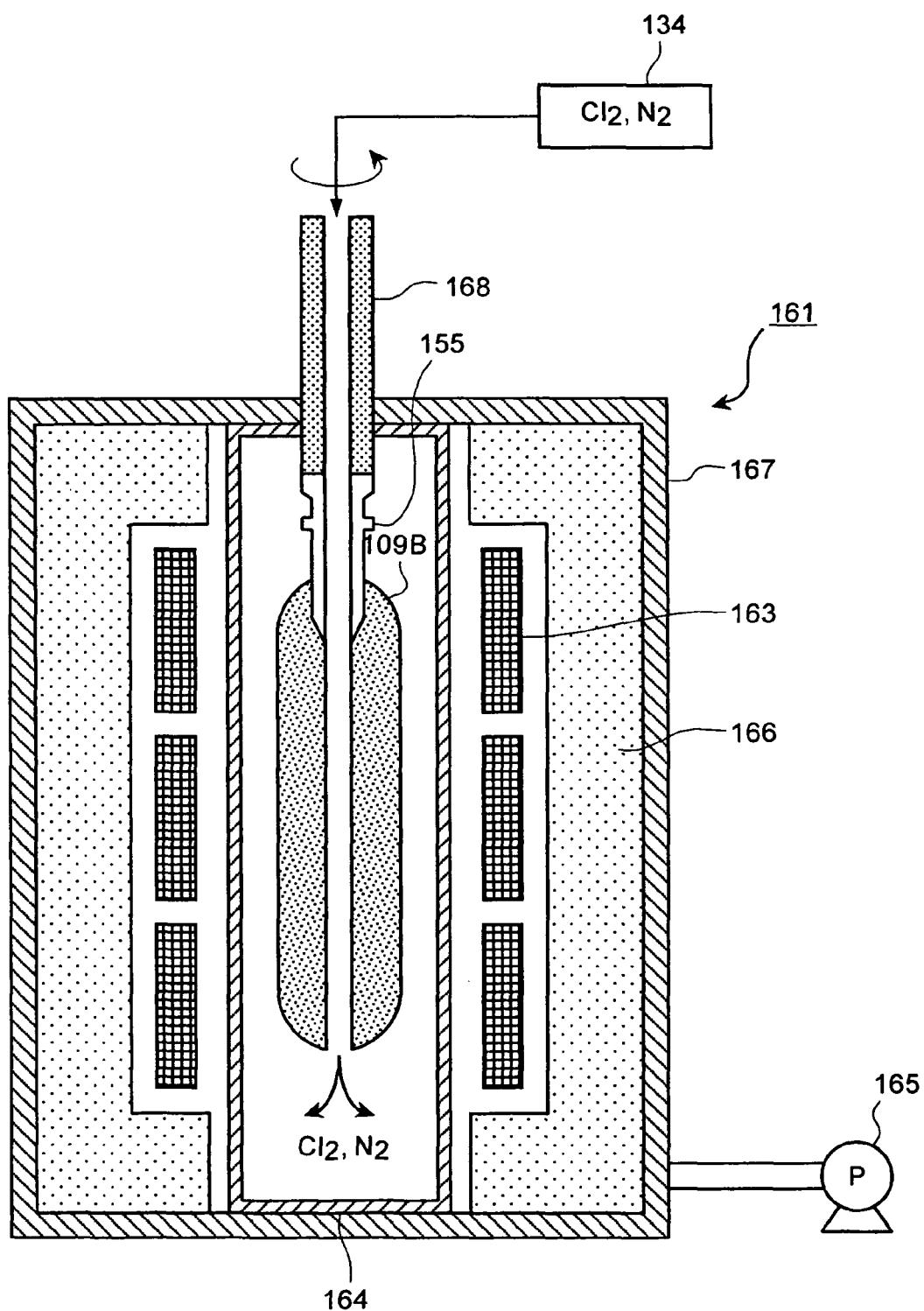
FIG. 14 is a longitudinal cross-section of a dehydrating/sintering furnace used for making a porous tube into a translucent glass cylinder in the dehydrating process and the sintering process.

The porous tube 109C is then dehydrated and sintered in a dehydrating/sintering furnace 161 shown in FIG. 14 under a condition shown in Table 11, to make the porous tube 109C into the translucent glass cylinder 109B of which the inside includes a closed pore that is substantially a vacuum.

TABLE 11

| Item | | Condition |
| --- | --- | --- |
| Dehydrating condition | | |
| Dehydrating temperature | | 1100° C. |
| Dehydrating time | | 3 hours |
| Number of rotations of preform | | 10 rotations/min |
| Type of gas and flowing amount | Nitrogen | 10 liters/min |
| | Chlorine | 0.5 liter/min |
| Sintering condition | | |
| Sintering temperature | | 1400° C. |
| Temperature raising speed | | 2° C./min |
| Sintering temperature holding time | | 3 hours |
| Furnace pressure | | 100 Pa |
| Number of rotations of preform | | 10 rotations/min |

FIG. 14 is a longitudinal cross-section of the dehydrating/sintering furnace 161 used for making the porous tube 109C into the translucent glass cylinder 109B in the dehydrating process and the sintering process. The dehydrating/sintering furnace 161 includes a silica muffle tube 162 that is a container with a sealing function made of a silica glass, a ring-shaped heater 163 formed with a plurality of heat generating elements disposed around the silica muffle tube 162, a furnace unit 167 that forms an exterior of the dehydrating/sintering furnace 161, surrounding whole of the silica muffle tube 162 and the heater 163, and a heat-insulating member 166 that is filled in a space between the silica muffle tube 162, the heater 163, and the furnace unit 167.

The porous tube 109C is set in the silica muffle tube 162. A gas 134 consisting of a chlorine gas (Cl2) and a nitrogen gas (N2) is introduced into the silica muffle tube 162 from a gas inlet 168 that is connected to the handle 155 that supports the porous tube 109C, and an appropriate amount of gas is drained from a gas outlet (not shown), so that a pressure inside the silica muffle tube 162 is maintained constant. A vacuum pump 165 is connected to the silica muffle tube 162, and in the sintering process, the inside pressure of the silica muffle tube 162 is decreased by using the vacuum pump 165. The porous tube 109C is subjected to the dehydrating process and the sintering process in the silica muffle tube 162, and made into the translucent glass cylinder 109B including a closed pore that is substantially a vacuum.

At the stage in which the dehydrating process and the sintering process are completed, the translucent glass cylinder 109B includes a closed pore that is physically isolated from a circumferential atmosphere. In the present embodiment example, this state is referred to as a "state of a translucent glass". In the state of a translucent glass, the closed pore that is an air bubble physically isolated from the circumferential atmosphere is included with a virtually even distribution as a whole, so that it looks opaque whitish. However, a surface of the translucent glass cylinder 109B is smooth and glossy. At this stage, a density of the translucent glass cylinder 109B is 95% of a density (2.2 g/cm$^3$) of the second cladding layer 109A that is finally made into a transparent glass, i.e., 2.09 g/cm$^3$.

In a conventional method of making a porous layer into a totally transparent glass, the porous layer is dehydrated enough by heating it with a temperature equal to or lower than 1200° C. with which the sintering is not progressed, and then a vitrification of the porous layer is performed under a condition of a high temperature. In other words, two stages of processes are required for the vitrification of the porous layer. In addition, an expensive helium gas is required for the conventional method, and a heating energy cost and a facility maintaining cost become high.

For this reason, a method of performing the sintering process in a temperature range with which an incomplete sintering state is realized in a decreased pressure after the dehydrating process is introduced in the present embodiment example. In the sintering process for a glass porous layer, a coupling between the particles is increased by heating, and opened pores are decreased so that the density becomes high. Finally the glass porous layer is made into a transparent glass free of the air bubble.

Although a progressing speed of the sintering is changed depending on the conditions, such as temperature and time, and particle diameter and composition of the glass particles, the sintering is easily progressed on a surface of the porous layer. As a result of sintering the porous tube 109C by changing the temperature and the heating time, to make the porous tube 109C into the state having the closed pore substantially isolated from the circumferential atmosphere, it is found that an average density should be equal to or more than 1.8 g/cm$^3$, or preferably, equal to or more than 2.0 g/cm$^3$.

Figure 15:
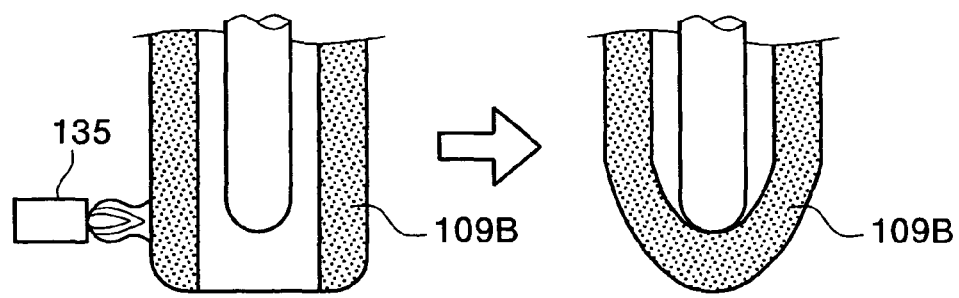
FIG. 15 is a schematic for illustrating a sealing of an edge of the translucent glass cylinder on a drawing direction by melting the edge of the translucent glass cylinder using a oxyhydrogen flame radiated from a burner.

The core rod 107A is then inserted into the translucent glass cylinder 109B. Upon completing the insertion of the core rod 107A, an edge portion of the translucent glass cylinder 109B on a side of a drawing direction is melted and integrated by an oxyhydrogen flame radiated from a burner 135, to seal the edge portion of the translucent glass cylinder 109B, and at the same time, the edge portion of the translucent glass cylinder 109B and an edge portion of the core rod 107A are melted and integrated, as shown in FIG. 15. The purpose of performing this process is as follows. If the translucent glass cylinder 109B is sealed in the drawing furnace, the translucent glass cylinder 109B fetches in the contaminants included in the atmosphere of the drawing furnace, causing a contamination on an inner surface of the core rod 107A and a surface of the translucent glass cylinder 109B. Therefore, the sealing of the translucent glass cylinder 109B is performed before inserting the translucent glass cylinder 109B into the drawing furnace. In addition, if the edge portion of the translucent glass cylinder 109B and an edge portion of the core rod 107A are melted and integrated, it is possible to reduce the time for transferring to a steady state from a start of the drawing.

Although a radiation of an oxyhydrogen flame is used as a method of heating the edge portion of the translucent glass cylinder 109B in the present embodiment example, a radiation of a flame of a flammable gas such as a methane gas, a radiation of a plasma flame, or a heating by an electric furnace can also be used.

Figure 16:
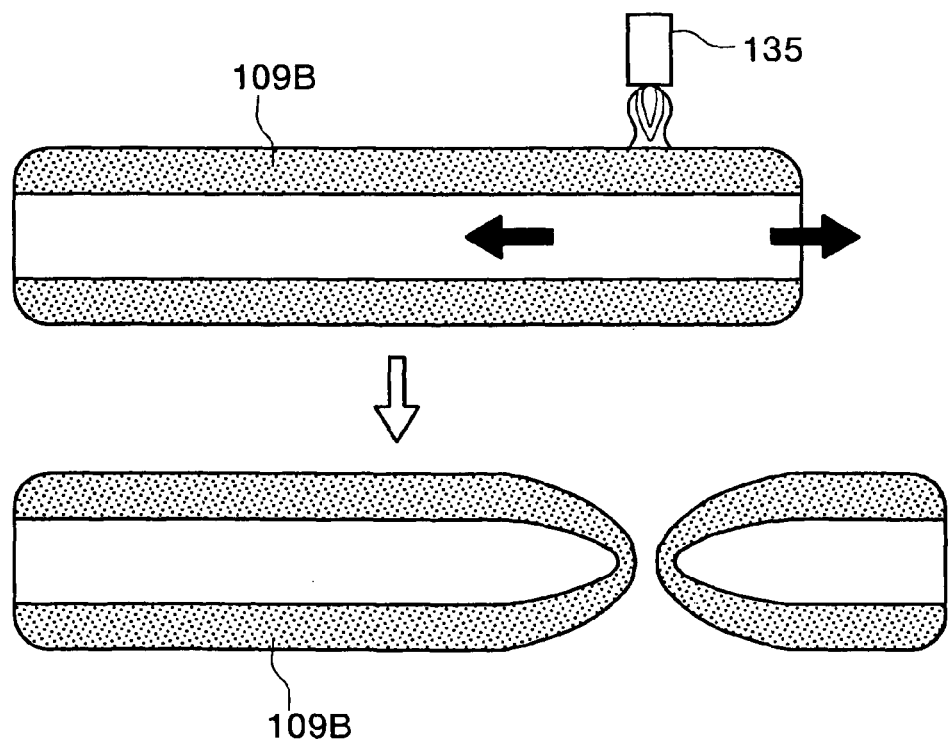
FIG. 16 is a schematic for illustrating a sealing of an edge of the translucent glass cylinder on a drawing direction by melting the edge of the translucent glass cylinder before inserting a core rod.

Furthermore, instead of sealing the edge portion of the translucent glass cylinder 109B after inserting the core rod 107A, the translucent glass cylinder 109B can be sealed by melting down the edge portion of the translucent glass cylinder 109B on the side of the drawing direction before inserting the core rod 107A, as shown in FIG. 16. By doing this, it is possible to prevent a contamination of an impurity in the same manner as the method shown in FIG. 15. When melting down the translucent glass cylinder 109B, as shown in FIG. 16, a tension is applied to the translucent glass cylinder 109B in a direction indicated by black arrows while the translucent glass cylinder 109B is heated by the oxyhydrogen flame radiated from the burner 135.

According to a eighth embodiment example of the present invention, the porous tube 109C having a hollow on the center axis, fabricated by the same method used in the seventh embodiment example, is dehydrated and sintered under a condition shown in Table 12, to fabricate the translucent glass cylinder 109B including a closed pore that is substantially a vacuum.

TABLE 12

| Item | Condition |
|---|---|
| Dehydrating condition | |
| Dehydrating temperature | 1100° C. |
| Dehydrating time | 3 hours |
| Furnace pressure | 100 Pa |
| Number of rotations of preform | 10 rotations/min |
| Sintering condition | |
| Sintering temperature | 1400° C. |
| Temperature raising speed | 2° C./min |
| Sintering temperature holding time | 3 hours |
| Furnace pressure | 100 Pa |
| Number of rotations of preform | 10 rotations/min |

At this stage, a density of the porous tube 109C is 95% of a density (2.2 g/cm$^3$) of a glass layer that is totally vitrified, i.e., 2.1 g/cm$^3$. Then, the core rod 107A is inserted into the translucent glass cylinder 109B, the edge portion on a side of the drawing direction is heated and sealed, and the whole shape becomes a state shown in FIG. 15.

According to a ninth embodiment example of the present invention, the porous tube 109C having a hollow on the center axis, fabricated by the same method used in the seventh embodiment example, is dehydrated and sintered under a condition shown in Table 13, to fabricate the translucent glass cylinder 109B including a closed pore that is substantially a vacuum.

TABLE 13

| Item | Condition |
|---|---|
| Dehydrating condition | |
| Dehydrating temperature | 1100° C. |
| Dehydrating time | 3 hours |
| Furnace pressure | 100 Pa |
| Number of rotations of preform | 10 rotations/min |
| Sintering condition | |
| Sintering temperature | 1350° C. |
| Temperature raising speed | 2° C./min |

TABLE 13-continued

| Item | Condition |
| --- | --- |
| Sintering temperature holding time | 4 hours |
| Furnace pressure | 100 Pa |
| Number of rotations of preform | 10 rotations/min |

At this stage, a density of the porous tube 109C is 91% of a density (2.2 g/cm$^3$) of a glass layer that is totally vitrified, i.e., 2.0 g/cm$^3$. Then, the core rod 107A is inserted into the translucent glass cylinder 109B, the edge portion on a side of the drawing direction is heated and sealed, and the whole shape becomes a state shown in FIG. 15.

According to a tenth embodiment example of the present invention, the porous tube 109C having a hollow on the center axis, fabricated by the same method used in the seventh embodiment example, is dehydrated and sintered under a condition shown in Table 14, to fabricate the translucent glass cylinder 109B including a closed pore that is substantially a vacuum.

TABLE 14

| Item | | Condition |
| --- | --- | --- |
| Dehydrating condition | | |
| Dehydrating temperature | | 1100° C. |
| Dehydrating time | | 3 hours |
| Number of rotations of preform | | 10 rotations/min |
| Type of gas and flowing amount | Nitrogen | 10 liters/min |
| | Chlorine | 0.5 liter/min |
| Sintering condition | | |
| Sintering temperature | | 1350° C. |
| Temperature raising speed | | 2° C./min |
| Sintering temperature holding time | | 3 hours |
| Furnace pressure | | 100 Pa |
| Number of rotations of preform | | 10 rotations/min |

At this stage, a density of the porous tube 109C is 82% of a density (2.2 g/cm$^3$) of a glass layer that is totally vitrified, i.e., 1.8 g/cm$^3$. Then, the core rod 107A is inserted into the translucent glass cylinder 109B, the edge portion on a side of the drawing direction is heated and sealed, and the whole shape becomes a state shown in FIG. 15.

According to a second comparison example, the porous tube 109C having a hollow on the center axis, fabricated by the same method used in the seventh embodiment example, is dehydrated and sintered under a condition shown in Table 15, to fabricate the translucent glass cylinder 109B including a closed pore that is substantially a vacuum.

TABLE 15

| Item | | Condition |
| --- | --- | --- |
| Dehydrating condition | | |
| Dehydrating temperature | | 1100° C. |
| Dehydrating time | | 3 hours |
| Number of rotations of preform | | 10 rotations/min |
| Type of gas and flowing amount | Nitrogen | 10 liters/min |
| | Chlorine | 0.5 liter/min |
| Sintering condition | | |
| Sintering temperature | | 1400° C. |
| Temperature raising speed | | 2° C./min |

TABLE 15-continued

| Item | | Condition |
| --- | --- | --- |
| Sintering temperature holding time | | 3 hours |
| Number of rotations of preform | | 10 rotations/min |
| Type of gas and flowing amount | Helium | 10 liters/min |
| | Chlorine | 0.5 liter/min |

At this stage, a density of the porous tube 109C is 95% of a density (2.2 g/cm$^3$) of a glass layer that is totally vitrified, i.e., 2.1 g/cm$^3$. Then, the core rod 107A is inserted into the translucent glass cylinder 109B, the edge portion on a side of the drawing direction is heated and sealed, and the whole shape becomes a state shown in FIG. 15.

The core rod 107A and the translucent glass cylinder 109B fabricated in the seventh to the tenth embodiment examples and the second comparison example are inserted into a heating furnace (hereinafter, "drawing furnace") of a drawing equipment from the sealed portion. Then, a translucent glass layer is made into a transparent glass while maintaining a state of a decreased pressure in a space between the core rod 107A and a translucent glass cylinder, and a glass optical fiber of 125 µm outer-diameter is drawn while melting and integrating the core rod 107A and the translucent glass cylinder 109B. The state of the decreased pressure is realized by connecting a vacuum pump on an opening side of the handle 155 made of a silica glass connected to the translucent glass cylinder 109B, and sucking by the vacuum pump. The pressure in this case is approximately 100 Pa.

When performing the drawing process, two layers of ultraviolet (UV) cure resin coatings are conducted on an outer surface of the glass optical fiber. The optical fiber is wound around a reel via a winding capstan after curing the resin by irradiating ultra-violet light. The inner-side coating is referred to as a primary layer, and the outer-side coating is referred to as a secondary layer. A material for the coating is selected with criteria that the Young's modulus of the primary layer is small and the Young's modulus of the secondary layer is large. The drawing speed according to the present embodiment example is 2000 m/min.

A result of measuring an air-bubble defective fraction during the drawing and transmission characteristics of the optical fiber for the SMFs manufactured under the above conditions is shown in Tables 16 and 17.

The air-bubble defective fraction during the drawing process is detected by using the optical-fiber defect detecting equipment shown in FIG. 8.

TABLE 16

| | Air-bubble defective fraction (1/km) |
| --- | --- |
| Seventh embodiment example: SMF (7) | 0.001 |
| Eighth embodiment example: SMF (8) | 0.001 |
| Ninth embodiment example: SMF (9) | 0.001 |
| Tenth embodiment example: SMF (10) | 0.002 |
| Second comparison example: SMF (11) | 0.01 |

TABLE 17

|  | Zero-dispersion wavelength (nm) | Cut-off Wavelength (nm) | Transmission loss (dB/km) Measurement wavelength (nm) | | | MFD 1310/1550 nm (μm) | PMD 1310 nm (ps/km$^{1/2}$) |
| --- | --- | --- | --- | --- | --- | --- | --- |
|  |  |  | 1310 | 1385 | 1550 |  |  |
| SMF (7) | 1311 | 1180 | 0.323 | 0.297 | 0.183 | 9.4/10.6 | 0.06 |
| SMF (8) | 1314 | 1132 | 0.325 | 0.392 | 0.185 | 9.2/10.4 | 0.04 |
| SMF (9) | 1317 | 1162 | 0.325 | 0.376 | 0.185 | 9.1/10.3 | 0.05 |
| SMF (10) | 1312 | 1176 | 0.324 | 0.304 | 0.184 | 9.3/10.5 | 0.03 |
| SMF (11) | 1315 | 1155 | 0.324 | 0.310 | 0.185 | 9.0/10.4 | 0.03 |

Each of the optical fibers according to the present embodiment examples has a cut-off wavelength $\lambda_{cc}$ equal to or less than 1310 nanometers, and a single mode operation is ensured in a wavelength range equal to or more than 1310 nanometers.

The cut-off wavelength mentioned here is a cable cut-off wavelength $\lambda_{cc}$ defined by ITU-T G.650 standard.

Furthermore, each of the optical fibers according to the present embodiment examples has a transmission loss less than 0.40 dB/km at a wavelength of 1385 nanometers, which means that an absorption loss caused by a hydroxyl (OH) content is small enough.

In addition, a strength of each of the fibers is tested by winding the fibers around other reels while applying a tension equivalent to approximately 2% of extension with respect to a total length of the optical fiber immediately after the drawing. The result shows no breaking of the optical fibers without any problem.

As describe above, the optical fibers manufactured according to the present embodiment example do not show any problem related to a strength degradation due to a contamination from a heating furnace which is of particular concern when there is an opened air-hole or an irregularity on a surface of the translucent glass cylinder 109B. It is because the translucent glass cylinder 109B is well sintered until a level free from the opened air-hole that fetches in a contaminant on its surface, i.e., until the opened pore inside the translucent glass layer 9B becomes a closed pore.

On the other hand, in the second comparison example (SMF (11)) in which the helium gas is used in the sintering process without having a decreased pressure atmosphere of the dehydrating and sintering process of the porous tube 109C, although there is no problem in the transmission characteristics, the air-bubble defective fraction is relatively high. It is probably because that the atmospheric gas at the time of the dehydrating and sintering, the helium gas, is remained in the closed pores included in the translucent glass cylinder 109B. The helium gas passing through the glass at the time of the vitrification process continues to exist in the glass, and the residual gas pops to make a hollow in the optical fiber.

According to an Eleventh embodiment example of the present invention, a fluorine is doped in the translucent glass cylinder 109B. A fluorine doping is performed under a condition shown in Table 18 when dehydrating and sintering the porous tube 109C having a hollow on the center axis, fabricated by the same method used in the seventh embodiment example, to fabricate the translucent glass cylinder 109B including a closed pore that is substantially a vacuum.

TABLE 18

| Item | Condition |
| --- | --- |
| Dehydrating condition | |
| Dehydrating temperature | 1100° C. |
| Dehydrating time | 3 hours |
| Number of rotations of preform | 10 rotations/min |

TABLE 18-continued

| Item | Condition | |
| --- | --- | --- |
| Type of gas and flowing amount | Nitrogen | 10 liters/min |
|  | Chlorine | 0.5 liter/min |
| Fluorine doping condition | | |
| Fluorine doping temperature | | 1250° C. |
| Temperature raising speed | | 5° C./min |
| Fluorine doping temperature holding time | | 1 hour |
| Number of rotations of preform | | 10 rotations/min |
| Type of gas and flowing amount | Nitrogen | 10 liters/min |
|  | CF$_4$ | 0.5 liter/min |
| Sintering condition | | |
| Sintering temperature | | 1350° C. |
| Temperature raising speed | | 2° C./min |
| Sintering temperature holding time | | 3 hours |
| Furnace pressure | | 100 Pa |
| Number of rotations of preform | | 10 rotations/min |

At this stage, a density of the porous tube 109C is 95% of a density (2.2 g/cm³) of the glass layer that is totally vitrified, i.e., 2.1 g/cm³.

The core rod 107A is inserted into the translucent glass cylinder 109B, as other embodiment examples, the edge portion on a side of the drawing direction is heated and sealed. After that, the core rod 107A and the translucent glass cylinder 109B are inserted into the drawing furnace from the sealed portion. Then, the translucent glass cylinder 109B is made into a transparent glass while maintaining a state of a decreased pressure in a space between the core rod 107A and a translucent glass cylinder, and the glass optical fiber 151 of 125 μm outer-diameter is drawn while melting and integrating the core rod 107A and the translucent glass cylinder 109B. A coating is conducted during the drawing process, and an optical fiber of 250 μm diameter is obtained, which has no residual air bubbles inside the optical fiber after drawing and no problem with the strength. A refractive index of the fluorine-doped cladding layer is lower than a refractive index of a pure silica glass by 0.4%. As the present embodiment example, it is possible to provide an area of a small refractive index in a part of the cladding layer.

The method of manufacturing the optical fiber according to the present invention has a big advantage in application to manufacturing an optical fiber including a core layer and a cladding layer with a variety of refractive-index profilers and characteristics, and is particularly suitable for manufacturing an optical fiber suitable for a broadband WDM transmission with a low transmission loss, such as an SMF.

According to the present invention, a porous tube is dehydrated under at least one condition of a decreased pressure, an ambient atmosphere with an inert gas and a halogen gas, and an ambient atmosphere with an inert gas and a halogen-based compound gas, and the dehydrated porous tube is sintered under a decreased pressure until the porous tube becomes a translucent glass cylinder containing a closed pore. Furthermore, a core rod made of a silica-based glass having a core layer in a shape of a rod into the translucent glass cylinder. An optical fiber is manufactured by drawing while heating the translucent glass cylinder, in which the core rod is inserted, in such a manner that the core rod and the translucent glass cylinder are melted and integrated, and that the translucent glass cylinder becomes a cladding layer of a transparent glass. Therefore, a manufacturing of large-size optical fiber preform is possible in a short time, without using an expensive helium gas. Furthermore, it is possible to extend the life of manufacturing facilities with reduced manufacturing processes, resulting in a reduction of a manufacturing cost for the optical fiber.

Figure 17:
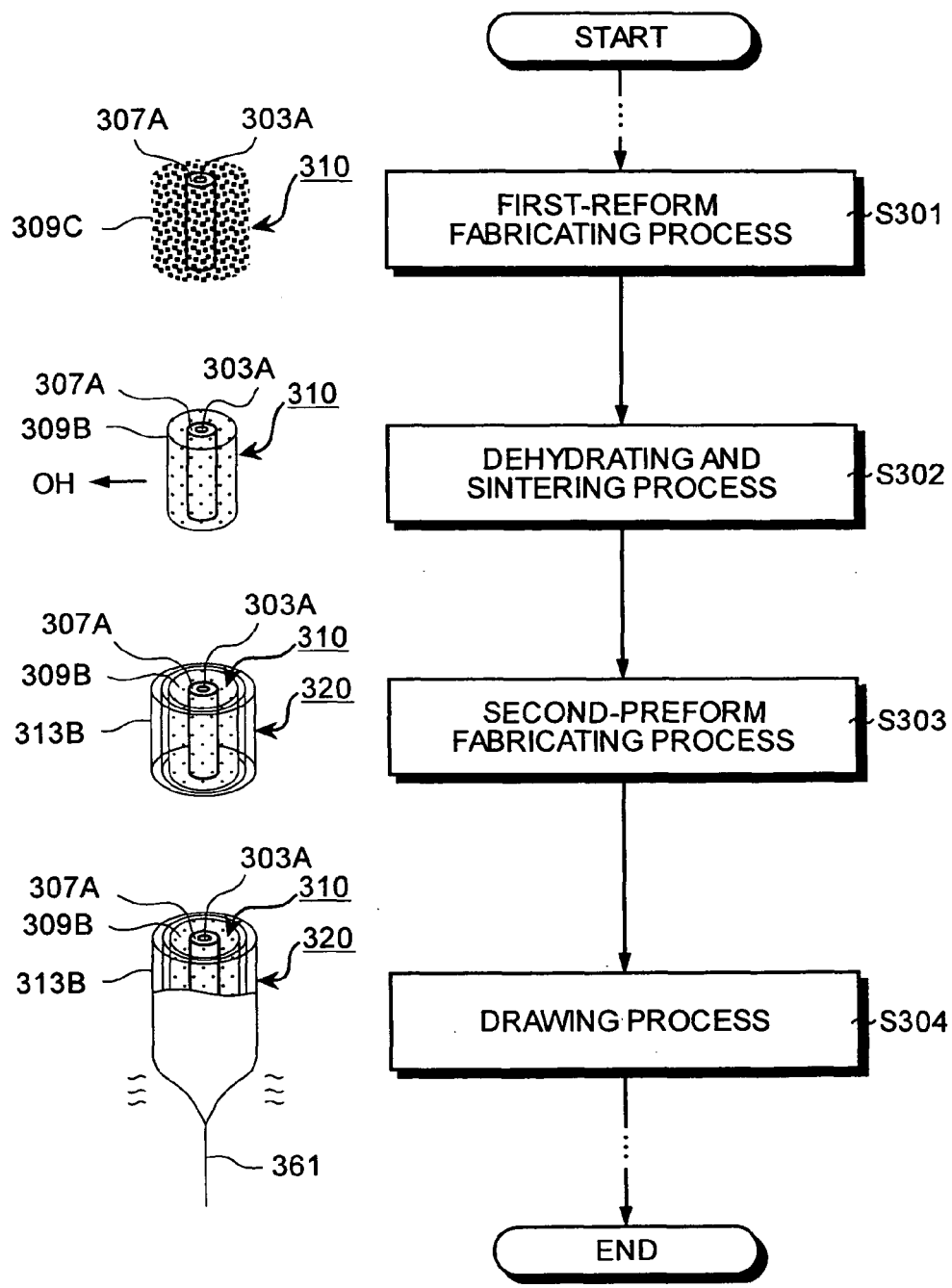
FIG. 17 is a flowchart of a processing procedure for a method of manufacturing an optical fiber, according to a third embodiment of the present invention.

FIG. 17 is a flowchart of a processing procedure for a method of manufacturing an optical fiber, according to a third embodiment of the present invention. The method of manufacturing an optical fiber preform according to the present embodiment includes a first-preform fabricating process (Step S301), a dehydrating and sintering process (Step S302), a second-preform fabricating process (Step S303), and a drawing process (Step S304).

In the first-preform fabricating process, a first preform 310 is fabricated by forming a porous layer 309C by depositing a particle of a silica-based glass on an outer circumference of a core rod 307A made of a silica-based glass having a core layer 303A in a shape of a rod.

In the dehydrating and sintering process, the first preform 310 is dehydrated and sintered by placing the first preform 310 in a dehydrating/sintering furnace. The dehydrating and sintering process sinters the porous layer 309C under a predetermined condition until the porous layer 309C becomes a translucent glass layer 309B in a state of a translucent glass containing a closed pore. In other word, the dehydrating and sintering process does not make the porous layer 309C completely vitrified.

In the second-preform fabricating process, a second preform 320 is fabricated by inserting the first preform on which the dehydrating and sintering process is performed into a jacket tube 313B that is a glass tube.

Finally, in the drawing process, a drawing is performed, while heating the second preform 320, in such a manner that the translucent glass layer 309B and the jacket tube 313B are melted and integrated, and that the translucent glass layer 309B becomes a second cladding layer 309A of a transparent glass, to manufacture an optical fiber 351.

In the method of manufacturing an optical fiber according to the present embodiment, the optical fiber 351 is manufactured by the above procedures, making use of the conventional OVD equipment. Because the core rod 307A having a thick outer diameter, it is possible to enhance an efficiency of depositing the glass particle. Furthermore, because a usage ratio of the jacket tube 313B that is rather expensive in the cladding layer can be reduced, it is possible to reduce a manufacturing cost, compared to the conventional RIT method. In addition, the drawing is performed by inserting the first preform 310 into the jacket tube 313B, even when there is an opened air-hole or an irregularity on a surface of the translucent glass layer 309B, it does not cause any problem related to a strength degradation due to a contamination from a heating furnace.

Following is a detailed explanation of the present embodiment using embodiment examples. Although figures are presented to eliminate a problem of understanding the contents, the shapes shown in the figures do not necessarily tell the actual scale size. The characteristics of the optical fiber in the embodiment examples conform to a definition stipulated in ITU-T G.650 unless otherwise noted.

Figure 18:
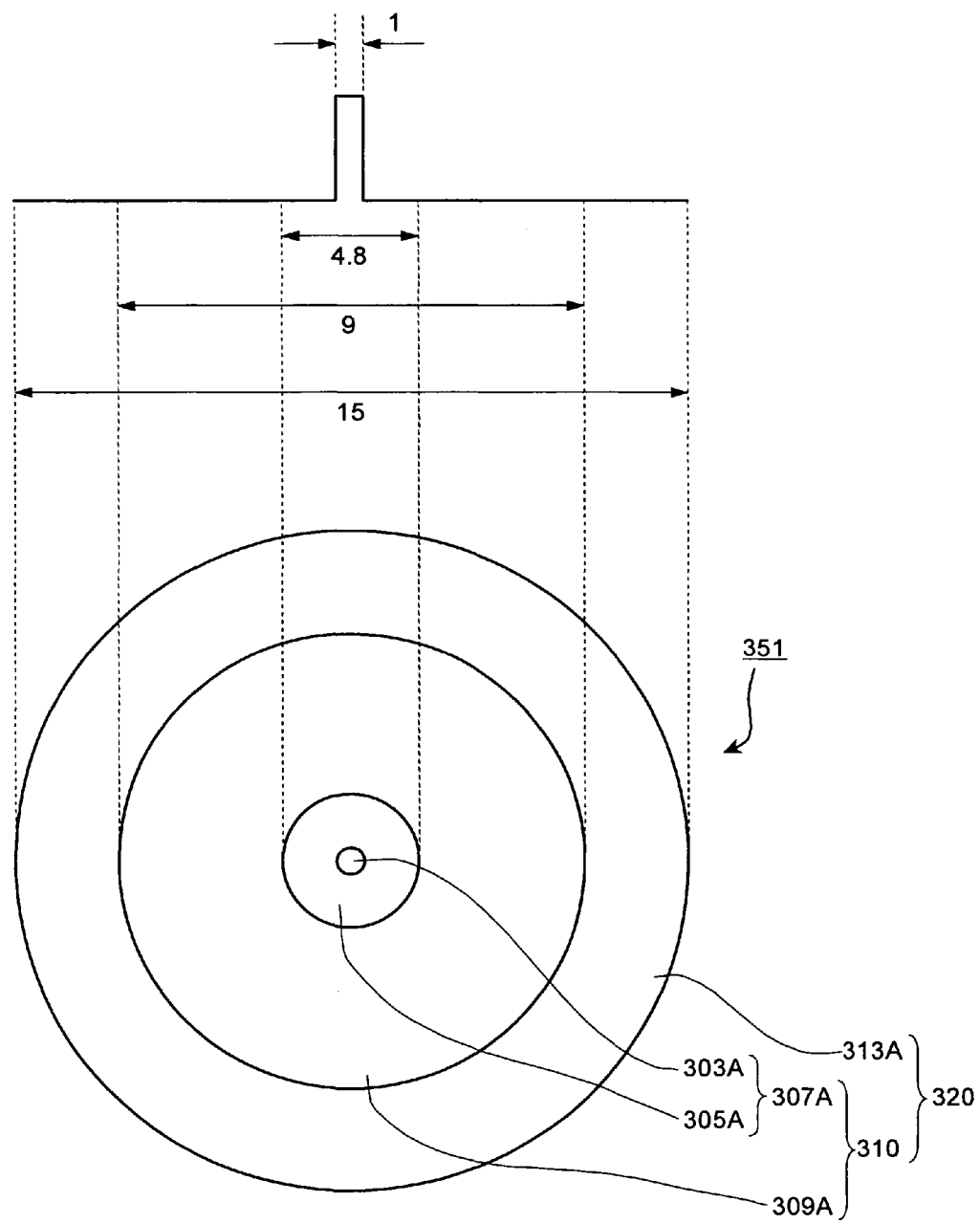
FIG. 18 is a schematic for illustrating a refractive-index profile of the optical fiber manufactured according to a twelfth embodiment example of the present invention.

FIG. 18 is a schematic for illustrating a refractive-index profile of the optical fiber 351 manufactured according to a twelfth embodiment example of the present invention. The optical fiber 351 shown in FIG. 18 is an SMF with a step-index-type refractive-index profile, having a zero-dispersion wavelength in a wavelength band of 1.3 μm. The optical fiber 351 has a stack structure formed in a concentric manner in which the core layer 303A is formed along the center axis, and a first cladding layer 305A, the second cladding layer 309A, and a third cladding layer 313A are sequentially formed around the core layer 303A. A coating layer surrounding the third cladding layer 313A is omitted.

A portion including the core layer 303A and the first cladding layer 305A is corresponding to the core rod 307A. A diameter ratio between the core layer 303A and the first cladding layer 305A (hereinafter, "cladding/core ratio") is 4.8/1. A diameter of the core layer 303A in the present embodiment example is a diameter of a portion in which a refractive index difference of the core layer 303A to the first cladding layer 305A is a half of the maximum refractive index difference.

A portion including the core layer 303A, the first cladding layer 305A, and the second cladding layer 309A, i.e., a portion in which the second cladding layer 309A is added to the core rod 307A, is corresponding to the first preform 310. Furthermore, a portion including the core layer 303A, the first cladding layer 305A, the second cladding layer 309A, and the third cladding layer 313A, i.e., a portion in which the third cladding layer 313A is added to the first preform 310, is corresponding to the second preform 320.

According to the present embodiment example, a core soot 307B that becomes the core rod 307A is fabricated by using the VAD method shown in FIG. 3, in the same manner as the first embodiment example.

Subsequently, a dehydrating process and a sintering process are performed on the core soot 307B. With the dehydrating process and the sintering process, the core soot 307B is made into a transparent glass, and becomes the core rod 307A including the core layer 303A and the first cladding layer 305A.

The core rod 307A including the core layer 303A and the first cladding layer 305A made into the transparent glass is heated and elongated in a vertical-type electric-furnace elongating equipment shown in FIG. 4 to make a rod of 50 millimeters diameter. A heating source used at the heating and elongating process is not limited to the electric furnace. An oxyhydrogen flame or a plasma flame can also be used for the heating source. When a contamination of the hydroxyl (OH) is a problem, the oxyhydrogen flame is not desirable in general, and it is preferable to use the electric furnace or the plasma flame.

The first preform 310 is fabricated by forming the porous layer 309C by depositing a particle of a synthesized glass on an outer circumference of the elongated core rod 307A by using the OVD method shown in FIG. 5, in the same manner as the method used in the first embodiment example. The porous layer 309C is a portion that is made into the translucent glass layer 309B at a subsequent process, and finally becomes the second cladding layer 309A that is made into a transparent glass.

In this process, a thickness of the glass particle deposited on the core rod 307A is adjusted so that a ratio of a diameter of the second cladding layer 309A obtained by completely vitrifying the porous layer 309C at the final stage to a diameter of the core layer 303A at the final stage becomes approximately 9/1, as shown in FIG. 18. The adjustment of the thickness of the glass particle deposited on the core rod 307A is performed by measuring a change of a diameter and a weight of the porous layer 309C under deposition by using a non-contact laser displacement gauge and a weigh meter, and by continuing the deposition until a predetermined amount of glass is deposited. At this moment, an average density of the porous layer 309C (i.e., a value obtained by dividing a weight of the porous layer 309C that is a result of subtracting a weight of the core rod 307A from a total weight by a volume of the porous layer 309C that is a result of subtracting a volume of the core rod 307A from a total volume) is approximately 0.25 g/cm$^3$. By repeating the fabrication with different densities, it is found that the average density of the porous layer 309C about 0.2 g/cm$^3$ to 0.4 g/cm$^3$ is desirable to achieve an enough dehydration and a good deposition efficiency of the glass source material with a rigidity enough to maintain a shape of the porous layer 309C.

Furthermore, an optimization of the average density of the porous layer 309C is performed by changing amounts of a source material gas and combustion gas provided when depositing the synthesized glass particle, and a speed of moving a burner, while monitoring the diameter and the weight of the porous layer 309C. At this time, it is found that the optimization is well performed if a temperature of a depositing surface of the porous layer 309C is maintained in a range between 400° C. and 600° C.

The first preform 310 that is fabricated by forming the porous layer 309C around the core rod 307A is then dehydrated and sintered in a dehydrating/sintering furnace 330 (FIG. 23) under a condition shown in Table 19, to make the porous layer 309C into the translucent glass layer 309B.

Figure 23:
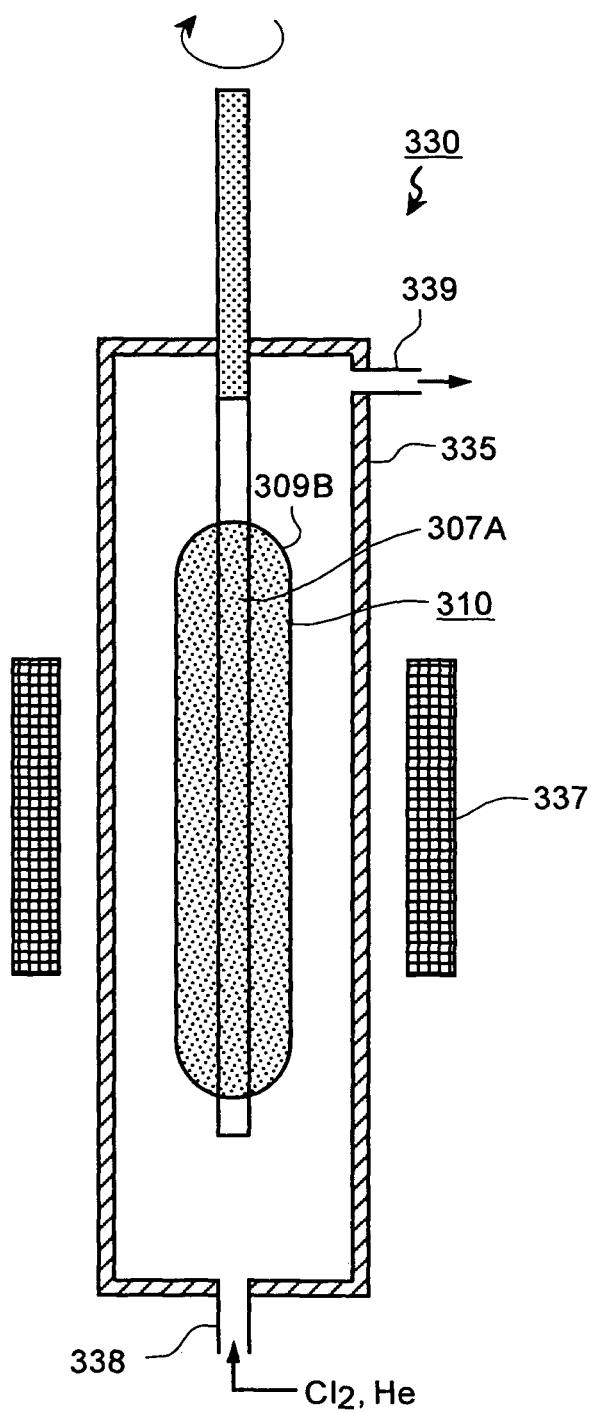
FIG. 23 is a longitudinal cross-section of a dehydrating/sintering furnace used for making the porous layer into a translucent glass layer in a dehydrating/sintering process.

FIG. 23 is a longitudinal cross-section of the dehydrating/sintering furnace 330 used for making the porous layer into a translucent glass layer in the dehydrating/sintering process. The dehydrating/sintering furnace 330 includes a muffle tube 335 made of a silica glass. A helium (He) gas and a chlorine (Cl2) gas are filled in the muffle tube 335. Each of the gases is introduced into the muffle tube 335 through a gas inlet 338 disposed on a lower side of the muffle tube 335 by an amount shown in Table 19, and an appropriate amount of gas is drained from a gas outlet 339 disposed on an upper side of the muffle tube 335, so that a pressure inside the muffle tube 335 is maintained constant. The first preform 310 is inserted into the muffle tube 335, and heated by a heater 337 provided on a side of the muffle tube 335, to perform dehydrating and sintering. The dehydrating and sintering process can also be performed separately. However, according to the present embodiment example, the dehydrating process and the sintering process are performed at the same time under a predetermined condition, to simplify the manufacturing process and to reduce the manufacturing cost.

TABLE 19

| Item | | Condition |
| --- | --- | --- |
| Maximum temperature | | 1350° C. |
| Preform pulling-down speed | | 100 mm/hour |
| Number of rotations of preform | | 10 rotations/min |
| Type of gas and flowing amount | Nitrogen | 10 liters/min |
| | Chlorine | 0.5 liter/min |

According to the present embodiment example, the dehydrating and sintering process is performed in a temperature range from which the porous layer 309C consisting of a substantially pure silica glass can be made into a state of a translucent glass. Considering a damage to the muffle tube 335 the maximum temperature is set to 1350° C. at the dehydrating and sintering process.

Furthermore, it is possible to achieve a dehydrating effect by using a chlorine compound gas such as thionyl chloride or a fluorine compound gas such as silicon tetrafluoride instead of the chlorine gas. However, when the fluorine compound gas is used, the refractive index of the silica glass is decreased, thus it is necessary to take a change of a refractive index profile into account. Furthermore, when the fluorine compound gas is used, a softening temperature of the glass is notably decreased, and the glass is easily vitrified even at a low temperature. Therefore, to obtain the translucent glass layer 309B, it is necessary to set the maximum temperature lower than the case of the pure silica glass.

Figure 24:
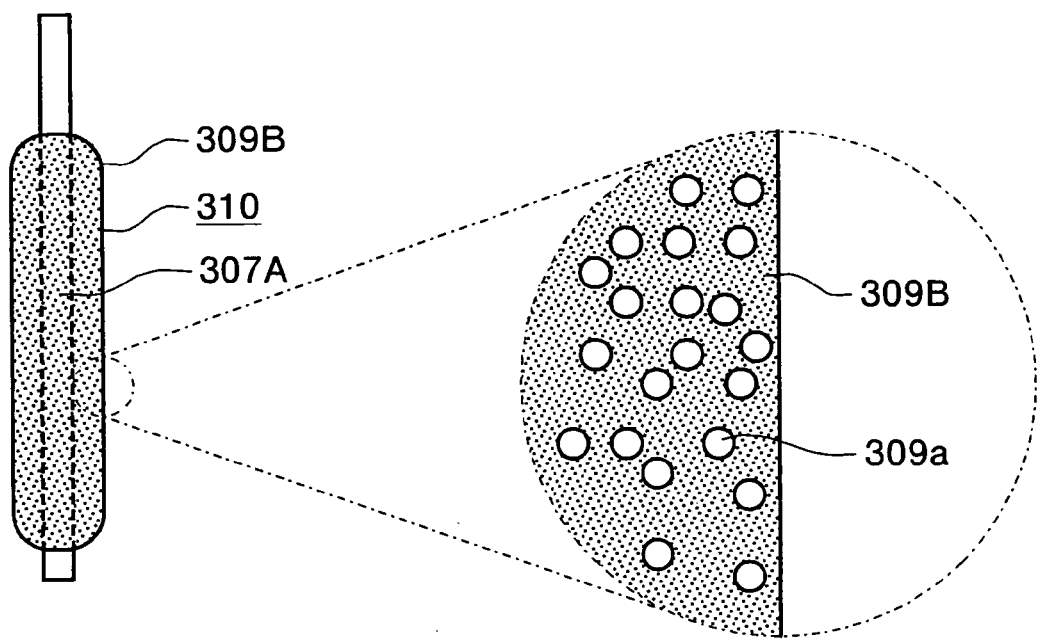
FIG. 24 is a side view of the translucent glass layer with an enlarged cross-section of a portion for illustrating a state of containing a closed pore.

When the dehydrating and sintering process is completed, the translucent glass layer 309B is in a state of containing a large number of a closed pore 309a physically isolated from the circumferential atmosphere, as schematically shown in FIG. 24. This state is referred to as a "state of a translucent glass". In the "state of a translucent glass", the translucent glass layer 309B has a virtually even distribution of the closed pore as a whole, so that it looks opaque whitish. However, a surface of the translucent glass layer 309B is smooth and glossy. At this stage, a density of the translucent glass layer 309B is 95% of a density (2.2 g/cm$^3$) of the second cladding layer 309A that is finally made into a transparent glass, i.e., 2.09 g/cm$^3$.

A density of a glass layer is changed depending on a heating temperature, a heating time, and a composition of a glass particle. When the heating temperature is high, the density becomes high quickly (i.e., in a short time), and the vitrification is completed shortly. On the other hand, when the heating temperature is low, it takes a longer time until the vitrification is completed. Furthermore, at a temperature below a softening temperature of the glass, the sintering is not progressed, and therefore, the vitrification does not happen. With the same temperature, a longer heating time makes the density of the glass layer high. However, if the glass layer is completely vitrified, a further heating does not make any difference. Therefore, a progress of the vitrification is mainly governed by the temperature factor.

Regarding the composition of the glass particle, the softening temperature is different between a pure silica glass and a fluorine-doped silica glass. The pure silica glass has a higher softening temperature than the fluorine-doped silica glass. For this reason, a higher temperature is required to vitrify a particle of the pure silica glass. According to the present embodiment example, it is necessary to set a condition that the temperature should be in a range not to damage the muffle tube 335, taking 1400° C., more preferably 1350° C. as the upper limit, and a manufacturing time is not prolonged from a viewpoint of the manufacturing cost. Therefore, an effort is paid to increase the density of the glass layer in the above-mentioned temperature range as possible.

As a result of dehydrating and sintering the porous layer 309C with various heating temperatures and heating times, it is found that the density range of the translucent glass layer 309B is preferably to be 1.8 g/cm$^3$ to 2.15 g/cm$^3$ when considering a prevention of residual air bubbles at the subsequent drawing process, and 2.0 g/cm$^3$ to 2.15 g/cm$^3$ when considering a productivity to increase a speed of the drawing. When the density of the translucent glass layer 309B is below 1.8 g/cm$^3$, even if the speed of the drawing is reduced to about 100 m/min, with which the productivity is extremely bad, the air bubbles are remained in the optical fiber, which cannot make a usable product. On the other hand, the density over 2.15 g/cm³ could not be obtained with a range of the heat time allowed from the viewpoint of the heating temperature and the manufacturing cost.

The first preform 310 fabricated by forming the translucent glass layer 309B around the core rod 307A is inserted into the jacket tube 313B that is a glass tube separately prepared, to fabricate the second preform 320. The jacket tube 313B used in this process is made of a material called "water-free synthesized silica" consisting of a silica glass synthesized by a chemical reaction, with a hydroxyl (OH) content equal to or less than 1 parts per million (ppm). The commercially available Suprasil-F300 manufactured by Shin-Etsu Quarts Products Co., Ltd. is one representative example. The jacket tube 313B is selected by a size and a thickness. The size of the jacket tube 313B should have an enough inner-diameter for inserting the first preform 310, and the thickness of should be enough to make an optical fiber of a desired core diameter after the drawing. Alternatively, a drawing outer-diameter of the core rod 307A and an outer-diameter and a density of the porous layer 309C can be set according to a dimension of the jacket tube 313B prepared in advance. The jacket tube 313B is cleaned using a hydrofluoric acid to make it in a clean state before being used.

Figure 25:
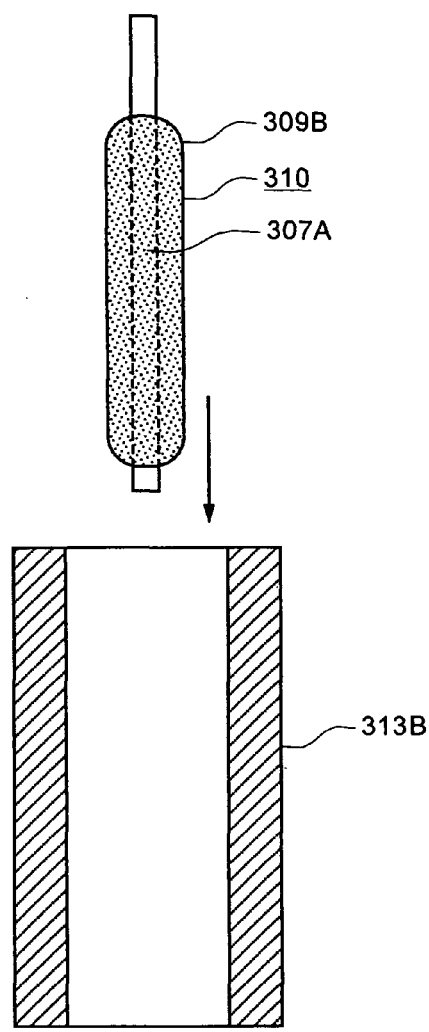
FIG. 25 is a schematic diagram with a longitudinal cross-section of a jacket tube for illustrating an insertion of a first preform into the jacket tube held in a roughly vertical direction.
Figure 26:
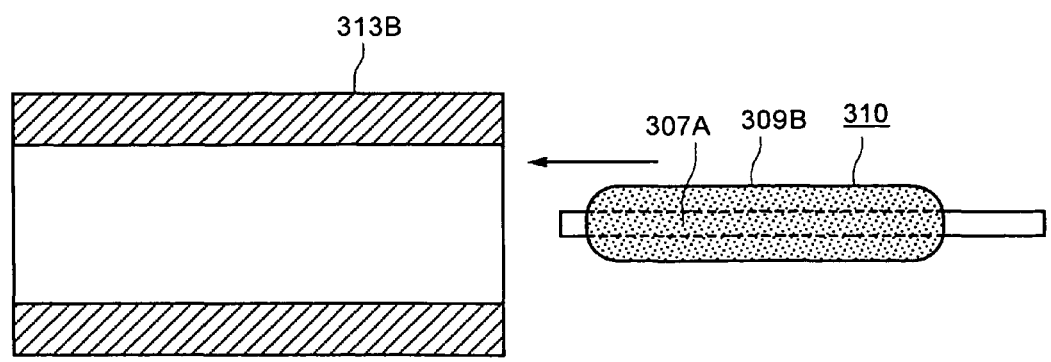
FIG. 26 is a schematic diagram with a longitudinal cross-section of a jacket tube for illustrating an insertion of a first preform into the jacket tube held in a roughly horizontal direction.

The insertion of the first preform 310 into the jacket tube 313B is performed by gently pulling down the first preform 310 from above with respect to the jacket tube 313B that is supported in a vertical direction, as shown in FIG. 25. In this case, the first preform 310 can be inserted from a lateral direction into the jacket tube 313B that is supported in a horizontal direction, as shown in FIG. 26. At this time, it is possible to prevent entering of a foreign material by flowing a clean nitrogen gas or a clean air between the jacket tube 313B and the first preform 310, not to contaminate an inner surface of the jacket tube 313B.

After completing the insertion of the first preform 310 into the jacket tube 313B, an oxyhydrogen flame radiated from a burner 338 is applied to an edge portion of the second preform 320 in a direction of drawing, to melt and seal an edge opening of the jacket tube 313B, and to integrate an edge portion of the jacket tube 313B with an edge portion of the first preform 310. The purpose of performing this process is as follows. If the opening of the jacket tube 313B is sealed in the drawing furnace, the second preform 320 fetches in the contaminants included in the atmosphere of the drawing furnace, causing a contamination on an inner surface of the jacket tube 313B and a surface of the translucent glass layer 309B. Therefore, the sealing of the jacket tube 313B is performed before inserting into the drawing furnace. In addition, if the edge portion of the jacket tube 313B and an edge portion of the first preform 310 are melted and integrated, it is possible to reduce the time for transferring to a steady state from a start of the drawing.

Although a radiation of an oxyhydrogen flame is used as a method of heating the edge opening of the second preform 320 in the present embodiment example, a radiation of a flame of a flammable gas such as a methane gas, a radiation of a plasma flame, or a heating by an electric furnace can also be used.

Figure 27:
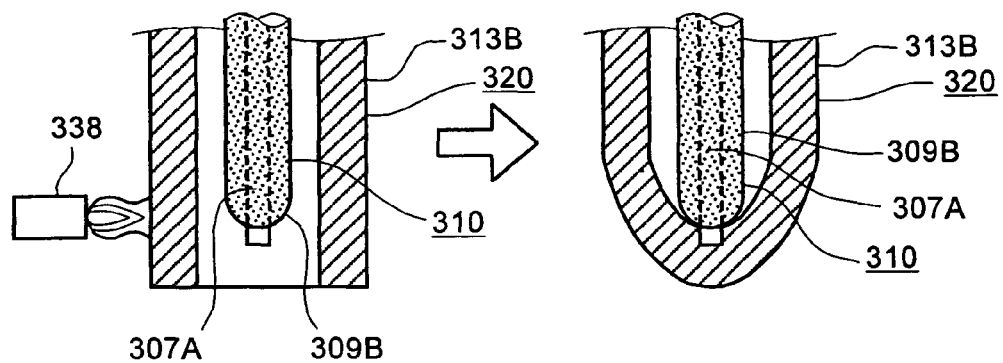
FIG. 27 is a schematic for illustrating a sealing of an edge of the jacket tube on a drawing direction of a second preform by melting the edge of the jacket tube using a oxyhydrogen flame radiated from a burner.
Figure 28:
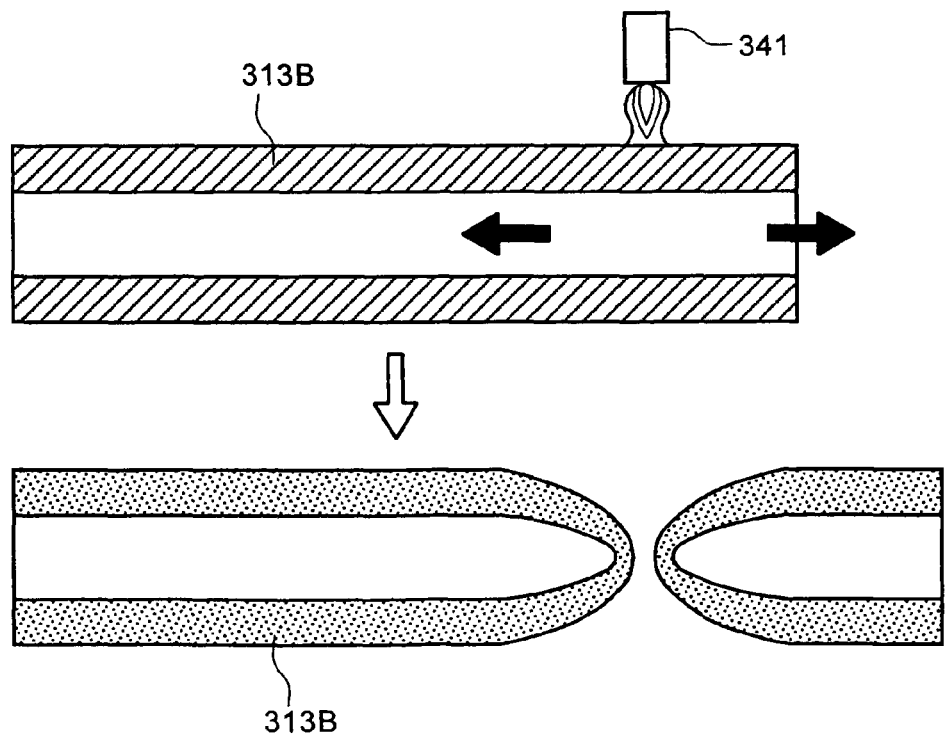
FIG. 28 is a schematic for illustrating a sealing of an edge of the jacket tube on a drawing direction by melting the edge of the jacket tube before inserting the second preform.

Furthermore, instead of sealing the edge portion of the jacket tube 313B after inserting the first preform 310 into the jacket tube 313B, the jacket tube 313B can be sealed by melting down the edge portion on the side of the drawing direction before inserting the first preform 310, as shown in FIG. 28. By doing this, it is possible to prevent a contamination of an impurity in the same manner as the method shown in FIG. 27. When melting down the jacket tube 313B, as shown in FIG. 28, a tension is applied to the jacket tube 313B in a direction indicated by black arrows while the jacket tube 313B is heated by the oxyhydrogen flame radiated from a burner 341.

The second preform 320 is inserted into a heating furnace from a side the sealed portion. Then, a drawing is performed while maintaining a state of a decreased pressure in a space between the jacket tube 313B and the translucent glass layer 309B (see FIG. 27), compared to the atmospheric pressure, so that the translucent glass layer 309B and the jacket tube 313B are melted and integrated and that the translucent glass layer 309B is made into a transparent glass, to manufacture the glass optical fiber 351 of 125 μm outer-diameter. In this manner, the translucent glass layer 309B becomes the second cladding layer 309A, and the jacket tube 313B becomes the third cladding layer 313A. The state of the decreased pressure is realized by connecting a vacuum pump (not shown) on an opening side opposite to the side of the sealed portion, and sucking gases in a space between the jacket tube 313B and the translucent glass layer 309B by the vacuum pump.

When performing the drawing process, two layers of ultra-violet (UV) cure resin coatings are conducted on an outer surface of the glass optical fiber 351. The resin is cured by irradiating ultra-violet light to make an optical fiber with a diameter of the coating about 250 μm, and the optical fiber is wound around a reel via a winding capstan. A strength of the glass optical fiber 351 after drawing is tested by winding the optical fiber around other reels while applying a tension equivalent to approximately 2% of extension with respect to a total length of the optical fiber. The result shows no breaking of the optical fibers without any problem.

Furthermore, it is confirmed that the closed pore that existed in the translucent glass layer 309B is not remained in the glass optical fiber 351 that is being drawn, by using an optical-fiber defect detecting equipment.

In the optical-fiber defect detecting equipment shown in FIG. 8, a laser beam is irradiated to the glass optical fiber that is being drawn from a side direction with respect to an axis of the optical fiber. A forward scattered-light from the glass optical fiber is detected by an image sensor. By detecting an abnormality in an intensity distribution pattern of the scattered light, a hollow defect, such as an air bubble, is detected to monitor the air bubble in the glass optical fiber.

As a result, it is confirmed that the closed pore that existed in the translucent glass layer 309B is not remained in the glass optical fiber 351 after drawing.

A result of measuring transmission characteristics of the SMF manufactured according to the present embodiment example is shown in Table 20.

TABLE 20

|  | Zero-dispersion wavelength (nm) | Cut-off Wavelength (nm) | Transmission loss (dB/km) Measurement wavelength (nm) | | | MFD 1310/1550 nm (μm) | PMD 1310 nm (ps/km$^{1/2}$) |
| --- | --- | --- | --- | --- | --- | --- | --- |
|  |  |  | 1310 | 1385 | 1550 |  |  |
| SMF (1) | 1315 | 1123 | 0.327 | 0.301 | 0.185 | 9.3/10.5 | 0.08 |
| SMF (2) | 1316 | 1156 | 0.329 | 0.298 | 0.184 | 9.2/10.4 | 0.04 |

The optical fiber 351 according to the present embodiment example has a cut-off wavelength $\lambda_{cc}$ equal to or less than 1310 nanometers, and a single mode operation is ensured in a wavelength range equal to or more than 1310 nanometers.

The cut-off wavelength mentioned here is a cable cut-off wavelength $\lambda_{cc}$ defined by ITU-T G.650 standard.

Furthermore, the optical fiber 351 according to the present embodiment example has a transmission loss less than 0.40 dB/km at a wavelength of 1385 nanometers, which means that an absorption loss caused by a hydroxyl (OH) content is small enough.

In addition, regarding a polarization mode dispersion (PMD), it shows a small enough value.

Subsequently, a test of exposing the optical fiber 351 to a hydrogen is performed. A condition for the hydrogen exposing test used is the condition defined by IEC-60793-2 B1.3. The optical fiber 351 is exposed to an atmosphere with a hydrogen partial pressure of 0.01 atm at a room temperature, and maintained until a transmission loss with an optical signal of 1240 nanometers is increased by 0.03 dB/km, compared to the transmission loss before exposing the optical fiber to the hydrogen (initial value). After that, the optical fiber is taken out to the atmospheric air, placed as it is for more than 14 days, and subjected to a measurement of the transmission loss.

The transmission loss after exposing to the hydrogen and a change of the transmission loss caused by the hydrogen exposing (b-a) is shown in Table 21. It shows that the increase of the transmission loss is small, and the optical fiber is suitable for the broadband WDM transmission.

TABLE 21

| | Transmission loss (dB/km) | | | | | |
|---|---|---|---|---|---|---|
| | Before exposing to hydrogen (a) Measurement wavelength (nm) | | After exposing to hydrogen (b) Measurement wavelength (nm) | | (b − a) Measurement wavelength (nm) | |
| | 1310 | 1385 | 1310 | 1385 | 1310 | 1385 |
| SMF (1) | 0.327 | 0.301 | 0.330 | 0.320 | 0.003 | 0.019 |
| SMF (2) | 0.329 | 0.298 | 0.331 | 0.314 | 0.002 | 0.016 |

Figure 19:
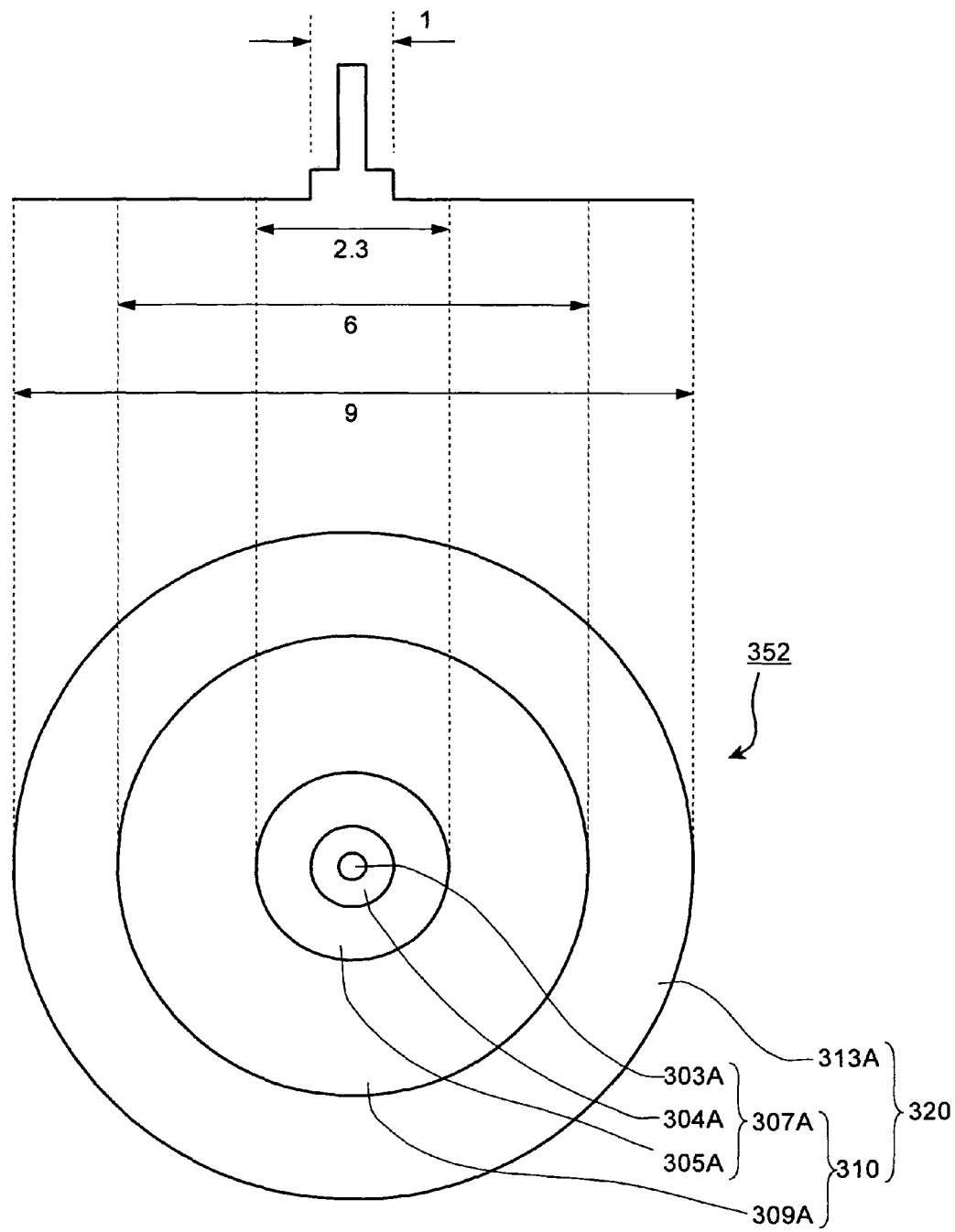
FIG. 19 is a schematic for illustrating a refractive-index profile of the optical fiber manufactured according to a thirteenth embodiment example of the present invention.

FIG. 19 is a schematic for illustrating a refractive-index profile of an optical fiber 352 manufactured according to a thirteenth embodiment example of the present invention. The optical fiber 352 shown in FIG. 19 is a dispersion-shifted fiber (DSF) with a dual-shaped-type refractive-index profile, having a zero-dispersion wavelength in a wavelength band of 1.55 µm. The optical fiber 352 has a stack structure formed in a concentric manner in which the core layer 303A is formed along the center axis, and a side core layer 304A, the first cladding layer 305A, the second cladding layer 309A, and the third cladding layer 313A are sequentially formed around the core layer 303A. A coating layer surrounding the third cladding layer 313A is omitted.

A portion including the core layer 303A, the side core layer 304A, and the first cladding layer 305A is corresponding to the core rod 307A. A diameter ratio between the side core layer 304A and the first cladding layer 305A (hereinafter, "cladding/core ratio") is 2.3/1. A diameter of the side core layer 304A in the present embodiment example is a diameter of a portion in which a refractive index difference of the side core layer 304A to the first cladding layer 305A is a half of the maximum refractive index difference.

A portion including the core layer 303A, the side core layer 304A, the first cladding layer 305A, and the second cladding layer 309A, i.e., a portion in which the second cladding layer 309A is added to the core rod 307A, is corresponding to the first preform 310. Furthermore, a portion including the core layer 303A, the side core layer 304A, the first cladding layer 305A, the second cladding layer 309A, and the third cladding layer 313A, i.e., a portion in which the third cladding layer 313A is added to the first preform 310, is corresponding to the second preform 320.

Figure 29:
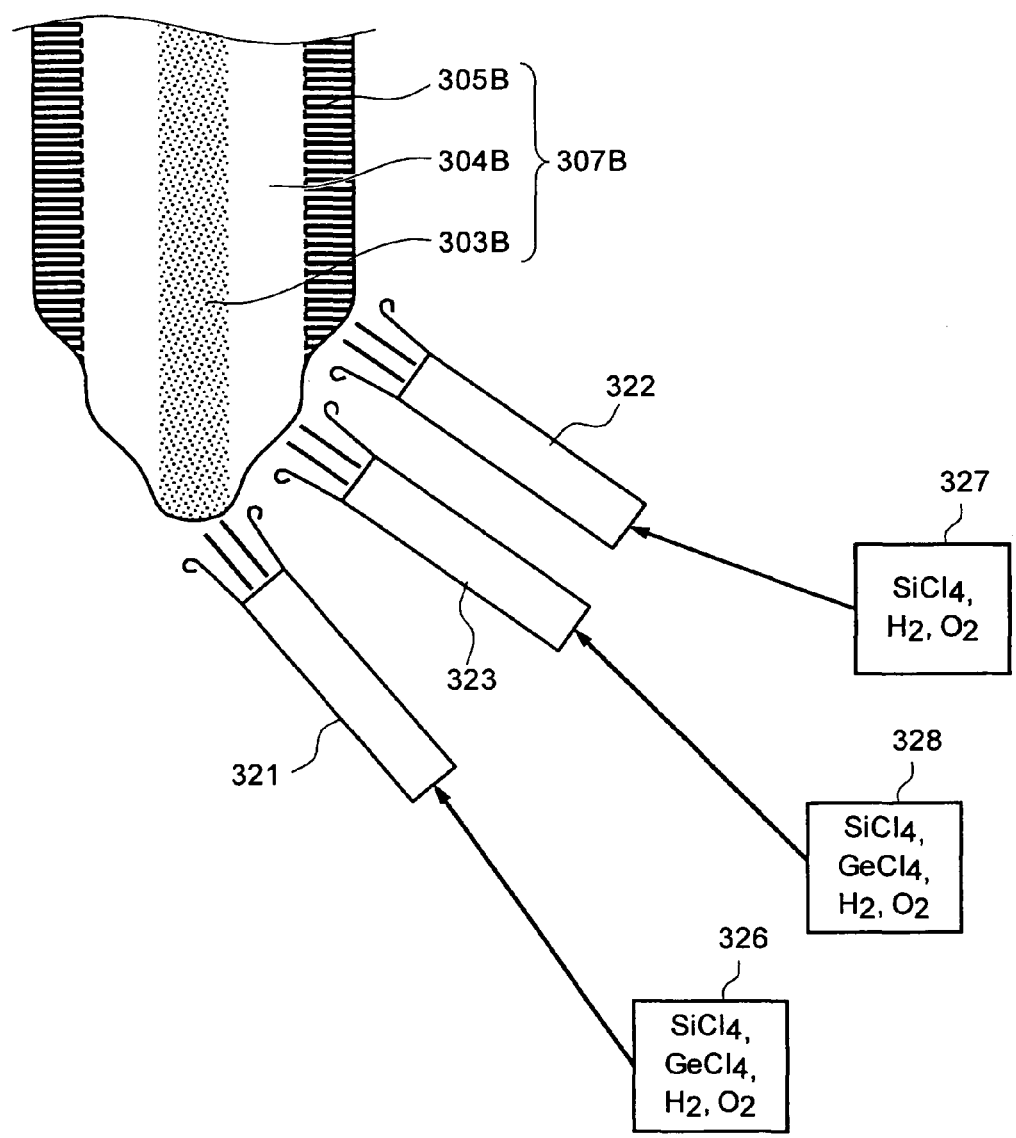
FIG. 29 is a schematic for illustrating a process of manufacturing a core soot by the VAD method according to the thirteenth embodiment example.

According to the present embodiment example, the core soot 307B that becomes the core rod 307A is fabricated by using the VAD method. FIG. 29 is a schematic for illustrating a process of manufacturing the core soot 307B by the VAD method according to the present embodiment example, showing a longitudinal cross-section of the core soot 307B. As shown in FIG. 29, in the VAD method, a gas 323 consisting of vaporized silicon tetrachloride (SiCl$_4$), germanium tetrachloride (GeCl$_4$), oxygen (O$_2$), and hydrogen (H$_2$) is provided and burned through a core burner 321. The gas 323 is hydrolyzed in a flame to obtain a particle of a synthesized glass. The particle of the synthesized glass is blown and deposited on a target rod (not shown).

The particle of the synthesized glass is deposited on the target rod to form a core layer soot 303B that becomes the core layer 303A at a subsequent process. The target rod is rotated and gently pulled up in an upper direction.

A side core burner 323 is disposed above the core burner 321. A gas 328 consisting of vaporized silicon tetrachloride (SiCl$_4$), germanium tetrachloride (GeCl$_4$) oxygen (O$_2$), and hydrogen (H$_2$) is provided and burned through the side core burner 323. The gas 328 is hydrolyzed in a flame to form a side core layer soot 304B that becomes the side core layer 304A at a subsequent process on an outer circumference of the core layer soot 303B.

A cladding burner 322 is disposed above the side core burner 323. A gas 327 consisting of vaporized silicon tetrachloride (SiCl$_4$), oxygen (O$_2$), and hydrogen (H$_2$) is provided and burned through the side core burner 323. The gas 327 is hydrolyzed in a flame to form a cladding layer soot 305B that becomes the first cladding layer 305A at a subsequent process on an outer circumference of the side core layer soot 304B. In this manner, the core soot 307B is fabricated in a shape of a rod having a predetermined width.

Subsequently, a dehydrating process and a sintering process are performed on the core soot 307B. With the dehydrating process and the sintering process, the core soot 307B is made into a transparent glass, and becomes the core rod 307A.

The core rod 307A is heated and elongated in a vertical-type electric-furnace elingatng equipment shown in FIG. 4 to make a rod of 50 millimeters diameter. The first preform 310 is fabricated by forming the porous layer 309C by depositing a particle of a synthesized glass on an outer circumference of the drawn core rod 307A by using the OVD method. In this process, a thickness of the glass particle deposited on the core rod 307A is adjusted so that a ratio of a diameter of the second cladding layer 309A obtained by completely vitrifying the porous layer at the final stage to a diameter of the side core layer 304A at the final stage becomes approximately 6/1, as shown in FIG. 19. The first preform 310 that is fabricated by forming the porous layer around the core rod 307A is then dehydrated and sintered as the twelfth embodiment example to make the porous layer into the translucent glass player.

The first preform is inserted into a jacket tube that is a glass tube separately prepared, to fabricate the second preform. A leading edge of the jacket tube is melted and sealed. Then, a drawing is performed while maintaining a state of a decreased pressure in a space between the jacket tube and the translucent glass layer, compared to the atmospheric pressure, so that the translucent glass layer and the jacket tube are melted and integrated and that the translucent glass layer is made into a transparent glass, to manufacture a glass optical fiber of 125 µm outer-diameter.

A coating is conducted during the drawing process, as in the twelfth embodiment example, and the optical fiber 352 with an outer diameter of the coating of 250 μm is obtained, which has no residual air bubbles inside the optical fiber after drawing and no problem with the strength.

A result of measuring transmission characteristics of the DSF manufactured according to the present embodiment example is shown in Table 22.

TABLE 22

| | Zero-dispersion wavelength (nm) | Cut-off Wavelength (nm) | Transmission loss (dB/km) Measurement wavelength (nm) | | | MFD 1550 nm (μm) | PMD 1550 nm (ps/km$^{1/2}$) |
|---|---|---|---|---|---|---|---|
| | | | 1310 | 1385 | 1550 | | |
| DSF (1) | 1546 | 1264 | 0.364 | 0.3201 | 0.205 | 7.9 | 0.04 |
| DSF (2) | 1548 | 1189 | 0.359 | 0.314 | 0.202 | 7.8 | 0.15 |

Figure 20:
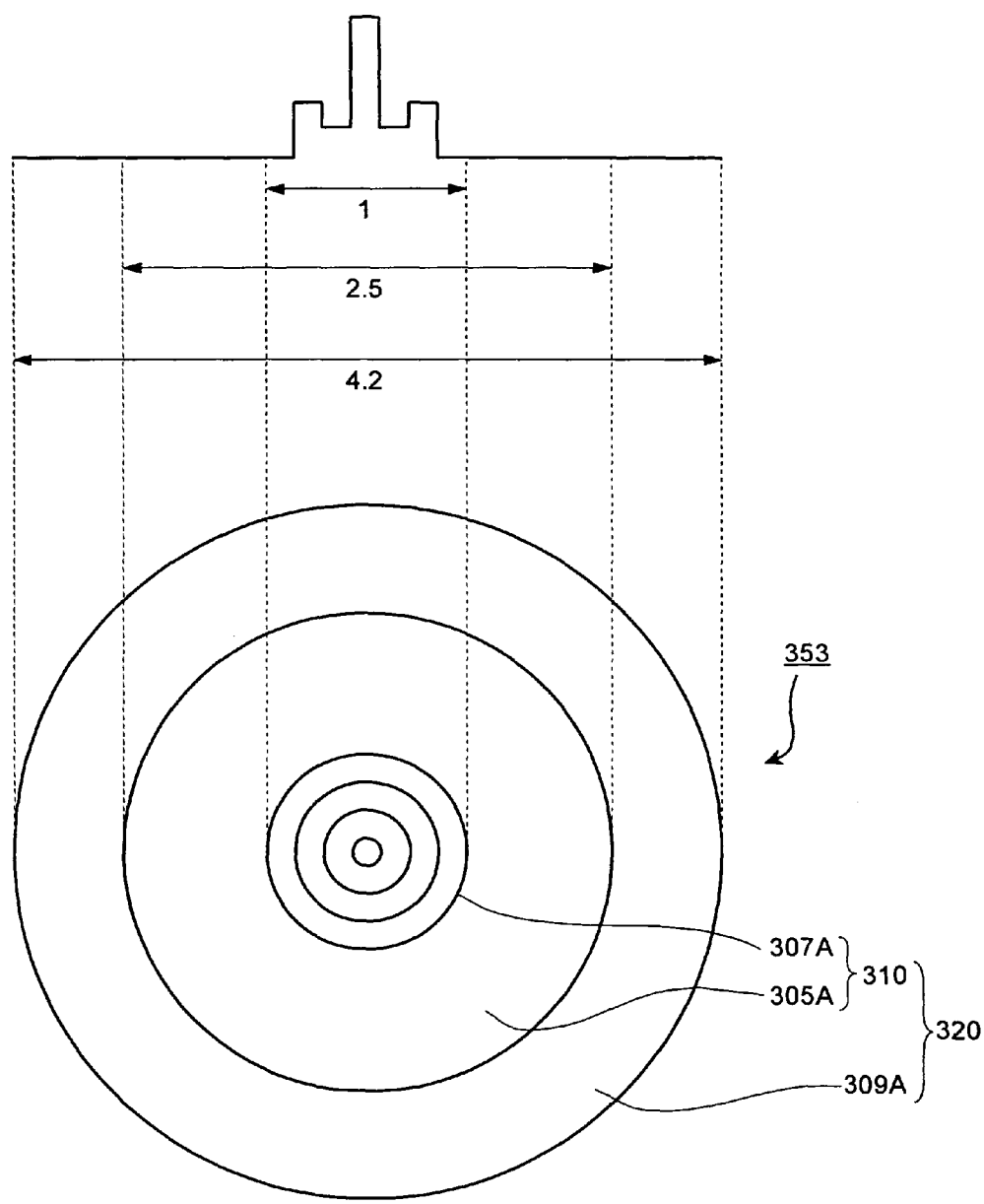
FIG. 20 is a schematic for illustrating a refractive-index profile of the optical fiber manufactured according to a fourteenth embodiment example of the present invention.

FIG. 20 is a schematic for illustrating a refractive-index profile of an optical fiber 353 manufactured according to a fourteenth embodiment example of the present invention. The optical fiber 352 shown in FIG. 20 is a non-zero dispersion-shifted fiber (NZDSF) with a segmented-index-type refractive-index profile, having a wavelength dispersion of 1.5 ps/nm/km to 8.0 ps/nm/km in a wavelength band of 1.55 μm. The optical fiber 352 has a stack structure formed in a concentric manner in which the core rod 307A is formed along the center axis, and the first cladding layer 305A and the second cladding layer 309A are sequentially formed around the core rod 307A. A coating layer surrounding the second cladding layer 309A is omitted.

The core rod 307A fabricated by the VAD method is heated and elongated so that an outer diameter becomes 40 millimeters. The first preform 310 is fabricated by forming a porous layer (a portion that becomes a translucent glass layer later, and the first cladding layer 305A after that) by depositing a particle of a synthesized glass on an outer circumference of the drawn core rod 307A by using the OVD method. In this process, a thickness of the glass particle deposited on the core rod 307A is adjusted so that a ratio of a diameter when the porous layer is made into a completely transparent glass layer to a diameter of the core rod 307A at that time becomes approximately 2.5/1, as shown in FIG. 20. The first preform 310 is then dehydrated and sintered as the twelfth embodiment example to make the porous layer into a translucent glass layer (a portion that becomes the first cladding layer 305A later).

The first preform 310 is inserted into a jacket tube (a portion that becomes the second cladding layer 309A later) that is a glass tube separately prepared, to fabricate the second preform 320.

Then, the same processes as the twelfth embodiment example are performed, and the optical fiber 353 is obtained. As in the twelfth embodiment example, it is confirmed that there is no residual air bubbles inside the optical fiber after drawing and no problem with the strength. A result of measuring transmission characteristics of the NZDSF manufactured according to the present embodiment example is shown in Table 23.

TABLE 23

| | Zero-dispersion wavelength (nm) | Dispersion 1550 nm (ps/nm/km) | Cut-off Wavelength (nm) | Transmission loss (dB/km) Measurement wavelength (nm) | | | MFD 1550 nm (μm) | PMD 1550 nm (ps/km$^{1/2}$) |
|---|---|---|---|---|---|---|---|---|
| | | | | 1310 | 1385 | 1550 | | |
| NZDSF (1) | 1508 | 2.1 | 1321 | 0.354 | 0.346 | 0.201 | 8.4 | 0.11 |
| NZDSF (2) | 1486 | 5.1 | 1296 | 0.357 | 0.338 | 0.198 | 9.2 | 0.07 |

Furthermore, those in the art can easily understand that it is also possible to make the wavelength dispersion at the wavelength band of 1.55 μm−1.5 ps/nm/km to −8.0 ps/nm/km by optimizing the refractive index profile of the core layer 303A.

Figure 21:
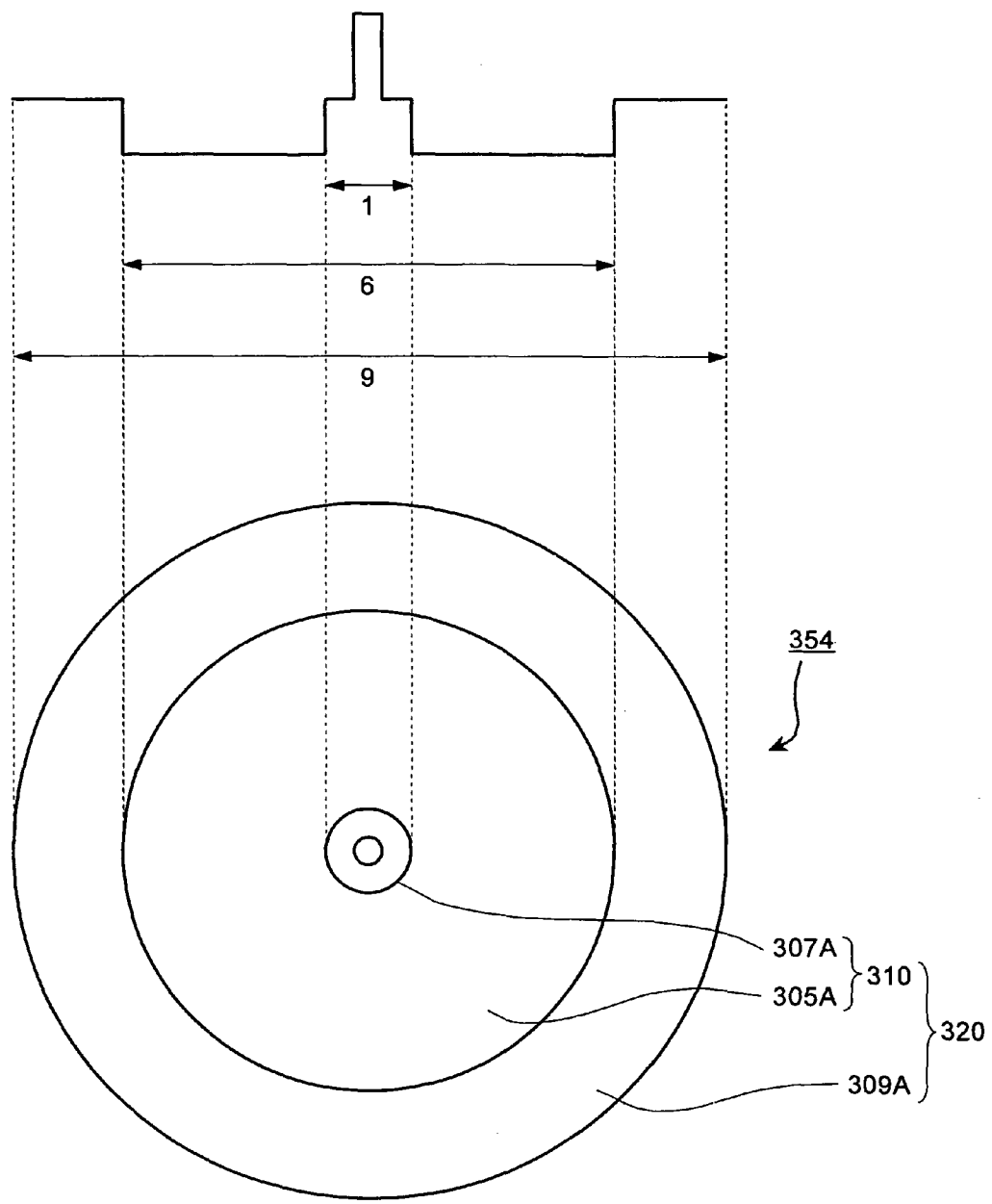
FIG. 21 is a schematic for illustrating a refractive-index profile of the optical fiber manufactured according to a fifteenth embodiment example of the present invention.

FIG. 21 is a schematic for illustrating a refractive-index profile of an optical fiber 354 manufactured according to a fifteenth embodiment example of the present invention. The optical fiber 354 shown in FIG. 19 is an optical fiber including a portion having a refractive index lower than that of an outermost cladding layer around a core having a dual-shaped-type refractive-index profile. The optical fiber 354 has a stack structure formed in a concentric manner in which the core rod 307A is formed along the center axis, and the first cladding layer 305A and the second cladding layer 309A, are sequentially formed around the core layer 303A. A coating layer surrounding the second cladding layer 309A is omitted.

The core rod 307A fabricated by the VAD method is heated and elongated to make a rod of 30 millimeters diameter. The first preform 310 is fabricated by forming a porous layer (a portion that becomes a translucent glass layer later, and the first cladding layer 305A after that) by depositing a particle of a synthesized glass on an outer circumference of the drawn core rod 307A by using the OVD method. In this process, a thickness of the glass particle deposited on the core rod 307A is adjusted so that a ratio of a diameter when the porous layer is made into a completely transparent glass layer to a diameter of the core rod 307A at that time becomes approximately 6/1, as shown in FIG. 21. The porous layer of the first preform 310 is then dehydrated and sintered under a condition shown in Table 24 to make the porous layer into a translucent glass layer (a portion that becomes the first cladding layer 305A later).

TABLE 24

| Item | | Condition |
|---|---|---|
| Maximum temperature | | 1250° C. |
| Preform pulling-down speed | | 100 mm/hour |
| Number of rotations of preform | | 10 rotations/min |
| Type of gas and flowing amount | Helium | 10 liters/min |
| | Chlorine | 0.3 liter/min |
| | $SiF_4$ | 0.3 liter/min |

The first preform 310 is inserted into a jacket tube (a portion that becomes the second cladding layer 309A later) that is a glass tube separately prepared, to fabricate the second preform 320.

Then, a drawing is performed while maintaining a state of a decreased pressure in a space between the jacket tube and the translucent glass layer, compared to the atmospheric pressure, so that the translucent glass layer and the jacket tube are melted and integrated and that the translucent glass layer is made into a transparent glass, to manufacture a glass optical fiber of 125 µm outer-diameter.

A coating is conducted during the drawing process, as in the twelfth embodiment example, and the optical fiber 354 with an outer diameter of the coating of 250 µm is obtained, which has no residual air bubbles inside the optical fiber after drawing and no problem with the strength. As in the present embodiment example, it is possible to provide an area having a low refractive index in the cladding layer.

Figure 22:
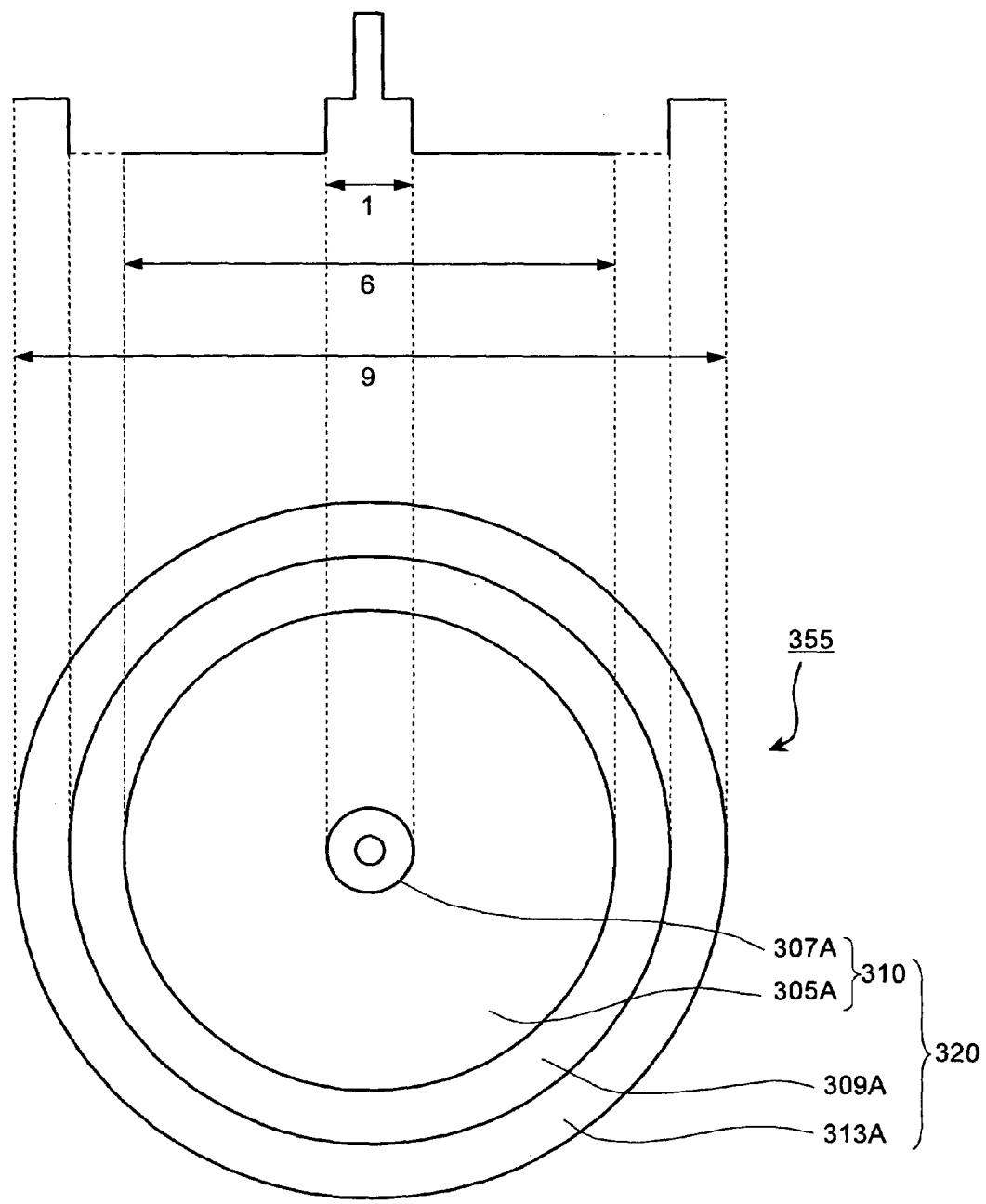
FIG. 22 is a schematic for illustrating a refractive-index profile of the optical fiber manufactured according to a sixteenth embodiment example of the present invention.

FIG. 22 is a schematic for illustrating a refractive-index profile of an optical fiber 355 manufactured according to a sixteenth embodiment example of the present invention. The optical fiber 354 shown in FIG. 19 is an optical fiber including a portion having a refractive index lower than that of an outermost cladding layer around a core having a dual-shaped-type refractive-index profile. The optical fiber 354 has a stack structure formed in a concentric manner in which the core rod 307A is formed along the center axis, and the first cladding layer 305A, the second cladding layer 309A, and the third cladding layer 313A are sequentially formed around the core layer 303A. A coating layer surrounding the third cladding layer 313A is omitted.

The core rod 307A fabricated by the VAD method is heated and elongated to make a rod of 30 millimeters diameter. The first preform 310 is fabricated by forming a porous preform layer (a portion that becomes a translucent glass layer later, and the first cladding layer 305A after that) by depositing a particle of a synthesized glass on an outer circumference of the drawn core rod 307A by using the OVD method. In this process, a thickness of the glass particle deposited on the core rod 307A is adjusted so that a ratio of a diameter when the porous layer is made into a completely transparent glass layer to a diameter of the core rod 307A at that time becomes approximately 6/1, as shown in FIG. 22. The porous layer of the first preform 310 is then dehydrated and sintered under a condition shown in Table 25 to make the porous layer into a translucent glass layer.

The first preform 310 and a fluorine-doped jacket tube (a portion that becomes the second cladding layer 309A later) are inserted into a jacket tube (a portion that becomes the third cladding layer 313A later) that is made of a pure silica glass with a leading edge melted and sealed in advance, to fabricate the second preform 320.

Then, a drawing is performed while maintaining a state of a decreased pressure in spaces between the translucent glass layer and the fluorine-doped jacket tube, and fluorine-doped jacket tube and the jacket tube made of the pure silica glass, compared to the atmospheric pressure, so that the translucent glass layer, the fluorine-doped jacket tube, and the jacket tube made of the pure silica glass are melted and integrated and that the translucent glass layer is made into a transparent glass, to manufacture a glass optical fiber of 125 µm outer-diameter.

A coating is conducted during the drawing process, as in the twelfth embodiment example, and the optical fiber 355 with an outer diameter of the coating of 250 µm is obtained, which has no residual air bubbles inside the optical fiber after drawing and no problem with the strength.

The embodiment examples in the specification is merely examples for explaining the present invention, and those in the art can easily understand that a variety of modification examples, for instance, an optical fiber having a complex refractive index profile and various methods of fabricating a core rod (such as MCVD method, OVD method, and PCVD method) may also be included in a scope of the present invention.

According to the present invention, a first preform is fabricated by forming a porous layer by depositing a particle of a glass material on an outer circumference of a core rod. The first preform is dehydrated and sintered until the porous layer becomes a translucent glass layer containing a closed pore. Furthermore, a second preform is fabricated by inserting the dehydrated and sintered first preform into a glass tube, and a drawing is performed while heating the second preform, in such a manner that the translucent glass layer and the glass tube are melted and integrated and that the translucent glass cylinder becomes a cladding layer of a transparent glass. Therefore, it is possible to reduce the manufacturing cost of the optical fiber by reducing manufacturing processes and optimizing a manufacturing condition, while making use of the conventional manufacturing facilities. As a result, it is possible to provide a high quality inexpensive optical fiber without an aid of a large-sized additional development or facility investment.

The method of manufacturing the optical fiber according to the present invention has a big advantage in application to manufacturing an optical fiber including a core layer and a cladding layer with a variety of refractive-index profiles and characteristics, and is also applicable to manufacturing an optical fiber an optical fiber suitable for a broadband WDM transmission with a low transmission loss.

According to a seventeenth embodiment example of the present invention, a core rod is fabricated by forming a core soot including a core layer and a part of a cladding layer by the VAD method, and making the core soot into a transparent glass by a dehydrating and sintering process. The core rod is then heated and elongated to make a rod of about 50 millimeters outer diameter.

Figure 30:
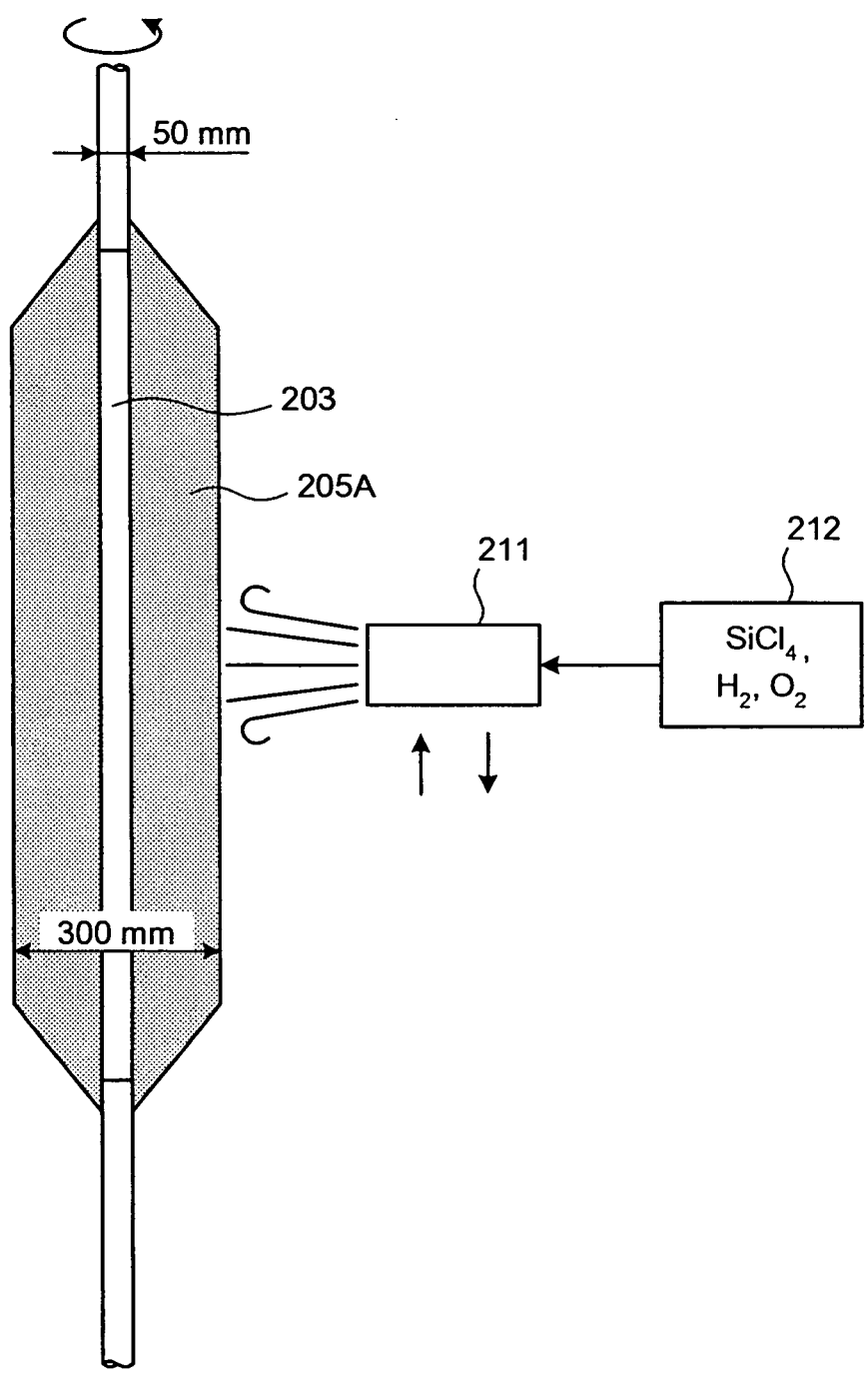
FIG. 30 is a schematic for illustrating a formation of a porous material layer around the core rod in a porous-layer forming process.

A porous layer of 300 millimeters diameter is formed by deposing a particle of a silica glass on an outer circumference of the elongated core rod by OVD method (porous layer forming process). FIG. 30 is a schematic for illustrating a formation of a porous material layer 205A around the core rod by the OVD method, showing a longitudinal cross-section of a portion of the porous layer 205A. In the OVD method, a gas 212 consisting of vaporized tetrachloride ($SiCl_4$), oxygen ($O2$), and hydrogen ($H_2$) is provided and burned through a burner 211.

The gas 212 is hydrolyzed in a flame to obtain a glass particle. The glass particle is blown to a core rod 203 that is rotating so that the particle is deposited around the core rod 203. Because a thickness of a particle layer that is deposited at one time is not thick enough, the process is repeated by moving the burner 211 back and forth until the porous material layer 205A of an enough width is obtained. An average density of the porous material layer 205A form in the above manner (i.e., a value obtained by dividing a weight of the porous material layer 205A by a volume of a value that is a result of subtracting a volume of the core rod 203 from a total volume) is approximately 0.7 g/cm$^3$.

Figure 31:
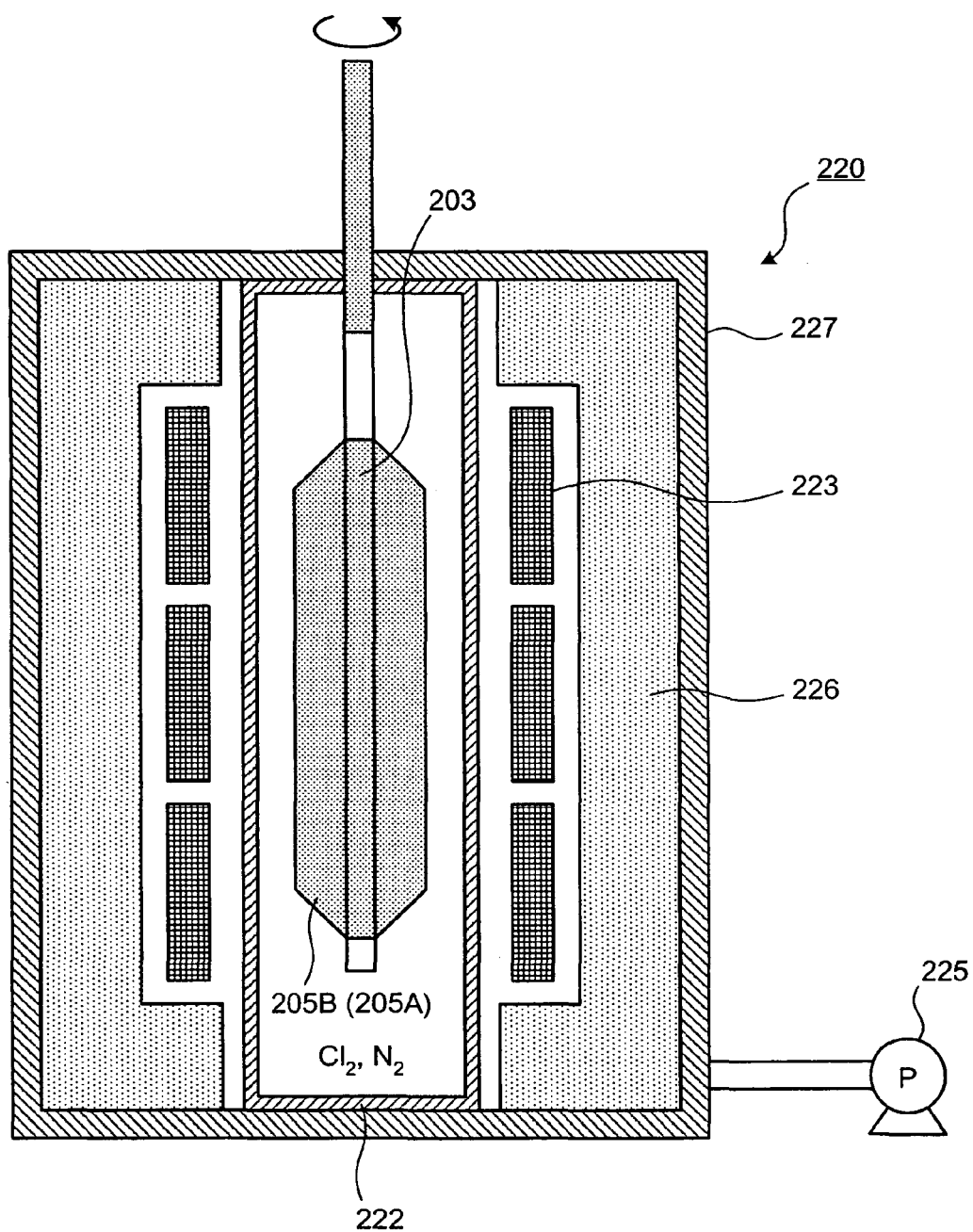
FIG. 31 is a side cross-section of the dehydrating/sintering furnace for illustrating the dehydrating/sintering process.

FIG. 31 is a side cross-section of the dehydrating/sintering furnace for illustrating the dehydrating/sintering process. An intermediate preform, in which the porous layer 205A is formed on an outer circumference of the core rod 203, is then dehydrated and sintered in a dehydrating/sintering furnace 220 shown in FIG. 25 under a condition shown in Table 25, to make the porous layer 205A into a translucent glass layer 205B including a closed pore. The translucent glass layer 205B is a source layer that is made into a glass later to make a cladding layer.

TABLE 25

| Item | Condition | |
|---|---|---|
| Dehydrating condition | | |
| Dehydrating temperature | 1150° C. | |
| Dehydrating time | 3 hours | |
| Number of rotations of preform | 5 rotations/min | |
| Type of gas and flowing amount | Helium | 20 liters/min |
| | Chlorine | 0.5 liter/min |
| Sintering condition | | |
| Sintering temperature | 1400° C. | |
| Temperature raising speed | 5° C./min | |
| Sintering temperature holding time | 4 hours | |
| Number of rotations of preform | 5 rotations/min | |
| Type of gas and flowing amount | Helium | 20 liters/min |
| | Chlorine | 0.5 liter/min |

The dehydrating/sintering furnace 220 includes a silica muffle tube 222 that is a container with a sealing function made of a silica glass, a ring-shaped multi-heater 223 formed with a plurality of heat generating elements disposed around the silica muffle tube 222, a furnace unit 227 that forms an exterior of the dehydrating/sintering furnace 220, surrounding whole of the silica muffle tube 222 and the multi-heater 223, and a heat-insulating member 226 that is filled in a space between the silica muffle tube 222, the multi-heater 223, and the furnace unit 227.

In the dehydrating and sintering process, a chlorine gas (Cl2) and a nitrogen gas (N2) are introduced into the silica muffle tube 222 from a gas inlet (not shown), and an appropriate amount of gas is drained from a gas outlet (not shown), so that a pressure inside the silica muffle tube 222 is maintained constant.

Generally, in the conventional method of making the porous layer 205A into a completely transparent glass, two stages of processes are required for the vitrification of the porous layer 205A in which the porous layer 205A is dehydrated enough by heating it with a temperature equal to or lower than 1200° C. with which the sintering is not progressed, and then a vitrification of the porous layer 205A is performed under a condition of a high temperature. However, this method can easily cause a damage to the muffle tube, and an energy cost for the heating is also increased. For this reason, a method of performing the sintering process in a temperature range with which an incomplete sintering state is realized in a decreased pressure after the dehydrating process is introduced in the present embodiment example.

At this stage, an average density of the translucent glass layer 205B is 95% of a density (2.2 g/cm$^3$) of the transparent glass that is totally vitrified, i.e., 2.1 g/cm$^3$. In the sintering process for the porous layer 205A, a coupling between the particles is increased by heating, and opened pores are decreased so that the density becomes high. Finally the porous layer 205A is made into a transparent glass free of the air bubble. Although a progressing speed of the sintering is changed depending on the conditions, such as temperature and time, particle diameter and composition of the glass particles, the sintering is progressed quickly on a surface of the porous layer 205A that is close to the multi-heater 223. As a result of dehydrating and sintering the porous layer 205A by changing the temperature and the heating time, when drawing the translucent glass layer 205B having the closed pore directly, it is found that an average density of the translucent glass layer 205B should be equal to or more than 1.8 g/cm$^3$, or preferably, equal to or more than 2.0 g/cm$^3$, to prevent residual air bubbles in the drawing.

Figure 32:
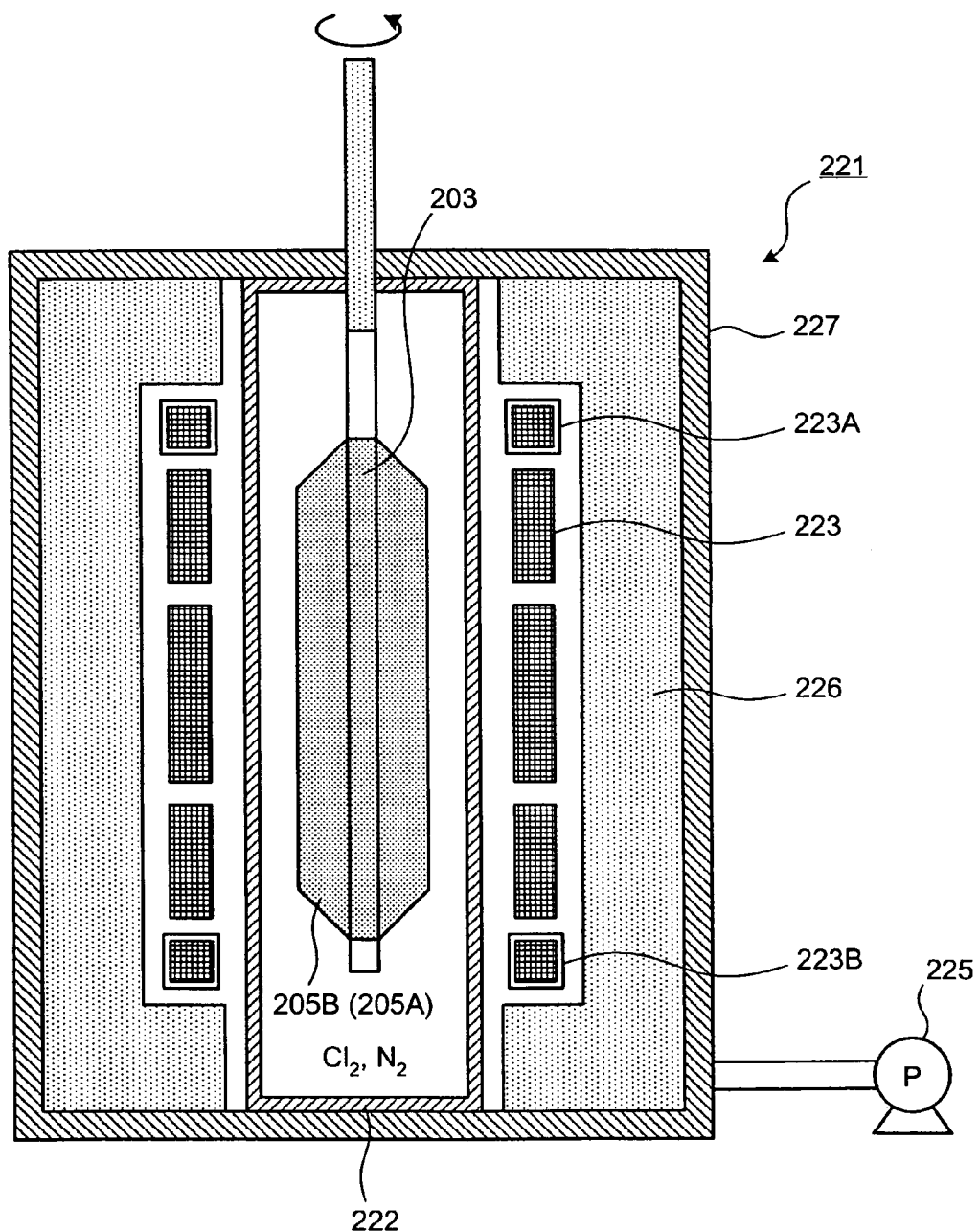
FIG. 32 is a side cross-section of the dehydrating/sintering furnace including a special heater at a portion corresponding to a tapered-portion of both edges of the preform.

In the above dehydrating and sintering process, a radiation from the heater is hard get to both edges of the translucent glass layer 205B. Therefore, even when the sintering is completed on a surface of the parallel portion of the translucent glass layer 205B, the both edges may not be sintered completely. Although an edge on a side of starting the drawing is made into a transparent glass in a leading-edge vitrification process, if the sintering of an edge on a side of ending the drawing (trailing edge) is not enough, it is possible for an outside air to penetrate into the inside from the trailing edge, and to remain as an air bubble after the drawing. Therefore, when the sintering of the trailing edge is not completed, it is desirable to perform a thermal treatment by an electric furnace, a flame of a flammable gas such as an oxyhydrogen flame and a methane gas, or a plasma flame, as an additional process, to at least completely end the sintering of the surface. From this point of view, as shown in FIG. 32, the sintering can be performed by setting the temperatures of the upper and the lower portions of the silica muffle tube 222 higher than other portions by using a dehydrating/sintering furnace 221 having extra heaters 223A and 223B separately installed at areas corresponding to the tapered portions at both edges.

Figure 33:
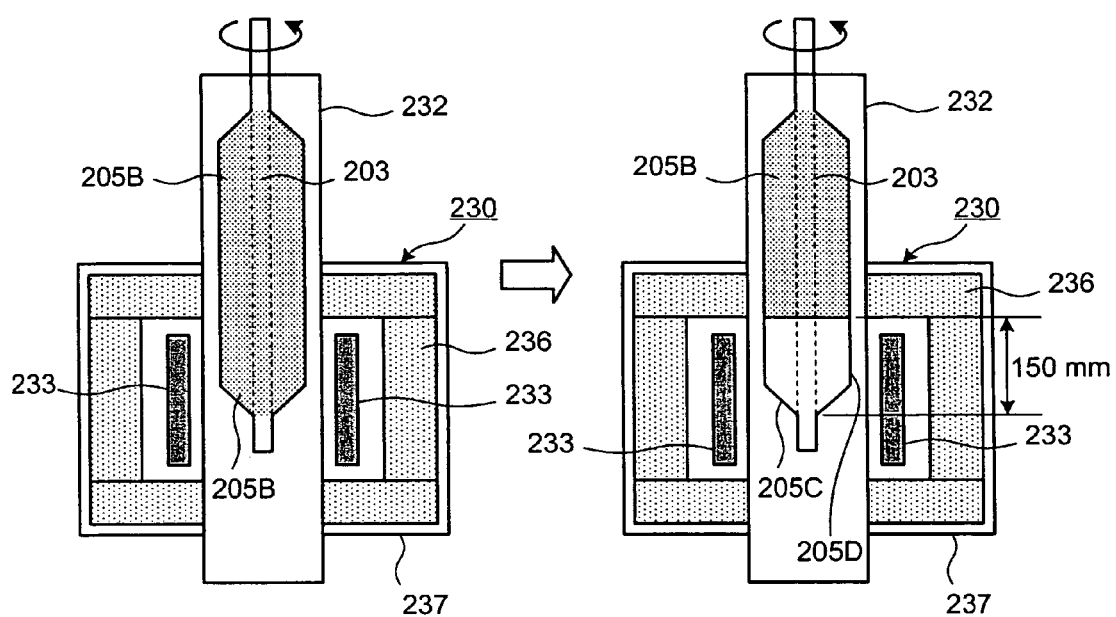
FIG. 33 is a schematic for illustrating a vitrification of a leading-edge portion of a translucent glass layer on a drawing starting side in a heating furnace.

A leading-edge portion of the translucent glass layer 205B on the side of starting the drawing is then made into a transparent glass. The leading-edge portion of the translucent glass layer 205B on the side of starting the drawing is inserted into a heating furnace 230 shown in FIG. 33, and heated by a heater 233, to make a portion of about 150 millimeters from the leading edge including a tapered portion 205C and a parallel portion 205D into a transparent glass. The heating furnace 230 includes a furnace unit 237 that forms an exterior of the heating furnace 230, and a heat-insulating member 236 that is filled in a space between the furnace unit 237 and the heater 233. A diameter of a vitrified portion of the translucent glass layer 205B is 170 millimeters, and a diameter of non-vitrified portion is 173 millimeters. A condition for the thermal treatment at this time is shown in Table 26.

TABLE 26

| Item | Condition |
|---|---|
| Heater temperature at the time of inserting preform | 1400° C. |
| Heater temperature at the time of vitrification | 1600° C. |

TABLE 26-continued

| Item | Condition |
| --- | --- |
| Temperature raising speed | 5° C./min |
| Vitrification temperature holding time | 1 hour |

Figure 34:
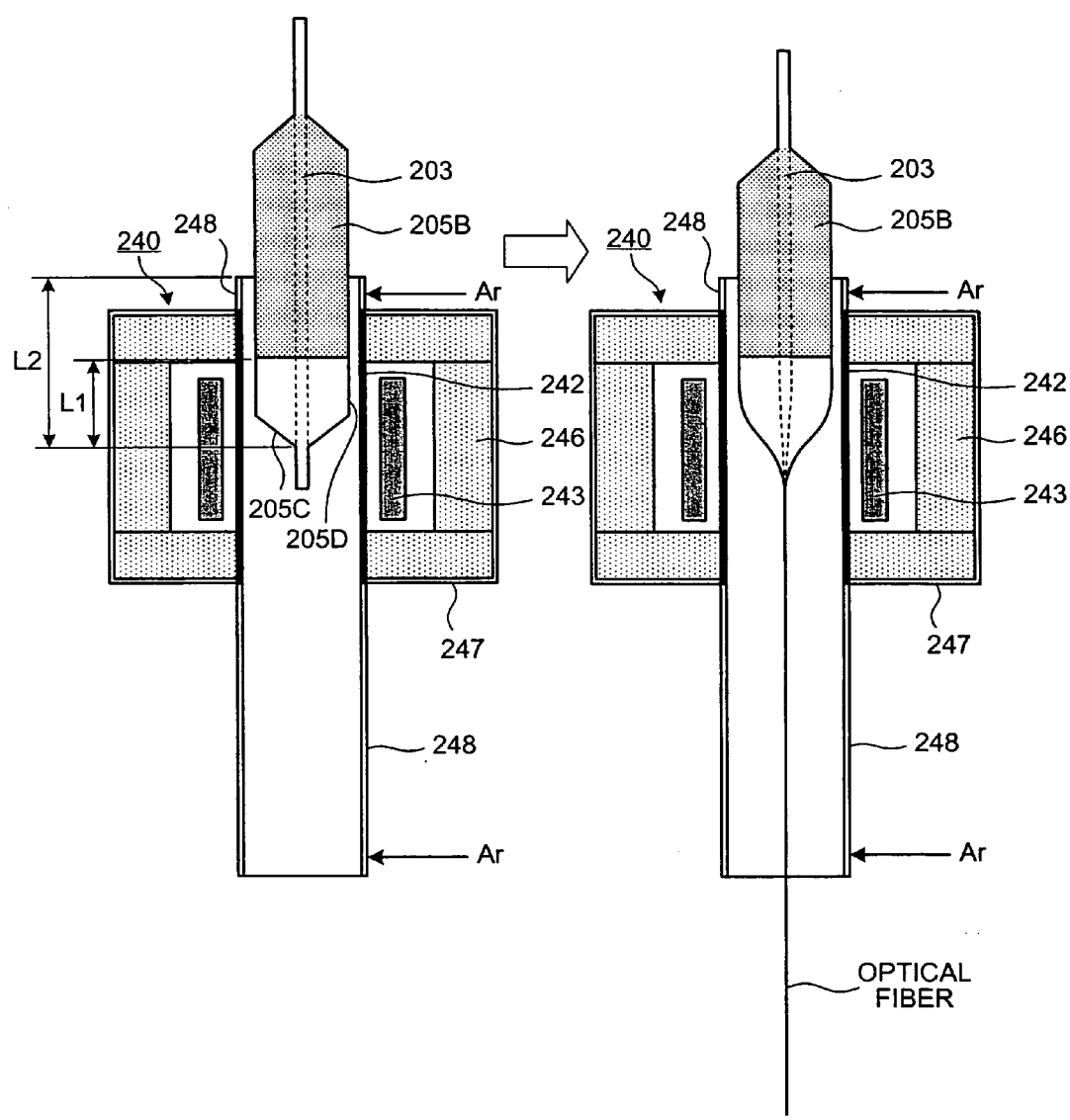
FIG. 34 is a schematic for illustrating a drawing of the optical fiber in a drawing furnace.

The optical fiber preform manufactured by the above procedures, of which the leading-edge portion is made into a transparent glass, is inserted into a drawing furnace 240 shown in FIG. 34, to perform a drawing. The drawing furnace 240 includes a muffle tube 242 that accommodates the optical fiber preform and an extending tube 248 that extends the muffle tube 242 up and down, a heater 243 made of a carbon, which is disposed around the muffle tube 242, a furnace unit 247 that forms an exterior of the drawing furnace 240, and a heat-insulating member 246 that is filled in a space between the heater 243 and the furnace unit 247. Normally, the muffle tube 242 is made of a carbon or a zirconium, and the extending tube 248 is formed by installing a tube made of a carbon or a silica on an inner side of a metal tube. As a result of repeating a variety of trial manufactures, it is found that a desired effect can be obtained if a length of a vitrified portion at the leading edge on the side of starting the drawing (a length from the leading edge to the transparent glass portion) is 0.5 time to 1.0 time of a diameter of the parallel portion that is made into the translucent glass. In other words, if the vitrification is completed for this length, a drawing is not performed before reduction of air bubbles in a portion that is in a state of a translucent glass. The length of the leading edge is a length of a portion (cladding source layer) on which the silica glass particle is deposited on the core rod 203 from the edge portion. This is almost identical to a distance from a position of the preform that is located at a center of the heater 243 at the time of starting the drawing. As shown in FIG. 34, a length of a portion that is made into the transparent glass, L1, is shorter than a length from the center of the heater 243 to an upper edge of the extending tube 248, L2. In other words, the portion of the transparent glass is entirely placed in the drawing furnace 240. By taking the above configuration, it is possible to reduce an amount of heat lost from an upper opening of the drawing furnace 240, and to reduce an electricity cost. When a diameter of the muffle tube of the drawing furnace 240 is 200 millimeters, a tension at the time of drawing is 80 grams, a drawing speed is 1500 m/min, a furnace temperature at the time of drawing is 2200° C., and the electric power is 50 kilowatts, the life of the muffle tube is three months, and the life of the heater is one year.

When the length of the tapered portion 205C formed at the leading-edge portion on the side of starting the drawing is considerably long, for example, when it is longer than the diameter of the parallel portion of the preform, it is desirable to make the entire tapered portion 205C into the transparent glass. The tapered portion in the present specification is a portion in which the diameter of the preform is smaller than the diameter of the parallel portion by more than 3%.

According to an eighteenth embodiment example of the present invention, a porous layer 205A, which is fabricated in the same manner as the seventeenth embodiment example, is dehydrated and sintered. In the sintering process, the inside pressure of the muffle tube is decreased by using a vacuum pump 225 connected to the silica muffle tube 222. The porous layer 205A is subjected to the dehydrating process and the sintering process in the silica muffle tube 222, and made into the translucent glass layer 205B including a closed pore that is substantially a vacuum.

TABLE 27

| Item | Condition | |
| --- | --- | --- |
| Dehydrating condition | | |
| Dehydrating temperature | | 1150° C. |
| Dehydrating time | | 3 hours |
| Number of rotations of preform | | 5 rotations/min |
| Type of gas and flowing amount | Nitrogen | 10 liters/min |
| | Chlorine | 0.5 liter/min |
| Sintering condition | | |
| Sintering temperature | | 1400° C. |
| Temperature raising speed | | 5° C./min |
| Sintering temperature holding time | | 4 hours |
| Number of rotations of preform | | 5 rotations/min |
| Furnace pressure | | 100 Pa |
| Number of rotations of preform | | 5 rotations/min |

At this stage, the porous layer 205A is made into the translucent glass layer 205B in a state of a translucent glass having the closed pore that is substantially a vacuum, and is physically isolated from the circumferential atmosphere, and an average density of the translucent glass is 95% of a density (2.2 g/cm$^3$) of the transparent glass, i.e., 2.1 g/cm$^3$.

Figure 35:
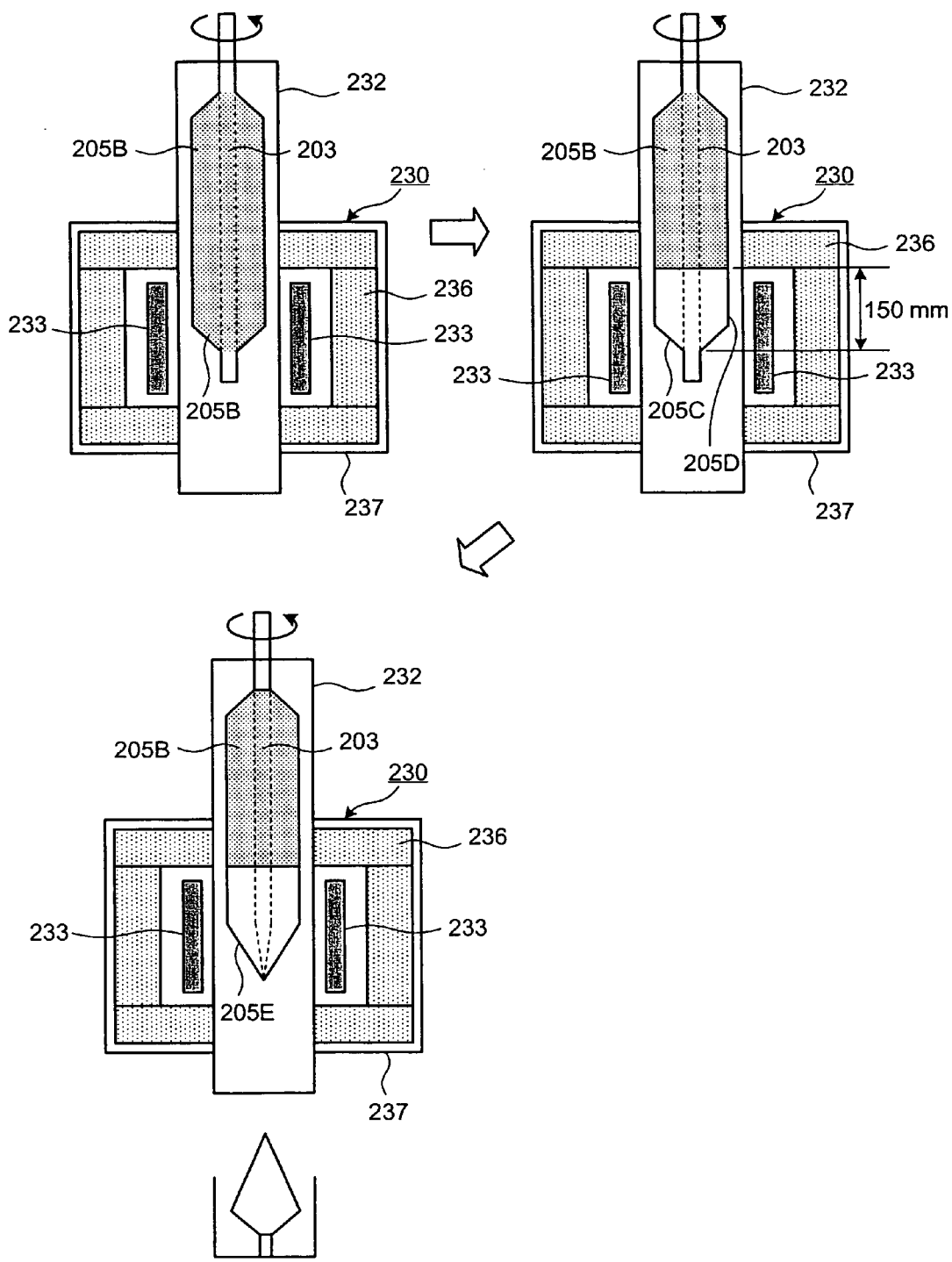
FIG. 35 is a schematic for illustrating a vitrification of a leading-edge portion of a translucent glass layer on a drawing starting side and a formation of a leading-edge tapered-portion by a meltdown in the heating furnace.

The leading-edge portion of the translucent glass layer in an incomplete sintered state, including the core rod fabricated by the above procedures is inserted into the heating furnace 230 shown in FIG. 35 for a thermal treatment, to make a portion of about 150 millimeters from the leading edge including a tapered portion and a part of parallel portion into a transparent glass. Furthermore, a leading-edge processing is performed to cut off an unnecessary tapered portion by melting down the leading-edge portion of the preform. FIG. 35 is a schematic for illustrating a vitrification of the leading-edge portion of the translucent glass layer on the side of starting the drawing and a formation of a leading-edge tapered-portion 205E by a meltdown in the heating furnace. A diameter of the vitrified portion is 170 millimeters, and a diameter of the translucent portion is 173 millimeters. A condition for the thermal treatment at this time is shown in Table 28.

TABLE 28

| Item | Condition |
| --- | --- |
| Vitrification condition | |
| Heater temperature at the time of inserting preform | 1400° C. |
| Heater temperature at the time of vitrification | 1600° C. |
| Temperature raising speed | 5° C./min |
| Vitrification temperature holding time | 1 hour |
| Leading-edge processing condition | |
| Heater temperature | 2150° C. |
| Temperature raising speed | 20° C./min |
| Leading-edge processing time | 30 min |

Also according to the present embodiment example, an edge portion on a side of ending the drawing (trailing edge) may not be sintered enough, it is desirable to perform a thermal treatment by an electric furnace, a flame of a flammable gas such as an oxyhydrogen flame and a methane gas, or a plasma flame, as an additional process, to at least completely end the sintering of the surface. In addition, the sintering of the surface can be completely ended by using the dehydrating/sintering furnace 221 having the extra heaters 223A and 223B, shown in FIG. 32, in the same manner as the seventeenth embodiment example.

The optical fiber preform manufactured by the above procedures, of which the leading-edge portion and a part of the parallel portion are made into a transparent glass, is inserted into the drawing furnace 240 shown in FIG. 34, to perform a drawing. At this moment, a length of a portion of the transparent glass (a length from the leading edge of the preform located at the center of the heater 243 before staring the drawing to a portion that is made into the translucent glass), L1, is shorter than a length from the center of the heater 243 to an upper edge of the extending tube 248, L2.

According to the present embodiment example, when a diameter of the muffle tube of the drawing furnace 240 is 200 millimeters, a tension at the time of drawing is 80 grams, a drawing speed is 1500 m/min, a furnace temperature at the time of drawing is 2200° C., and the electric power is 50 kilowatts, the life of the muffle tube is three months, and the life of the heater is one year. Although it takes two hours to obtain a product of a fair quality from starting of the drawing process according to the seventeenth embodiment example, a product of a fair quality is obtained in 30 minutes from starting of the drawing process according to the present embodiment example, making it possible to greatly improve a defect fiber length and time loss until starting the drawing.

According to a third comparison example, an optical fiber preform in a state of a transparent glass is manufactured by forming the porous layer on an outer circumference of the core rod fabricated in the same manner as the seventeenth embodiment example and dehydrating and sintering the porous layer. The optical fiber preform manufactured by the above procedures is inserted into the drawing furnace 240 shown in FIG. 34, to perform a drawing. When a diameter of the muffle tube of the drawing furnace 240 is 200 millimeters, a tension at the time of drawing is 80 grams, a drawing speed is 1500 m/min, a furnace temperature at the time of drawing is 2250° C., and the electric power is 55 kilowatts, the life of the muffle tube is one month, and the life of the heater is six months.

According to the present invention, it is possible to reduce an electricity cost and a wearing of parts of a drawing furnace when performing a drawing of a large-sized optical fiber preform, and at the same time, to perform a launching work of the drawing in a short time.

As describe above, the optical fiber preform and the method of manufacturing the optical fiber preform according to the present invention is suitable for manufacturing a large-sized optical fiber preform.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of manufacturing an optical fiber from an optical fiber perform that includes a core region and a cladding layer surrounding the core region comprising:
    forming a porous layer by depositing a particle of a silica-based glass around a core rod made of a silica-based glass having the core region in a shape of a rod;
    dehydrating the porous layer under at least one condition of a decreased pressure, an ambient atmosphere with an inert gas and a halogen gas, and an ambient atmosphere with an inert gas and a halogen-based compound gas;
    sintering the dehydrated porous layer under a pressure equal to or lower than 2000 Pascals until the dehydrated porous layer becomes a glass layer containing a closed pore, the sintering being performed such that an average density of the porous layer becomes equal to or greater than 1.8 grams per cubic centimeter and less than 2.2 grams per cubic centimeter;
    placing a portion of the glass layer in a heating furnace;
    vitrifying only a leading edge of the glass layer and a portion of the glass layer extending in a longitudinal direction of the core rod on a side of starting a drawing, by heating the leading edge and the portion to form the optical fiber preform;
    removing the optical fiber preform in which only the leading edge and the portion have been vitrified from the heating furnace;
    inserting the optical fiber preform into a drawing furnace; and
    drawing the optical fiber preform.

2. The method according to claim 1, wherein
    a method of heating the leading edge and the portion of the glass layer includes any one of heating by an electric furnace, heating by radiation of a flame of a flammable gas, and heating by radiation of a plasma flame.

3. The method according to claim 1, wherein
    the vitrifying includes tapering the leading edge simultaneously.

4. The method according to claim 1, wherein a length from the leading edge to an end of the vitrified portion extending in the longitudinal direction of the core rod is 0.5 times to 1.0 times a diameter of a parallel portion of the portion of the glass layer.

5. The method according to claim 1, wherein the leading edge and the portion are entirely placed in the drawing furnace at a start of the drawing.

* * * * *